US012711183B2

(12) United States Patent
Rose et al.

(10) Patent No.: US 12,711,183 B2
(45) **Date of Patent: *Aug. 18, 2026**

(54) ONLINE SOFTWARE PLATFORM (OSP) DERIVING RESOURCES, PRODUCING REPORT DOCUMENT ABOUT THEM, AND CREATING GALLERY WITH DATA SUBSTANTIATING THE REPORT DOCUMENT FOR VIEWING BY THIRD PARTY

(71) Applicant: Avalara, Inc., Seattle, WA (US)

(72) Inventors: Bilkay Rose, Seattle, WA (US); Mark Janzen, Wichita, KS (US); Naveen Kumar Agrawal, Bellevue, WA (US); Denis Gulsen, Redwood City, CA (US); Gregory T. Kavounas, Bellevue, WA (US); Heidi Genest, Stanford, CA (US); Erik van der Hoeven, Mercer Island, WA (US); Tracy Barney, Bainbridge Island, WA (US); Yvonne Seidl, Renton, WA (US); Scott Seely, Galesville, WI (US); Thomas Goldschmidt, Karlsdorf-Neuthard (DE)

(73) Assignee: Avalara, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/013,891

(22) Filed: Jan. 8, 2025

(65) Prior Publication Data

US 2025/0148021 A1 May 8, 2025

Related U.S. Application Data

(63) Continuation of application No. 18/626,199, filed on Apr. 3, 2024, now Pat. No. 12,339,911, which is a (Continued)

(51) Int. Cl.
*G06F 16/93* (2019.01)
*G06F 16/28* (2019.01)

(Continued)

(52) U.S. Cl.
CPC ............ *G06F 16/93* (2019.01); *G06F 16/288* (2019.01); *G06F 16/9554* (2019.01); *G06F 21/44* (2013.01); *G06F 2221/2141* (2013.01)

(58) Field of Classification Search
CPC .... G06F 16/93; G06F 16/288; G06F 16/9554; G06F 21/44; G06F 2221/2141

(Continued)

(56) References Cited

U.S. PATENT DOCUMENTS

| | | |
|---|---|---|
| 7,783,536 B2 | 8/2010 | William et al. |
| 7,933,803 B1 | 4/2011 | Nadler et al. |

(Continued)

FOREIGN PATENT DOCUMENTS

| | | |
|---|---|---|
| WO | 2013/163625 A1 | 10/2013 |
| WO | 2025/072735 A1 | 4/2025 |

OTHER PUBLICATIONS

Examination Report, AU App. No. 2022293875, Dec. 20, 2024, 3 pages.

(Continued)

*Primary Examiner* — Phong H Nguyen
(74) *Attorney, Agent, or Firm* — Christopher Wickstrom; Frontier IP Law PLLC

(57) ABSTRACT

In embodiments, an Online Software Platform (OSP) is configured to receive datasets having dataset values that represent relationship instance data of relationship instances between a client primary entity and other secondary entities, select digital rules responsive to these dataset values, produce resources for the datasets by applying the selected digital rules to the dataset values, derive a total value of the (Continued)

1700
1735 RECEIVE DATASET HAVING DATASET VALUES
1744 INPUT ENTITY DATA OF PRIMARY ENTITY
1770 SELECT DIGITAL RULE RESPONSIVE TO DATASET VALUE
1779 PRODUCE INDIVIDUAL RESOURCE FOR DATASET
1780 PRODUCE ADDITIONAL INDIVIDUAL RESOURCES FOR PRIMARY ENTITY
1755 DERIVE VALUE OF TOTAL RESOURCE
1749 GENERATE REPORT DOCUMENT
1709 ENABLE AGENT OF PRIMARY ENTITY TO SIGN REPORT DOCUMENT
1718 PREPARE INSTANTIATION ENABLING VIEWING DATA RECORD
1720 PREPARE ADDITIONAL INSTANTIATION ENABLING VIEWING ADDITIONAL ELEMENT
1771 MAKE AVAILABLE FOR VIEWING TO A DOMAIN ENTITY THE INSTANTIATION ENABLING VIEWING THE DATA RECORD

METHODS produced resources, generate a report document that mentions at least derived the total value, and prepare an instantiation that enables viewing a data record that substantiates the derived total value. The OSP may further make this instantiation available for viewing to a domain entity that has access to the report document and wants to confirm the derived total value. For instance, the OSP may provide an access instruction for viewing the instantiation, or even augment the report document itself with such an access instruction.

29 Claims, 28 Drawing Sheets

Related U.S. Application Data continuation of application No. 17/840,397, filed on Jun. 14, 2022, now Pat. No. 11,977,586.

(60) Provisional application No. 63/210,528, filed on Jun. 15, 2021.

(51) Int. Cl.
*G06F 16/955* (2019.01)
*G06F 21/44* (2013.01)

(58) Field of Classification Search
USPC ................................ 707/722, 758, 781, 783
See application file for complete search history.

(56) References Cited

U.S. PATENT DOCUMENTS

| | | | | |
|---|---|---|---|---|
| 8,620,578 | B1 | 12/2013 | Brown et al. | |
| 8,725,407 | B2 | 5/2014 | Hurley et al. | |
| 9,760,915 | B2 | 9/2017 | Pavlou et al. | |
| 10,332,216 | B2 | 6/2019 | Barsade et al. | |
| 10,445,818 | B1 | 10/2019 | Chowdhary | |
| 10,769,611 | B2 | 9/2020 | Mcneel | |
| 10,872,100 | B1 | 12/2020 | Shefferman et al. | |
| 11,176,620 | B1 | 11/2021 | Lubczynski et al. | |
| 11,238,542 | B1 | 2/2022 | Wixted et al. | |
| 2002/0138765 | A1 | 9/2002 | Fishman et al. | |
| 2007/0136158 | A1 | 6/2007 | Rawlings et al. | |
| 2007/0136159 | A1 | 6/2007 | Rawlings et al. | |
| 2009/0187500 | A1 | 7/2009 | Wilson et al. | |
| 2012/0011518 | A1 | 1/2012 | Duan et al. | |
| 2013/0013471 | A1 | 1/2013 | Fishman | |
| 2014/0172656 | A1 | 6/2014 | Shaw | |
| 2014/0351105 | A1 | 11/2014 | Hamm | |
| 2015/0019402 | A1* | 1/2015 | Berlin | G06Q 20/24 705/38 |
| 2016/0042466 | A1 | 2/2016 | Herndon et al. | |
| 2016/0140668 | A1* | 5/2016 | Maguire | G06Q 40/123 705/31 |
| 2018/0241569 | A1* | 8/2018 | Harmon | H04L 67/52 |
| 2019/0089784 | A1* | 3/2019 | Bloy | G06Q 20/326 |
| 2019/0114609 | A1 | 4/2019 | Burton et al. | |
| 2020/0042964 | A1* | 2/2020 | Roach | G06Q 40/123 |
| 2021/0158456 | A1 | 5/2021 | Morgan et al. | |

OTHER PUBLICATIONS

International Search Report and Written Opinion, PCT App. No. PCT/US2022/033686, Sep. 21, 2022, 14 pages.
Non-Final Office Action, U.S. Appl. No. 17/840,397, Aug. 14, 2023, 23 pages.
Non-Final Office Action, U.S. Appl. No. 18/626,199, Oct. 18, 2024, 21 pages.
Notice of Allowance, U.S. Appl. No. 17/840,397, Feb. 2, 2024, 9 pages.
Office Action , CA App. No. 3222276, Feb. 4, 2025, 04 pages.
Second Examination Report, AU App. No. 2022293875, Dec. 18, 2025, 03 pages.

* cited by examiner

*REPORT DOCUMENT AND ACCESS INSTRUCTION REFERRING TO THE REPORT DOCUMENT*

USER INTERFACE (UI) FOR INPUTTING REQUESTS

USER INTERFACE (UI) FOR INPUTTING SUBSTANTIATION REQUEST

*INSTANTIATION AS A DOCUMENT*

*INSTANTIATION AS A COPY OF A DOCUMENT*

INSTANTIATION AS A LINK

INSTANTIATION AS A LINK

FIGURE 9 *INSTANTIATION(S) VIEWABLE IN GALLERY*

*INSTANTIATION AS PARAMETER VALUE IMPORT FIELD(S) PRESENTING DATA IN VIEWABLE PAGE IN CONTEXT OF DATA RECORD PRESENTATION TEXT*

*VIEWING THE SELECTED DIGITAL RULES*

*REPORT DOCUMENT AUGMENTED WITH ACCESS INSTRUCTION TO ITS GALLERY – LINK*

*REPORT DOCUMENT AUGMENTED WITH ACCESS INSTRUCTION TO ITS GALLERY – QR CODE*

*UI OF THIRD-PARTY AUTHORIZATION GATEWAY*

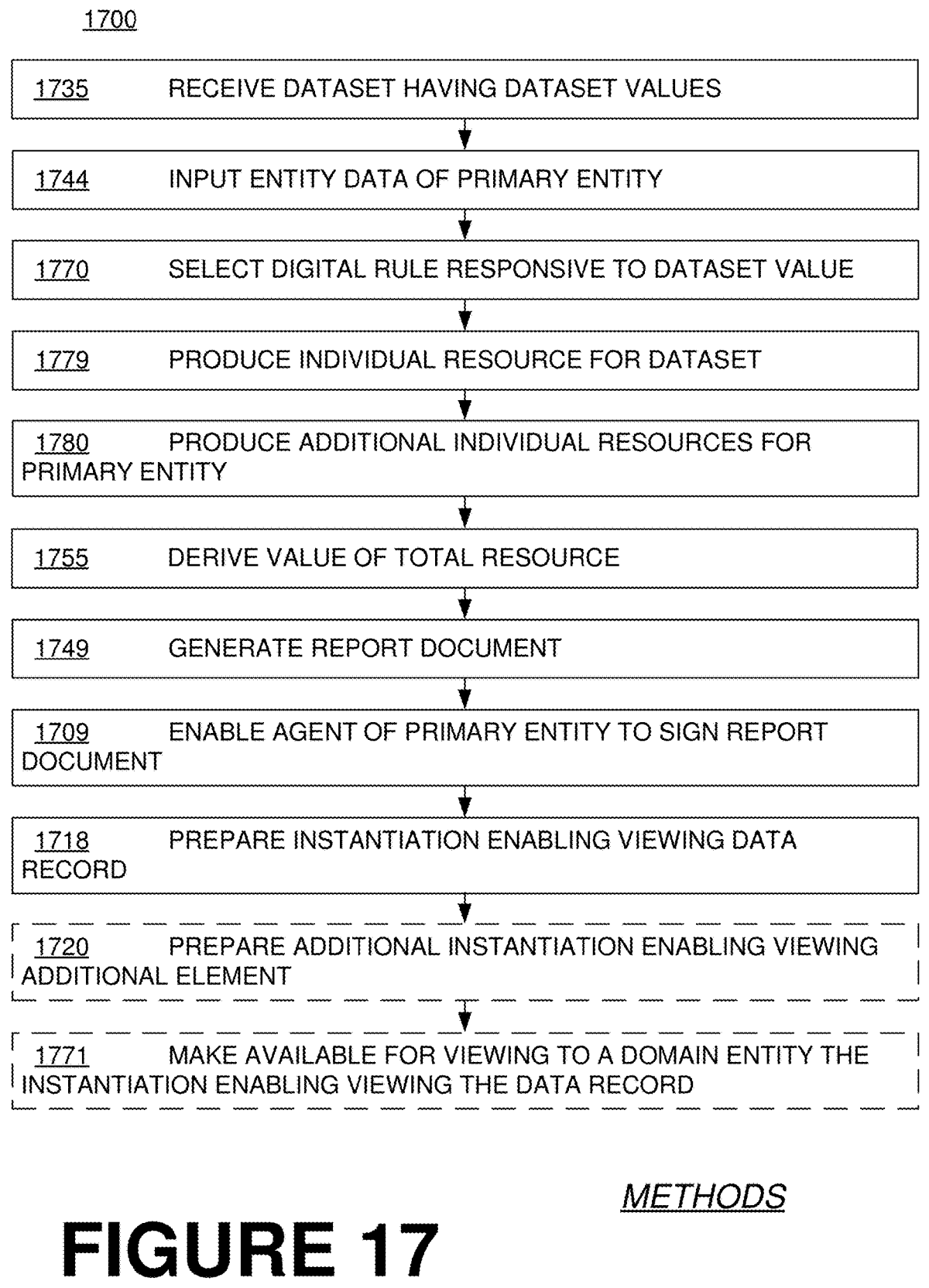

1700

1735 RECEIVE DATASET HAVING DATASET VALUES

1744 INPUT ENTITY DATA OF PRIMARY ENTITY

1770 SELECT DIGITAL RULE RESPONSIVE TO DATASET VALUE

1779 PRODUCE INDIVIDUAL RESOURCE FOR DATASET

1780 PRODUCE ADDITIONAL INDIVIDUAL RESOURCES FOR PRIMARY ENTITY

1755 DERIVE VALUE OF TOTAL RESOURCE

1749 GENERATE REPORT DOCUMENT

1709 ENABLE AGENT OF PRIMARY ENTITY TO SIGN REPORT DOCUMENT

1718 PREPARE INSTANTIATION ENABLING VIEWING DATA RECORD

1720 PREPARE ADDITIONAL INSTANTIATION ENABLING VIEWING ADDITIONAL ELEMENT

1771 MAKE AVAILABLE FOR VIEWING TO A DOMAIN ENTITY THE INSTANTIATION ENABLING VIEWING THE DATA RECORD

*METHODS*

FIGURE 17

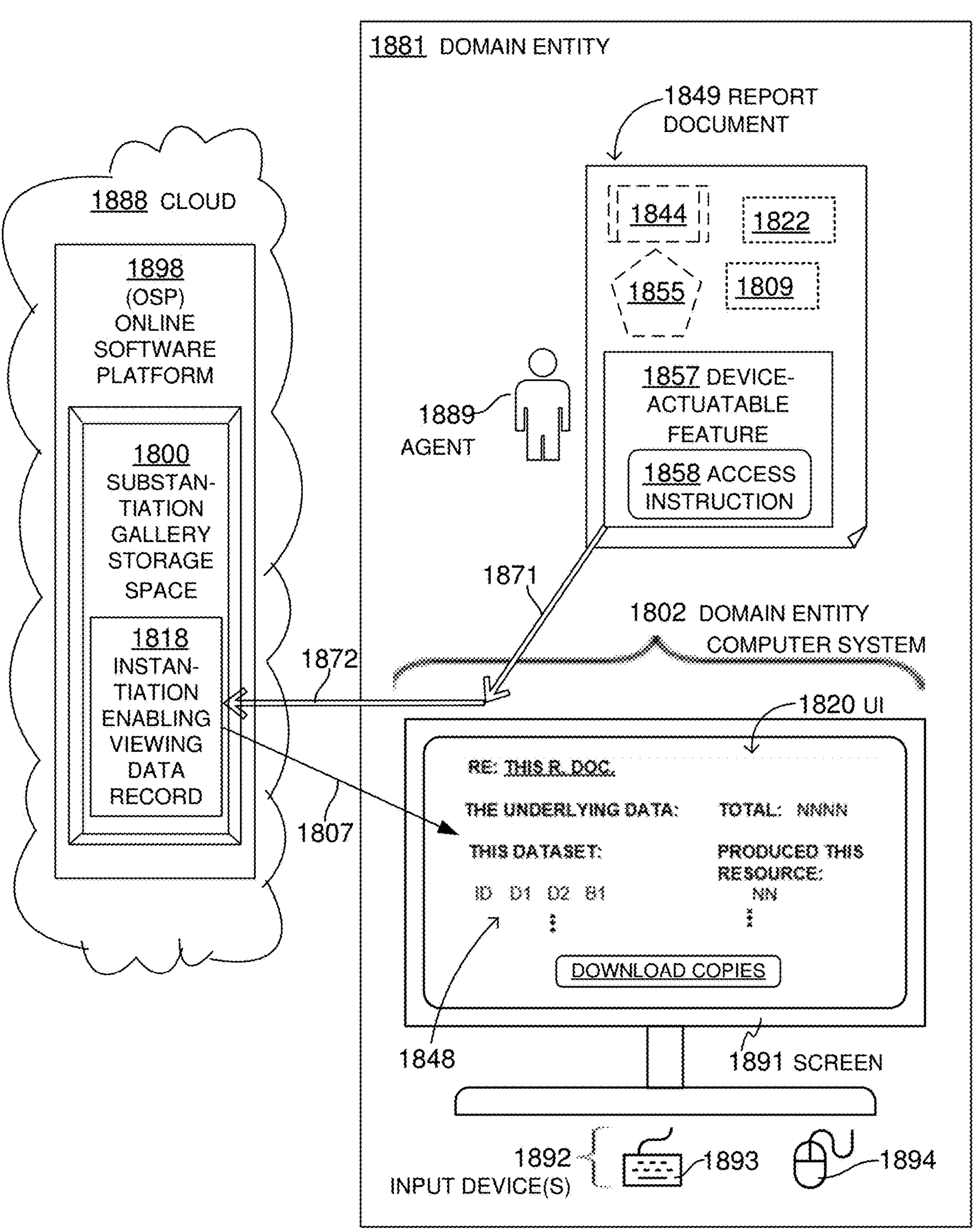
FIGURE 18 *DOMAIN ENTITY USING REPORT DOCUMENT TO ACCESS ITS SUBSTANTIATION GALLERY*

*USE CASE*

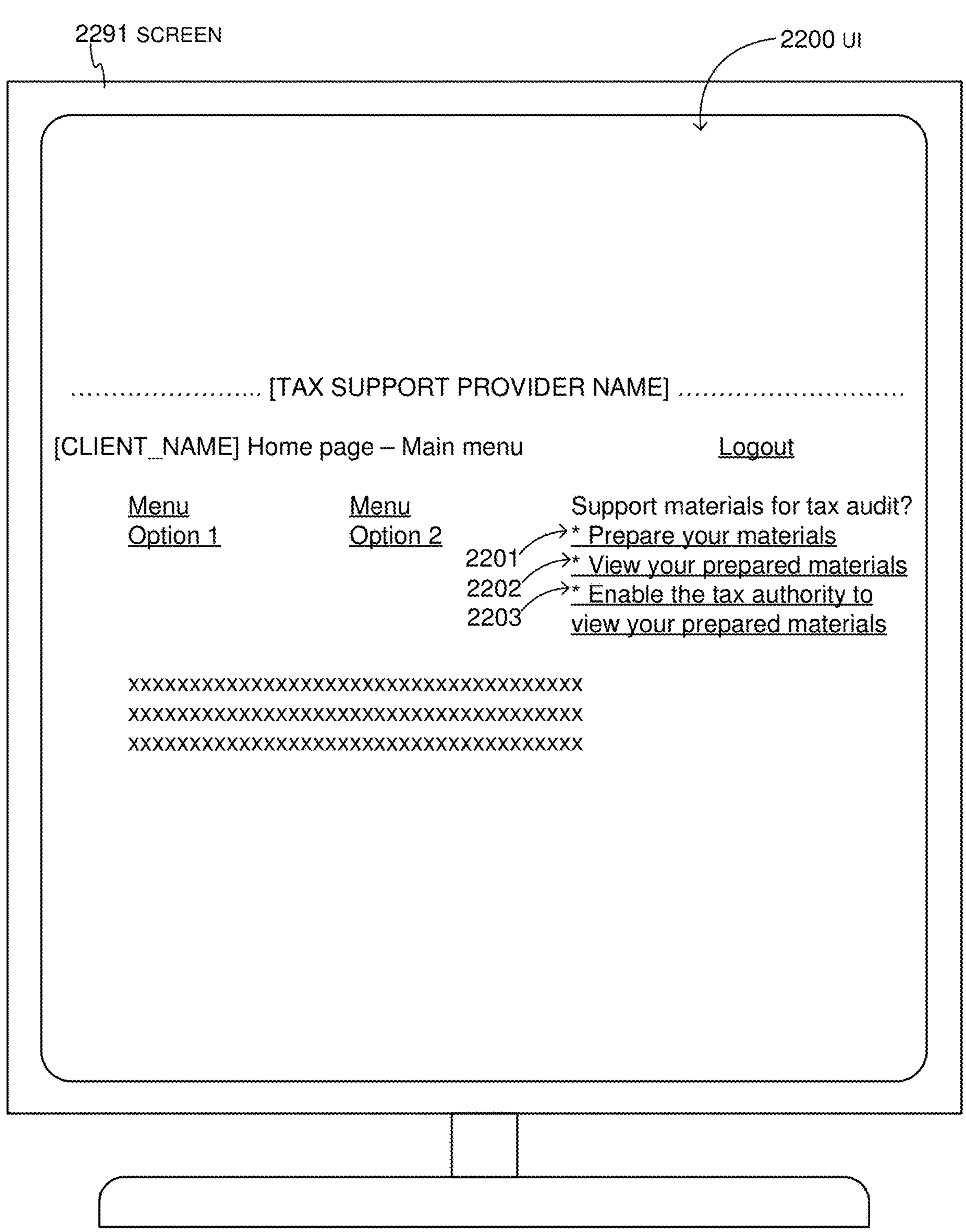
FIGURE 22A *USER INTERFACE (UI) FOR INPUTTING REQUESTS*

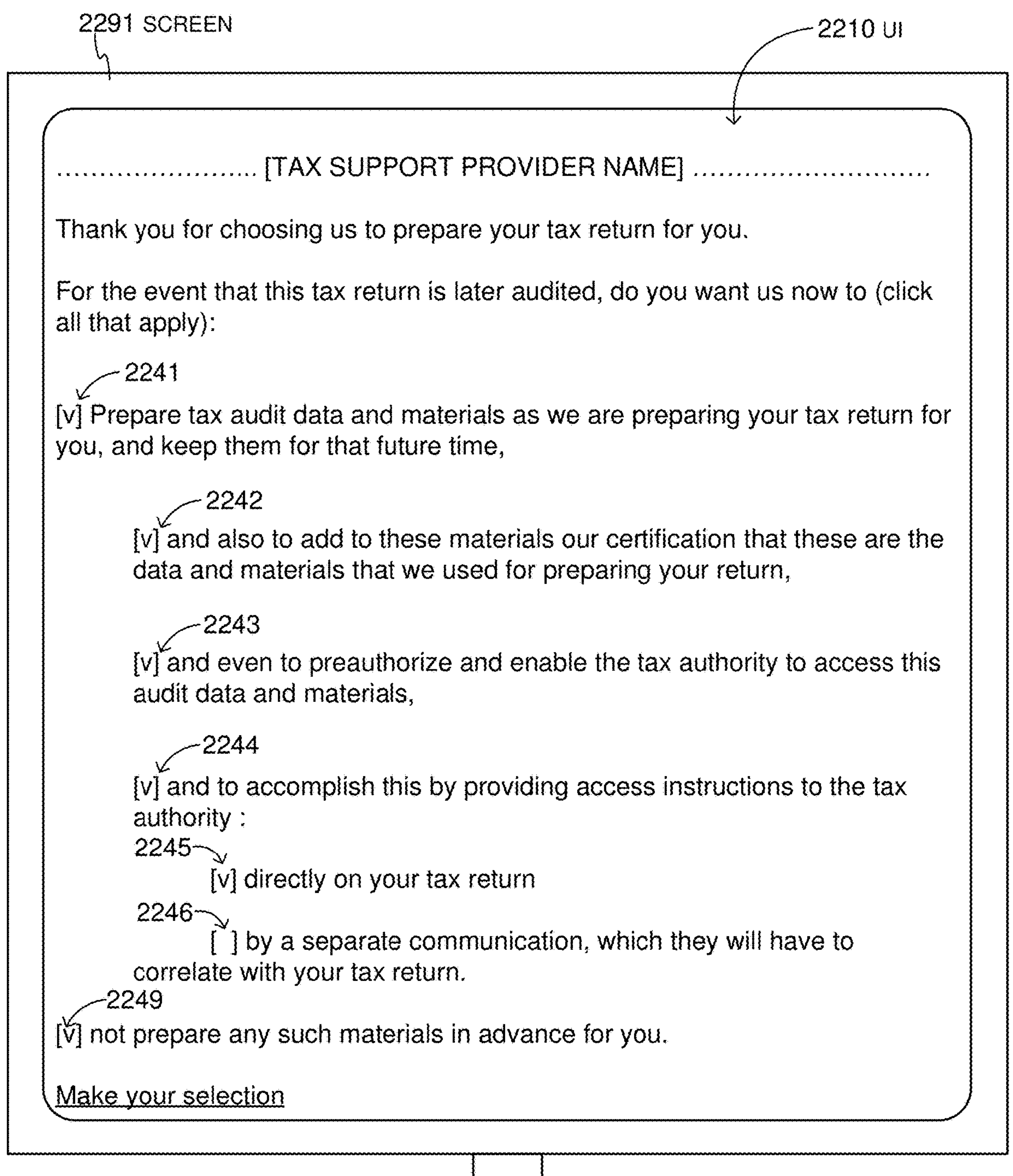
FIGURE 22B *TAXPAYER UI FOR INPUTTING REQUEST TO PREPARE AUDIT MATERIALS*

*TAX RETURN AND ACCESS INSTRUCTION REFERRING TO THE TAX RETURN*

*TAX RETURN WITH EMBEDDED ACCESS INSTRUCTION TO ITS AUDIT GALLERY*

*TAX RETURN WITH ACCESS INSTRUCTION TO ITS AUDIT GALLERY AS A QR CODE*

*INDIVIDUAL SALES TAX COMPUTATIONS*

*TAX AUTHORITY USING TAX RETURN TO ACCESS ITS AUDIT GALLERY*

ONLINE SOFTWARE PLATFORM (OSP) DERIVING RESOURCES, PRODUCING REPORT DOCUMENT ABOUT THEM, AND CREATING GALLERY WITH DATA SUBSTANTIATING THE REPORT DOCUMENT FOR VIEWING BY THIRD PARTY

CROSS REFERENCE TO RELATED PATENT APPLICATIONS

This patent application is a continuation of U.S. application Ser. No. 18/626,199 filed Apr. 3, 2024, which is a continuation of U.S. application Ser. No. 17/840,397 filed Jun. 14, 2022 (now Issued U.S. Pat. No. 11,977,586), which claims the benefit of U.S. Provisional Application No. 63/210,528, filed on Jun. 15, 2021, which are hereby incorporated by reference.

BACKGROUND

Online software platforms perform computations and make determinations for clients by communicating with devices of the clients over computer networks. Yet enabling, in a timely and efficient manner, entities other than these platforms to review the computations and the determinations presents a technical problem for current online software platforms, especially where the computations and the determinations have involved computations and determinations based on earlier computations and determinations.

All subject matter discussed in this Background section of this document is not necessarily prior art, and may not be presumed to be prior art simply because it is presented in this Background section. Plus, any reference to any prior art in this description is not, and should not be taken as, an acknowledgement or any form of suggestion that such prior art forms parts of the common general knowledge in any art in any country. Along these lines, any recognition of problems in the prior art discussed in this Background section or associated with such subject matter should not be treated as prior art, unless expressly stated to be prior art. Rather, the discussion of any subject matter in this Background section should be treated as part of the approach taken towards the particular problem by the inventors. This approach in and of itself may also be inventive.

BRIEF SUMMARY

The present description gives instances of computer systems, storage media that may store programs, and methods that solve these technical problems by improving the functioning of computer or other hardware, such as by reducing the processing and/or data transmission resources needed to perform various tasks, and thus improving the technology of online software platforms and their applications. This enables tasks to be performed with less latency and/or preserving more conserved resources for use in performing other tasks or additional instances of the same task.

In embodiments, an Online Software Platform (OSP) is configured to receive datasets having dataset values that represent relationship instance data of relationship instances between a client primary entity and other secondary entities, select digital rules responsive to these dataset values, produce resources for the datasets by applying the selected digital rules to the dataset values, derive a total value of the produced resources, generate a report document that mentions at least the derived total value, and prepare an instantiation that enables viewing a data record that substantiates the derived total value. The OSP may further make this instantiation available for viewing to a domain entity that has access to the report document and wants to confirm the derived total value. For instance, the OSP may provide an access instruction for viewing the instantiation, or even augment the report document itself with such an access instruction.

In embodiments, a computer system of a domain entity is configured to assist an agent of the domain entity to review a report document received on behalf of a primary entity. The report document may have been prepared in view of data records of dataset values of relationship instances, digital rules selected in view of the dataset values, and resources produced from the dataset values and the selected digital rules. The report document includes a device-actuatable feature that the agent can actuate with an input device. The device-actuatable feature is for an access instruction that is thus inputted, and enables the agent to view instances of the data record and the selected digital rule stored in the primary entity's online service provider.

An advantage can be that substantiation deficiencies of report documents can be identified and resolved with fewer interactions, and therefore fewer delays arising from interactions. As such, it will be appreciated that results of embodiments are larger than the sum of their individual parts, and have utility.

These and other features and advantages of the claimed invention will become more readily apparent in view of the embodiments described and illustrated in this specification, namely in this written specification and the associated drawings.

BRIEF DESCRIPTION OF THE DRAWINGS

FIG. 17 is a flowchart for illustrating sample methods according to embodiments.

FIG. 18 is a diagram showing sample aspects of embodiments where a domain entity uses a device-actuatable feature of a report document to access a substantiation gallery storage space for the report document.

FIG. 22A shows an operational example of a User Interface (UI) for an agent of a primary entity of FIG. 21 that is a taxpayer, the UI providing selectable options through which the agent is enabled to input various requests regarding audit materials for one or more tax returns, in a use case of embodiments.

FIG. 22B shows an operational example of a User Interface (UI) that may appear after a specific option in the UI of FIG. 22A has been selected, in a use case of embodiments.

DETAILED DESCRIPTION

As has been mentioned, the present description is about computer systems, storage media that may store programs, and methods. Embodiments are now described in more detail.

Figure 1:
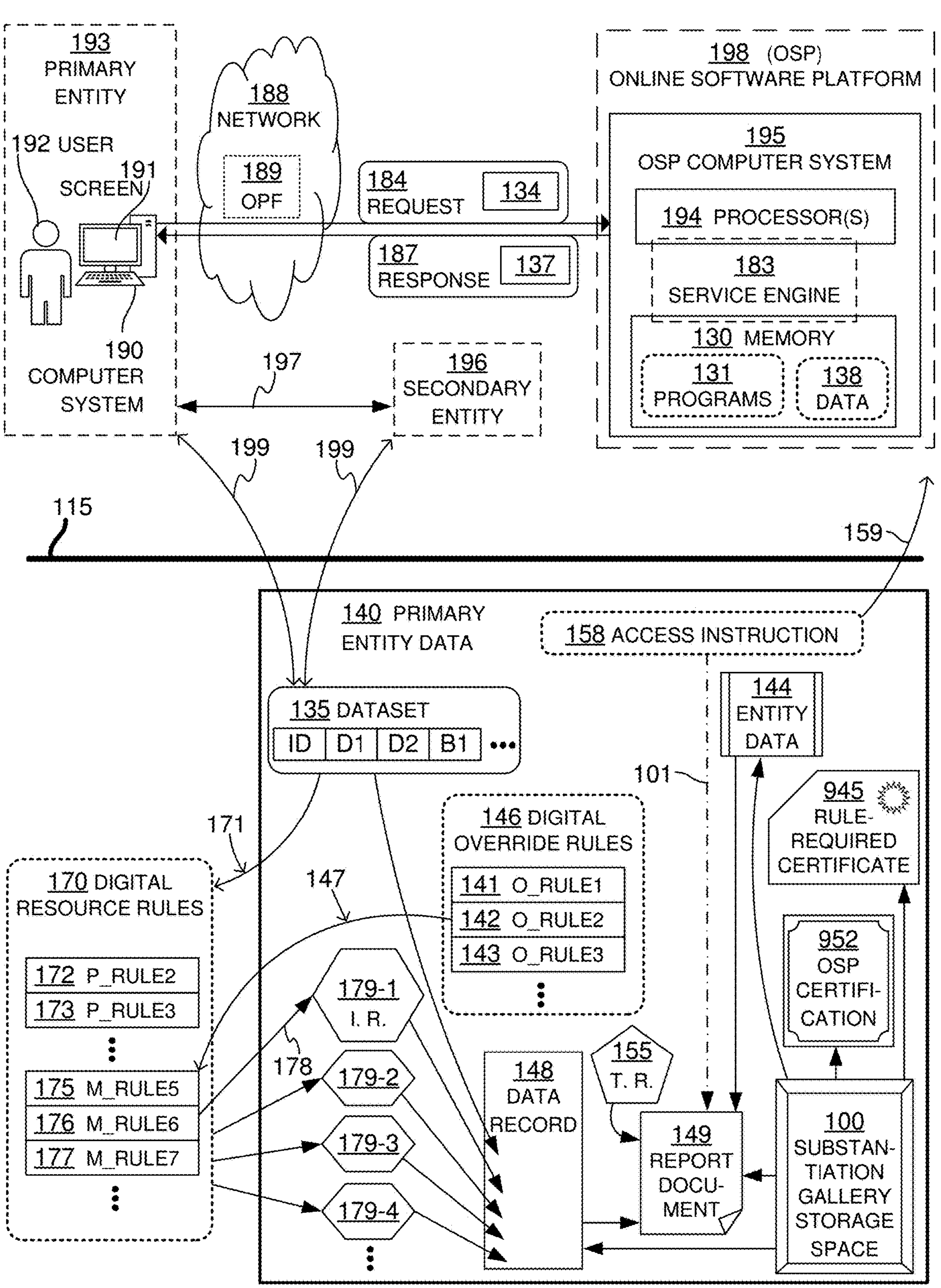
FIG. 1 is a diagram showing sample aspects of embodiments where a report document and a substantiation gallery storage space for it are created.

FIG. 1 is diagram showing sample aspects of embodiments. A thick horizontal line 115 separates this diagram, although not completely or rigorously, into a top portion and a bottom portion. Above the line 115 the emphasis is mostly on entities, components, their relationships, and their interactions, while below the line 115 the emphasis is mostly on processing of data that takes place often within one or more of the components above the line 115.

Above the line 115, a sample online software platform (OSP) computer system 195 according to embodiments is shown. The OSP computer system 195 may optionally be implemented as part of an online software platform (OSP) 198. As such, the OSP computer system 195 can be located in "the cloud."

The OSP computer system 195 has one or more processors 194 and a memory 130. The memory 130 stores programs 131 and data 138. The one or more processors 194 and the memory 130 of the OSP computer system 195 thus implement a service engine 183. Additional implementation details for the OSP computer system 195 are given later in this document.

The OSP 198 can be configured to perform one or more predefined services, for example via operations of the service engine 183. Such services can be searches, determinations, computations, verifications, notifications, the transmission of specialized information, including data that effectuates payments, the generation and transmission of documents, the online accessing other systems to effect registrations, and so on, including what is described in this document. Such services can be provided as a Software as a Service (Saas).

A user 192 may be standalone. The user 192 may use a computer system 190 that has a screen 191, on which User Interfaces (UIs) may be shown. Additional sample implementation details for the computer system 190 are given later in this document. In embodiments, the user 192 and the computer system 190 are considered part of a primary entity 193, which can be referred to also merely as entity. In such instances, the user 192 can be an agent of the entity 193, and even within a physical site of the entity 193, although that is not necessary. In embodiments, the computer system 190 or other device of the user 192 are client devices for the OSP computer system 195. The user 192 or the entity 193 can be clients for the OSP 198. For instance, the user 192 may log into the OSP computer system 195 by using credentials, such as a user name, a password, a token, and so on.

The computer system 190 may access the OSP computer system 195 via a communications network 188, such as the internet. In particular, the entities and associated systems of FIG. 1 may communicate via physical and logical channels of the communication network 188. For example, information may be communicated as data using the Internet Protocol (IP) suite over a packet-switched network such as the Internet or other packet-switched network, which may be included as part of the communication network 188. The communication network 188 may include many different types of computer networks and communication media including those utilized by various different physical and logical channels of communication, now known or later developed. Non-limiting media and communication channel examples include one or more, or any operable combination of: fiber optic systems, satellite systems, cable systems, microwave systems, asynchronous transfer mode ("ATM") systems, frame relay systems, digital subscriber line ("DSL") systems, radio frequency ("RF") systems, telephone systems, cellular systems, other wireless systems, and the Internet. In various embodiments the communication network 188 can be or include any type of network, such as a local area network (LAN), a metropolitan area network (MAN), a wide area network (WAN), or the internet. Accordingly, from certain perspectives, the OSP 198 is in the cloud, and can be drawn within the communication network 188.

Accessing, downloading and/or uploading may be permitted from one of these two computer systems to the other, and so on. Such can be performed, for instance, with manually uploading files, like spreadsheet files, etc. Such can also be performed automatically as shown in the example of FIG. 1. The computer system 190 and the OSP computer system 195 may exchange requests and responses with each other. Such can be implemented with a number of architectures.

In one such architecture, a device remote to the service engine 183, such as the computer system 190, may have a certain application (not shown) and a connector (not shown) that is a plugin that sits on top of that certain application. The connector may be able to fetch from the remote device the details required for the service desired from the OSP 198, form an object or payload 134, and then send or push a request 184 that carries the payload 134 to the service engine 183 via a service call. The service engine 183 may receive the request 184 with the payload 134. The service engine 183 may then apply digital resource rules 170, or digital override rules 146, to the payload 134 to produce a requested individual resource 179-1, form a payload 137 that is an aspect of the individual resource 179-1, and then push, send, or otherwise cause to be transmitted a response 187 that carries the payload 137 to the connector. The connector reads the response 187, and forwards the payload 137 to the certain application.

In an alternative such architecture, a device remote to the service engine 183, such as the computer system 190, may have a particular application (not shown). In addition, the OSP computer system 195 implements a REST (Representational State Transfer) API (Application Programming Interface) (not shown). REST or RESTful API design is designed to take advantage of existing protocols. While REST can be used over nearly any protocol, it usually takes advantage of HTTP (Hyper Text Transfer Protocol) when used for Web APIs. This alternative architecture enables the primary entity 193 to directly consume a REST API from their particular application, without using a connector. The particular application of the remote device may be able to fetch internally from the remote device the details required for the service desired from the OSP 198, and thus send or push the request 184 to the REST API. In turn, the REST API talks in the background to the service engine 183. Again, the service engine 183 determines the requested individual resource 179-1, and sends an aspect of it back to the REST API. In turn, the REST API sends the response 187 that has the payload 137 to the particular application.

Moreover, in some embodiments, data from the computer system 190 and/or from the OSP computer system 195 may be stored in an Online Processing Facility (OPF) 189 that can run software applications, perform operations, and so on. In such embodiments, requests and responses may be exchanged with the OPF 189, downloading or uploading may involve the OPF 189, and so on. In such embodiments, the computer system 190 and any devices of the OPF 189 can be considered to be remote devices, at least from the perspective of the OSP computer system 195.

In some instances, the user 192 or the primary entity 193 may have instances of relationships with secondary entities. Only one such secondary entity 196 is shown. In this example, the primary entity 193 has a relationship instance 197 with the secondary entity 196.

In some instances, the user 192 or the primary entity 193 may have data about one or more secondary entities, for example via relationship instances with them. The primary entity 193 and/or the secondary entity 196 may be referred to as simply entities. One of these entities may have one or more attributes. Such an attribute of such an entity may be any one of its name, type of entity, a physical or geographical location such as an address, a contact information element, an affiliation, a characterization of another entity, a characterization by another entity, an association or relationship with another entity (general or specific instances), an asset of the entity, a declaration by or on behalf of the entity, and so on.

A sample received dataset 135 is shown below the line 115, and as part of the primary entity data 140. The primary entity data 140 is a way that the OSP 198 maintains data that is specific to the primary entity 193. The dataset 135 may be received by the OSP computer system 195 in a number of ways. In some embodiments, one or more requests may be received by the OSP computer system 195 via a network. In this example, a request 184 is received by the OSP computer system 195 via the network 188. The request 184 has been transmitted by the remote computer system 190. The received one or more requests can carry payloads. In this example, the request 184 carries a payload 134. In such embodiments, the one or more payloads may be parsed by the OSP computer system 195 to extract the dataset. In this example, the payload 134 can be parsed by the OSP computer system 195 to extract the dataset 135. In this example the single payload 134 encodes the entire dataset 135, but that is not required. In fact, a dataset can be received from the payloads of multiple requests. In such cases, a single payload may encode only a portion of the dataset. And, of course, the payload of a single request may encode multiple datasets. Additional computers may be involved with the network 188, some beyond the control of the user 192 or OSP 198, and some within such control.

As such, the OSP computer system 195 may receive datasets that have dataset values. The dataset 135 has dataset values that can be numerical, alphanumeric, Boolean, and so on, as needed for what the dataset values characterize. In embodiments, the dataset values represent relationship instance data of the relationship instance 197 between the primary entity 193 and the secondary entity 196. For example, in the dataset 135, an identity value ID may indicate an identity of the dataset 135, so as to differentiate it from other such datasets. At least one of the values of the dataset 135 may characterize an attribute of a certain one of the entities 193 and 196, as indicated by the correspondence arrows 199. For instance, a value D1 may be the name of the certain entity, a value D2 may be for relevant data of the entity, and so on. Plus, an optional value B1 may be a numerical base value for an aspect of the dataset, and so on. The aspect of the dataset may be the aspect of the dataset value that characterizes the attribute, an aspect of the reason that the dataset was created in the first place, and so on. The dataset 135 may further have additional such dataset values, as indicated by the horizontal dot-dot-dot ("ellipsis") to the right of the dataset 135. In some embodiments, the dataset 135 has dataset values that characterize attributes of both the primary entity 193 and the secondary entity 196, but that is not required.

Below the line 115 are shown sample elements hosted and operations taking place within the OSP computer system 195, and/or the service engine 183. In this example, the OSP computer system 195 hosts or may access stored digital resource rules 170, and hosts or may access the primary entity data 140 specially for the primary entity 193. The primary entity data 140 may be hosted on different locations of the online software platform 198, including some of it possibly on the OSP computer system 195. The primary entity data 140 may optionally be hosted in a single location in a memory or database, such as the memory 130. The primary entity data 140 of course, is presumptively confidential data of the primary entity 193; in embodiments, however, the primary entity 193 may enable some of it to be accessed for viewing by a third party, such as a domain entity, as described later in this document.

In this example, the primary entity data 140 includes the dataset 135 and/or its dataset values individually, e.g. stored in databases, spreadsheets and the like. In addition, the primary entity data 140 can include entity data 144 of the primary entity 193, such as a client number, a business name, geographic location such as an address, a name of an agent as the user 192, contact information for the agent such as an email address a text address, a telephone number, a fax number, and so on.

As such, the OSP computer system 195 may be configured to input the entity data 144 of the primary entity 193. The entity data 144 is already stored and known to the OSP computer system 195 at a time that the primary entity 193 became a client, the primary entity data 140 got defined, and so on. This inputting may be performed in addition, to that previous storing. For instance, the primary entity 193 may become identified from the dataset values of the dataset 135, when the dataset 135 is first received and parsed. Or, the primary entity 193 may be known already from the context by which the dataset 135 is received, e.g. by the primary entity 193 identifying itself as a client upon logging in to transmit the dataset 135, but without identifying itself in the dataset values.

The OSP computer system 195 may be further configured to select a digital rule responsive to at least one of the dataset values of the dataset 135. This selection can be performed in a number of ways.

In some embodiments, the OSP computer system 195 may access the stored digital resource rules 170. The digital rule can then be selected from the accessed stored digital resource rules 170. This selection may happen not responsive to the primary entity data 144, in other words, not responsive to which one the primary entity 193 is. In other words, this selection would be the same based on at least one of the dataset values regardless of which one the primary entity 193 is.

In other embodiments, the OSP computer system 195 may access a digital override rule that has been created by the primary entity 193, and has been stored under a set 146 of digital override rules. Three possible sample such override rules O_RULE1, 141, O_RULE2 142, and O_RULE3 143 are shown, and more such rules are implied by the dot-dot-dot. In this example, the override rule O_RULE2 142 is shown as having been created by the entity as intended to override the main M_RULE5 175 described below, per an override arrow 147. In such embodiments, the selected digital rule is the accessed digital override rule.

In more detail, the stored digital resource rules 170 are digital in that they are implemented for use by software. For example, these rules 170 may be implemented by the programs 131 and the data 138, or in a database and accessed by the programs 131 and the data 138. These rules 170 may be accessed responsive to receiving a dataset, such as the dataset 135. The digital resource rules 170 may include main rules. In this example, three sample digital main rules are shown explicitly, namely M_RULE5 175, M_RULE6 176, and M_RULE7 177. In this example, the digital resource rules 170 also include digital precedence rules P_RULE2 172 and P_RULE3 173, which can thus be further accessed by the OSP computer system 195. The digital resource rules 170 may include additional rules and types of rules, as indicated by the vertical dot-dot-dot.

In this example, a certain one of the digital main rules may be identified from among the accessed stored rules by the OSP computer system 195. In particular, dataset values of the dataset 135 can be tested, according to an arrow 171, against logical conditions of the digital main rules. In this example, the certain main rule M_RULE6 176 is thus identified, which is indicated also by the beginning of an arrow 178 that is described in more detail later in this document. Identifying may be performed based on whether the dataset value(s) meet conditions of the digital main rules are implemented. And, notably in this example, the certain main rule M_RULE6 176 is not overridden by any of the digital override rules 146.

For instance, some of the digital main rules can be expressed in the form of a logical "if-then" statement, such as: "if P then Q". In such statements, the "if" part, represented by the "P", is called the condition, and the "then" part, represented by the "Q", is called the consequent. Therefore, at least some of the digital main rules include respective conditions and respective consequents associated with the respective conditions, respectively. And, for a certain digital main rule, if its certain condition P is met, then its certain consequent Q is what happens or becomes applied. Of course, one or more of the digital resource rules 170 may have more than one conditions P that both must be met, and so on. And some of these digital resource rules 170 may be searched for, and grouped, according first to one of the conditions, and then the other.

A number of examples are possible for how to recognize that a certain condition of a certain digital resource rule is met by at least one of the dataset values. For instance, the certain condition could define a boundary of a region that is within a space. The region could be geometric, and be within a larger space. The region could be geographic, within the space of a city, a state, a country, a continent or the earth. The boundary of the region could be defined in terms of numbers according to a coordinate system within the space. In the example of geography, the boundary could be defined in terms of groups of longitude and latitude coordinates. In such embodiments, the certain condition could be met responsive to the characterized attribute of the dataset being in the space and within the boundary of the region instead of outside the boundary. For instance, the attribute could be a location of the entity, and the one or more dataset values of the dataset 135 that characterize the location could be one or more numbers or an address, or longitude and latitude. The condition can be met depending on how the one or more dataset values compare with the boundary. For example, the comparison may reveal that the location is in the region instead of outside the region. The comparison can be made by rendering the characterized attribute in units comparable to those of the boundary. For example, the characterized attribute could be an address that is rendered into longitude and latitude coordinates, and so on.

Where more than one of the digital main rules are found that could be applied, there are additional possibilities. For instance, the digital main rule may be thus identified also from at least one stored digital precedence rule, such as P_RULE2 172 or P_RULE3 173. In particular, the digital precedence rule may decide which one or more of the digital main rules is to be applied. To continue the previous example, if a dataset value of the dataset 135 that characterizes a location, and the location is within multiple overlapping regions according to multiple rules, the digital precedence rule may decide that all of them are to be applied, or less than all of them are to be applied.

The OSP computer system 195 may be further configured to produce, by applying the selected digital rule to at least one of the dataset values, an individual resource 179-1 for the dataset 135. Relating to the previously detailed explanation of digital rules, the individual resource may be produced, by the computer system applying the consequent of the selected digital rule. In fact, sometimes applying the consequent is more simply stated as "applying the rule". The individual resource can be a computational result, a document, etc., made, created or prepared for the user 192, the primary entity 193, the secondary entity 196, etc., on the basis of the attribute. As such, in some embodiments, the individual resource is produced by a determination and/or a computation. In the example of FIG. 1, the individual resource 179-1 is produced for the dataset 135, by the OSP computer system 195 applying the certain M_RULE6 176, as indicated by the arrow 178.

The individual resource 179-1 may be produced in a number of ways. For example, the certain consequent can be applied to one of the dataset values of the dataset 135. For instance, one of the values of the dataset 135 can be a numerical base value, e.g. B1, that encodes an aspect of the dataset 135, as mentioned above. In such cases, applying the certain consequent may include performing a mathematical operation on the base value B1. For example, applying the certain consequent may include multiplying the base value B1 with a number indicated by the certain consequent. Such a number can be, for example, a percentage, e.g., 1.5%, 3%, 5%, and so on. Such a number can be indicated directly by the certain rule, or be stored in a place indicated by the certain rule, and so on.

The individual resource 179-1 may be further reported back to the primary entity 193, as described above. For instance, in embodiments, an individual resource notification can be caused to be transmitted, e.g. via the network 188, by the OSP computer system 195. The individual resource notification can be about an aspect of the individual resource 179-1. The aspect can be that the individual resource 179-1 has been determined, where it can be found, e.g. by an address and/or a link, what it is, or at least a portion or a statistic of its content, a rounded version of it, and so on. The aspect can even be the individual resource, e.g. by itself or as an attachment. Of course, the planning should be that the recipient of the individual resource notification understands what it is being provided.

The individual resource notification can be transmitted to one of an output device and another device. The output device may be the screen of a local user or a remote user. The individual resource notification may thus cause a desired image, message, or other such notification to appear on the screen, such as within a Graphical User Interface (GUI) and so on. The other device can be the remote device, from which the dataset 135 was received, as in the example of FIG. 1. In particular, the OSP computer system 195 may cause the individual resource notification to be communicated by being encoded as a payload 137, which is carried by a response 187. The response 187 may be transmitted via the network 188 responsive to the received request 184. The response 187 may be transmitted to the computer system 190, or to OPF 189, and so on. As such, the other device can be the computer system 190, or the OPF 189, or the screen 191 of the user 192, and so on. In this example the single payload 137 encodes the entire individual resource notification, but that is not required. Similarly with what is written above about encoding datasets in payloads, the notification instead may be provided via two or more payloads, or in other cases the notification and at least one other notification may be included in the same single payload. Along with the aspect of the individual resource 179-1, it can be advantageous to embed in the payload 137 the identity value (ID) and/or one or more dataset values of the dataset 135. This will help the recipient correlate the response 187 to the request 184, and therefore match the received aspect of the individual resource 179-1 as the answer or other response to the appropriate dataset.

The individual resource 179-1 was produced by the OSP computer system 195 for the primary entity 193. As such, the individual resource 179-1 is shown as part of the primary entity data 140.

In embodiments, the OSP computer system 195 may be further configured to produce additional individual resources for the primary entity 193. Sample such additional individual resources are shown in FIG. 1 as 179-2, 179-3, 179-4, . . . . Such additional individual resources can be produced from respective other datasets (not shown), by a similar process of selecting a digital rule and applying the digital rule to each dataset, and so on.

The OSP computer system 195 may be further configured to derive a value of a total resource from the produced individual resource and from the additional individual resources. This may be performed at a time that is requested, periodically as planned, and so on. In the example of FIG. 1, a total resource 155 is derived from the produced individual resource 179-1 and from the additional individual resources 179-2, 179-3, 179-4, . . . . The value of the total resource may also be called a total value of the produced resources. The value of the total resource can be derived in a number of ways, for example by addition of numerical values of the produced individual resources.

The OSP computer system 195 may be further configured to generate a report document. A sample such report document 149 is shown in FIG. 1 and can be part of the primary entity data 140. In addition, and as described later in more detail, an access instruction 158 can be caused to be generated, and to be transmitted by the OSP computer system 195 according to a transmission arrow 159. Of course, the planning should be that the recipient of the access instruction 158 at the end of the transmission arrow 159 understands what it is being provided.

The access instruction 158 leads to substantiation materials of the report document 149, which is a relationship indicated by a reference arrow 101. In some embodiments, the generated report document mentions at least the entity data 144, includes report text, and mentions the value of the total resource 155 in context of the report text. An example is now described.

Figure 2:
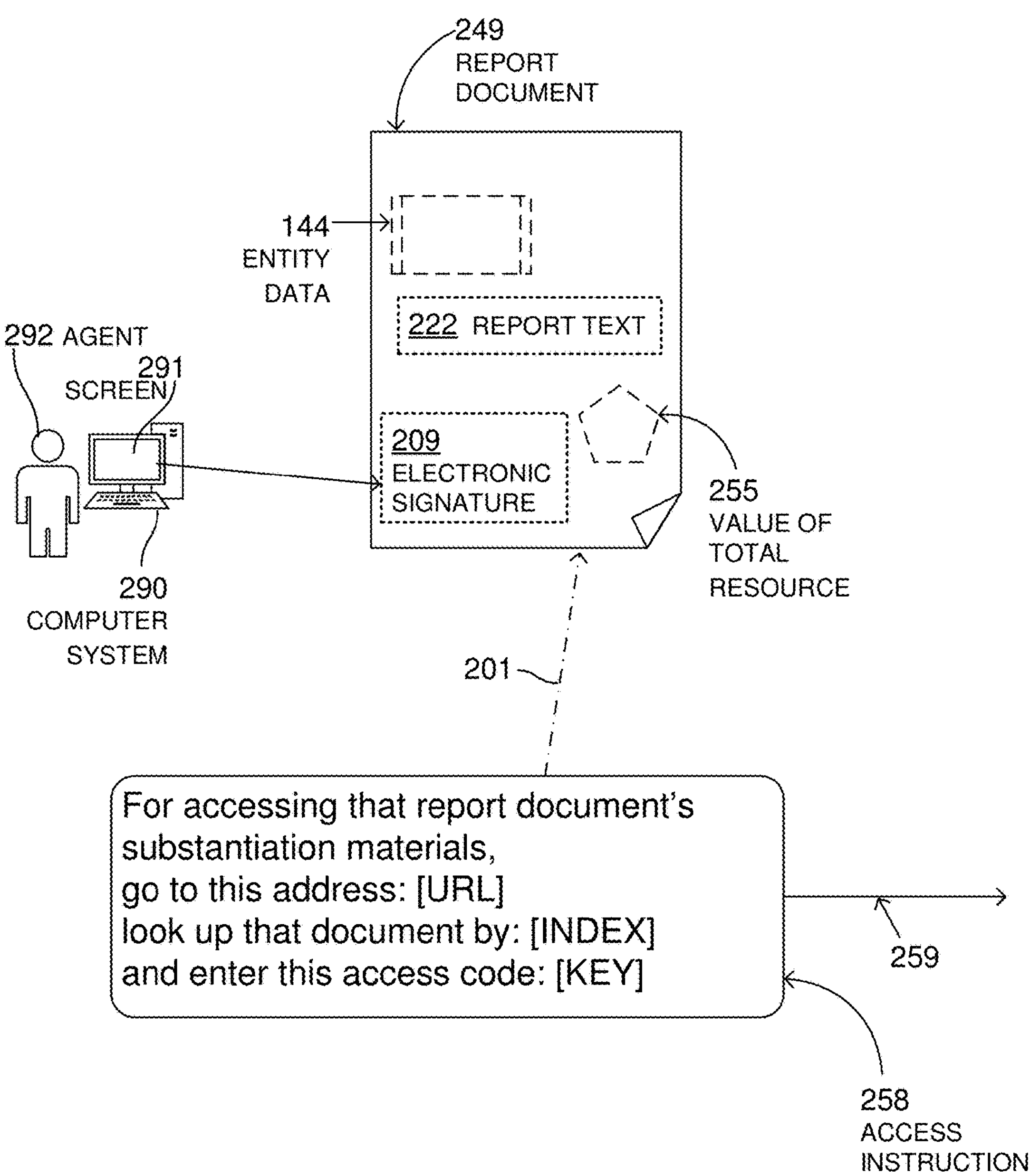
FIG. 2 is a diagram showing a sample report document and a sample access instruction that refers to the sample report document, according to embodiments.

FIG. 2 shows a report document 249 that can be an example of the report document 149 of FIG. 1. The report document 249 mentions the entity data 144, includes report text 222, and mentions the value of the total resource 255 in context of the report text 222. The report text 222 may include words that are standard and/or required. The value of the total resource 255 may be mentioned in context of such words.

In some embodiments, the OSP computer system 195 is further configured to enable an agent of the primary entity to sign the report document by the agent affixing an electronic signature to the report document. In the example of FIG. 1, an agent 292 could be user 192 of FIG. 1. The agent 292 uses a computer system 290 that has a screen 291. In such embodiments, the OSP computer system 195 can enable the agent 292 to sign the report document 249 by causing an image of the report document 249 to be presented on the screen 291, and enabling the agent 292 to affix their electronic signature 209 to the presented report document 249. The electronic signature may be thus affixed in a number of ways, for instance drawing out a signature with an input device such as a mouse, typing one's name in a special box, importing a separately created image of one's signature, and so on.

FIG. 2 also shows an access instruction 258 by itself, which can be an example of the access instruction 158 of FIG. 1. The access instruction 258 leads to substantiation materials of the report document 249, which is a relationship indicated by a reference arrow 201. The access instruction 258 can be transmitted according to a transmission arrow 259, examples of which are described later. The access instruction 258 is typically not needed by the agent 292 or the user 192, because they typically have sign-in access to documents and data that substantiate elements of the report document 249, such as how the value of the total resource 255 is arrived at, and so on.

The OSP computer system 195 may be further configured to prepare an instantiation enabling viewing a data record. FIG. 1 shows a sample data record 148, which the instantiation can enable viewing. In some embodiments, the data record includes at least one of the dataset values, the produced individual resource, and at least some of the additional individual resources. In the example of FIG. 1, the data record 148 includes, or receives copies of, the dataset values of the dataset 135, the produced individual resource 179-1, and the additional individual resources 179-2, 179-3, 179-4. In some embodiments, the data record also includes the value of the total resource 155.

Figure 3:
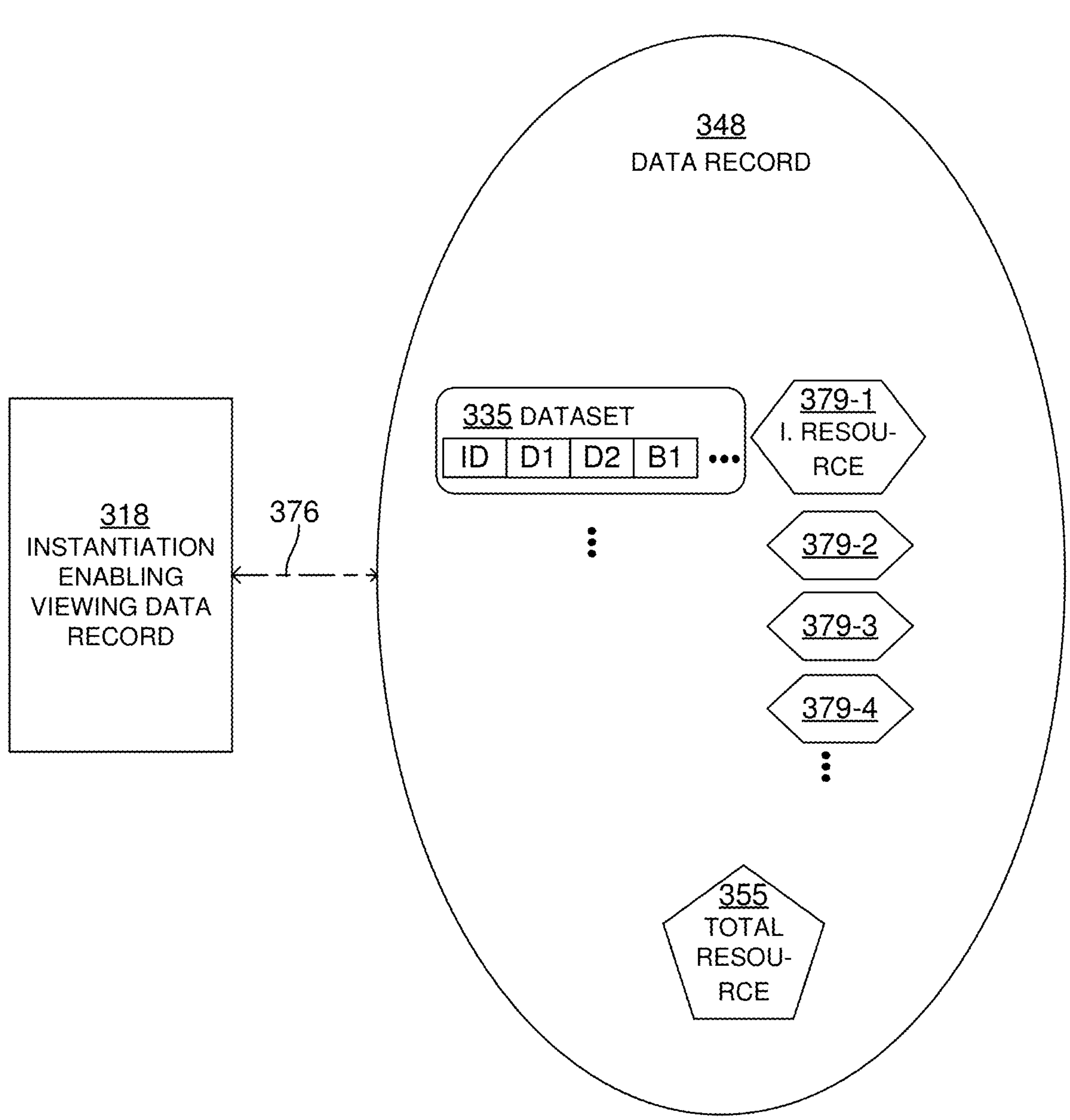
FIG. 3 is a diagram showing sample elements of a data record of FIG. 1, in correlation with a corresponding instantiation enabling viewing the data record, according to embodiments.

FIG. 3 shows sample elements of a data record 348 according to embodiments. The data record 348 includes the dataset values of a dataset 335, which can be as the dataset 135. The data record 348 also includes produced individual resources 379-1, 379-2, 379-3, 379-4. The data record 348 also includes the value of the total resource 355. All of these instances are versions where the OSP computer system 195 prepares the data record, either as part of producing the individual resources 379-1, 379-2, 379-3, 379-4, or as part of producing the report document, or as part of preparing the substantiation materials, or any combination thereof.

FIG. 3 also shows a sample instantiation enabling viewing the data record 318, which corresponds to the elements of the data record 348 according to a correspondence arrow 376. Various possible relationships of the instantiation 318 with the elements of the data record 348 are described later in this document. The decision of where to store the instantiation 318 may depend on who is intended to have access to it in the future. In some embodiments, it is preferred to make the instantiation 318 accessible only to the primary entity 193 and to its users and/or agent(s). In other embodiments, it is preferred to make the instantiation 318 accessible also to another entity, as described later in this document, but not to the general public. In such embodiments, the instantiation can be stored in an obscured URL, for instance one with many digits, which would be thus findable by someone who knows all the digits in advance. Or, the instantiation can be stored behind an easy-to-find gateway, but one that requires a password to let an authorized visitor through, as described later in this document.

In some embodiments, the instantiation enabling viewing the data record is prepared only when requested by the primary entity. In such embodiments, the OSP computer system 195 may be further configured to input from the primary entity a substantiation request, and the instantiation enabling viewing the data record is prepared only responsive to the substantiation request having been inputted. Examples are now described.

Figure 4A:
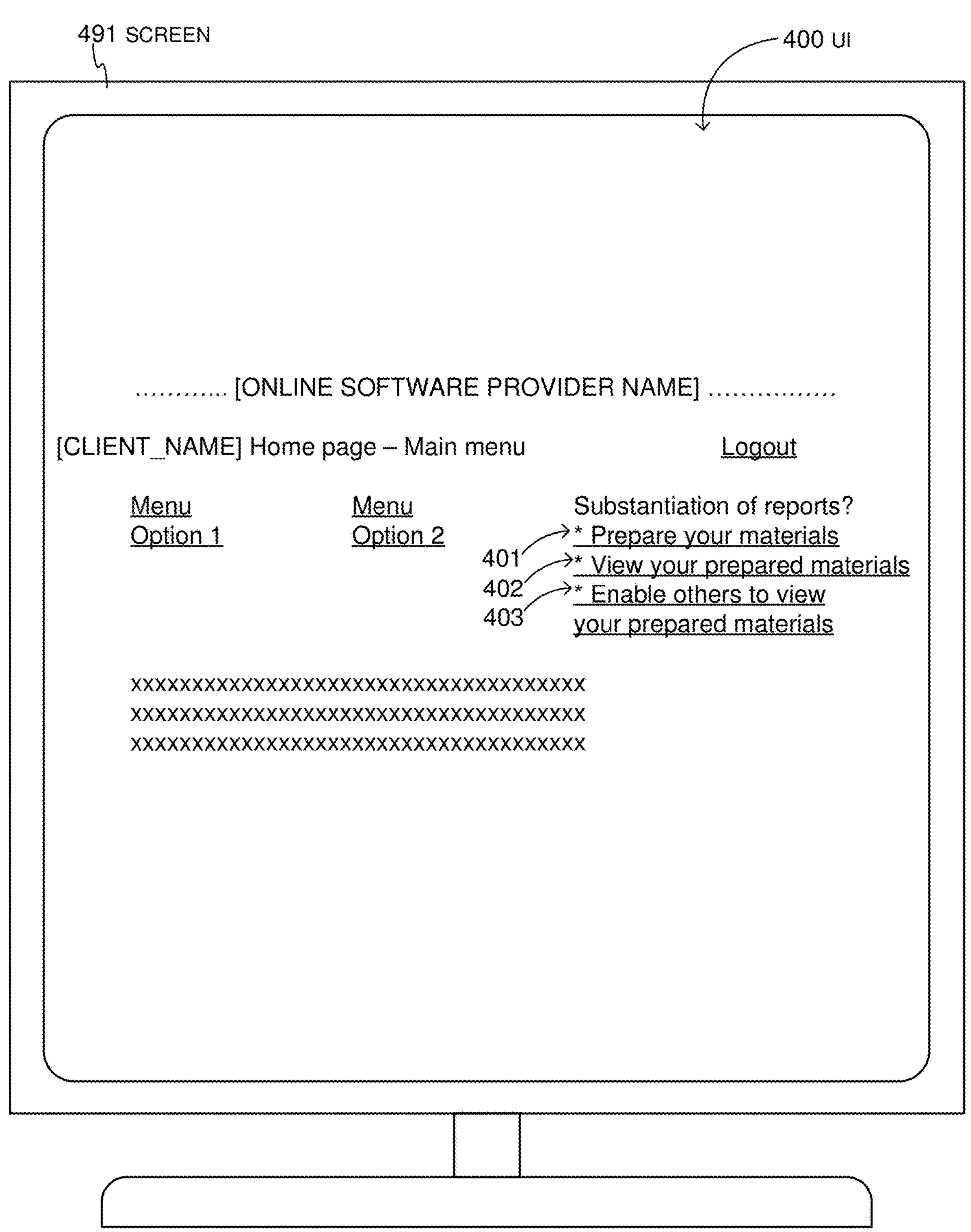
FIG. 4A is a diagram showing a sample User Interface (UI) for a user and/or agent of a primary entity of FIG. 1, the UI providing selectable options through which the user and/or agent is enabled to input various requests regarding substantiation materials for one or more report documents, according to some embodiments.

FIG. 4A is a diagram showing a screen 491, which can be the screen 191, 291 of the user 192 and/or agent 292. The OSP computer system 195 may cause a User Interface (UI) 400 to be projected onto the screen 491.

The UI 400 shows a home page with a banner for the provider's name, a main menu header, menu options, and option to log out. In the right-most, the UI 400 shows a menu option 401 for the user to input a request to prepare one's materials for substantiation of one or more report documents, and which therefore is an embodiment of a substantiation request. The UI 400 also shows a menu option 402 for the user to view their previously prepared materials for substantiation of report document(s). The UI 400 further shows a menu option 403 for the user to enable others to view their previously prepared materials for substantiation. The menu option 403 may enable the user to send the access instruction 158 expressly, and separately from the report document 149. Other options may be planned from the menu option 401, as now described.

Figure 4B:
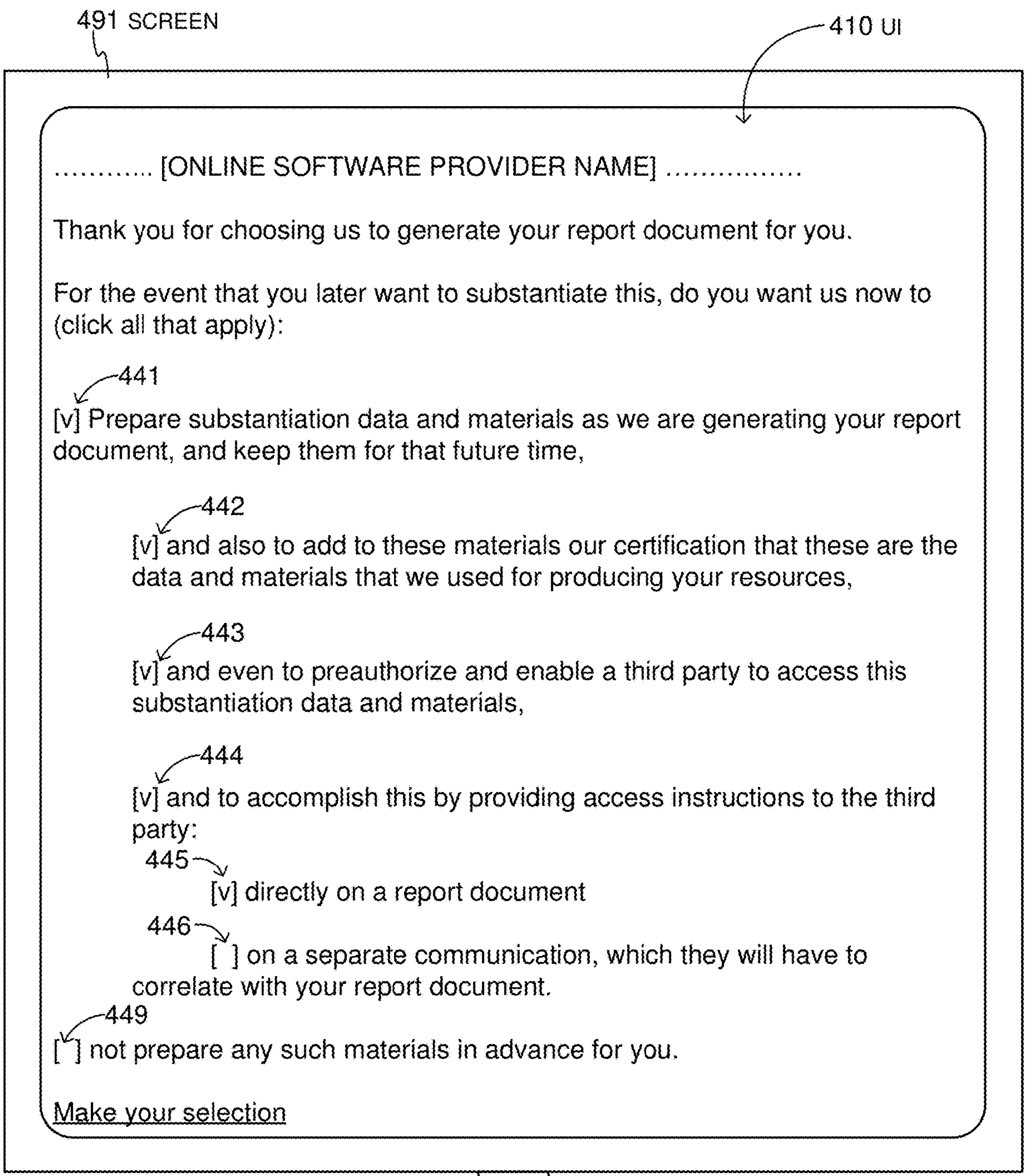
FIG. 4B shows a sample User Interface (UI) that may appear after a specific option in the UI of FIG. 4A has been selected, according to some embodiments.

The menu option 401 may be more related to one-time settings. Selecting it results in the view of FIG. 4B, which shows the next UI 410. The UI 410 enables various options 441, 442, 443, 444, 445, 446, 449 to be checked, depending on what the user wants. Some of these options may be logically mutually exclusive, and so on. The option 441 is a substantiation request. It will be understood that more UIs may be needed than the UI 400 and UI 410 for implementing these tasks.

The OSP computer system 195 may be further configured to make available to the primary entity for viewing the signed report document and the instantiation enabling viewing the data record. Both can be made available for viewing on the screen 491, such as with a suitable UI that permits viewing data and records of the primary entity. For instance, the signed report document could be viewable immediately upon being signed, as described earlier. And, the instantiation can be viewable from option 402 of UI 400, by having the prepared materials include that instantiation.

Referring back to FIG. 3, options for the instantiation 318 are now described. In some embodiments, the instantiation enabling viewing the data record includes a version of one or more data record documents that include at least portions of the data record. In other words, one or more data record documents include portions of the data record, or all of it, and the data record includes a version of one or more data record documents. This can be implemented in a number of ways.

Figure 5:
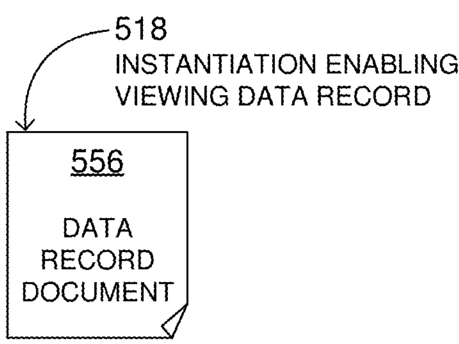
FIG. 5 is a diagram showing a sample instantiation enabling viewing the data record of FIG. 1, according to embodiments.

In some embodiments, the version includes an original of the one or more data record documents. As seen in the example of FIG. 5, an original data record document 556 is also an instantiation 518 enabling viewing the data record. Using the original documents avoids the need of copying, but more care is needed to prevent confusion if the original documents are later modified in view of corrections or restatements, after a report document has been prepared, signed, certified and so on.

Figure 6:
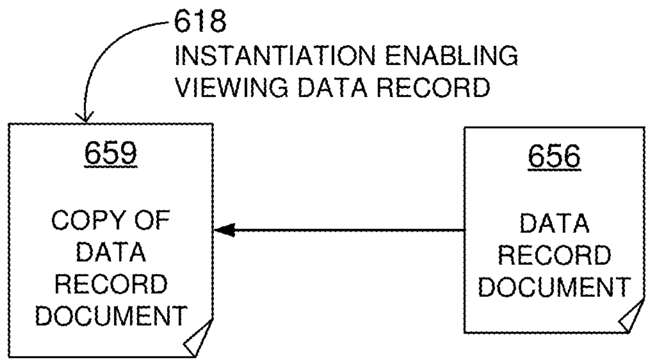
FIG. 6 is a diagram showing another sample instantiation enabling viewing the data record of FIG. 1, according to embodiments.

In some embodiments, the version includes a copy of the one or more data record documents. As seen in the example of FIG. 6, an original data record document 656 is copied into a copy 659, and the copy 659 is also an instantiation 618 enabling viewing the data record. In such embodiments, the OSP computer system 195 may be further configured to prepare the one or more data record documents, such as the copy 659.

In some embodiments, the preparing of the instantiation enabling viewing the data record includes generating a viewable page, which is viewable via a User Interface (UI). In such embodiments, the instantiation enabling viewing the data record includes a link on the viewable page, the link directing to a version of one or more data record documents that include portions of the data record. The viewable page can be a hyper-text markup language (html) file, part of a document, and so on. This can be implemented in a number of ways.

Figure 7:
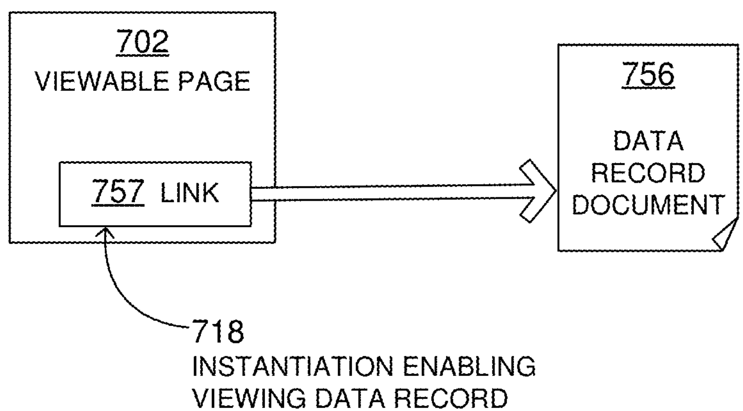
FIG. 7 is a diagram showing one more sample instantiation enabling viewing the data record of FIG. 1, according to embodiments.

In some embodiments, the version includes an original of the one or more data record documents. As seen in the example of FIG. 7, a viewable page 702 is generated, which is viewable via a UI. The viewable page 702 has a link 757 that directs to a version of a data record document 756 that is an original of the one or more data record documents. In this example, the instantiation enabling viewing the data record 718 is the link 757.

Figure 8:
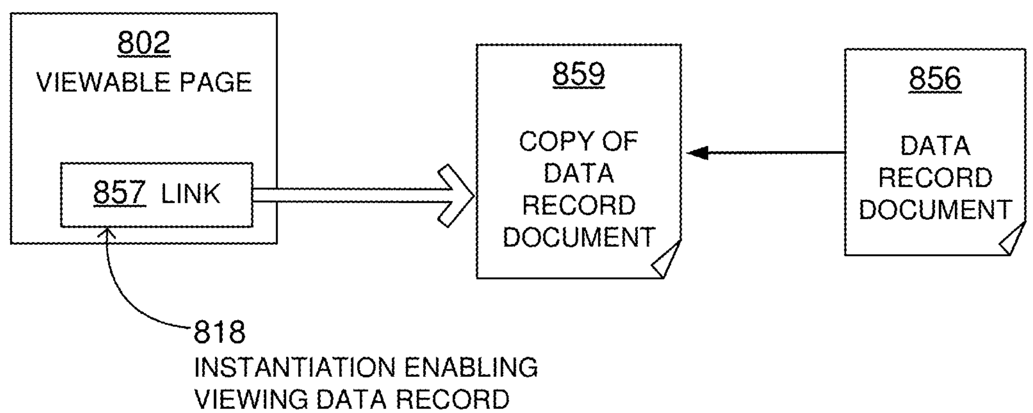
FIG. 8 is a diagram showing another sample instantiation enabling viewing the data record of FIG. 1, according to embodiments.

In some embodiments, the version includes a copy of the one or more data record documents. As seen in the example of FIG. 8, an original data record document 856 is copied into a copy 859. A viewable page 802 is generated, which is viewable via a UI. The viewable page 802 has a link 857 that directs to the copy 859, which is a version of the data record document 856. In this example, the instantiation enabling viewing the data record 818 is the link 857.

In the above examples, the materials prepared for substantiation were an instantiation enabling viewing a data record. In fact, the prepared materials could include more than that instantiation, and/or instantiations enabling viewing additional elements distinct from the data record. In particular, in some embodiments, the OSP computer system 195 may be further configured to prepare an additional instantiation enabling viewing an additional element distinct from the data record. In such embodiments, the additional instantiation and the instantiation enabling viewing the data record can be stored in a substantiation gallery storage space. A sample substantiation gallery storage space 100 is shown in FIG. 1, as part of the primary entity data 140. In such embodiments, the making available to the primary entity for viewing is performed by making available the substantiation gallery storage space for viewing. The substantiation gallery storage space may have a single network address for all its contents. A term for a network address is Uniform Resource Locator (URL). The instantiation enabling viewing the data record can be prepared directly in the substantiation gallery storage space, or the prepared instantiation enabling viewing the data record can be copied to the substantiation gallery storage space. Similarly, if a viewable page is used as described for FIGS. 7 and 8, the OSP computer system 195 may be further configured to prepare an additional document distinct from the viewable page and from the instantiation enabling viewing the data record, and possibly also prepare a copy of that additional document. In such embodiments, the viewable page further includes an additional link directing to the additional document, or to the copy if one is prepared.

While the substantiation gallery storage space 100 is strictly optional, it is preferred as it provides conceptually to the user a single space for all elements and materials to substantiate a report document. Examples are now described of additional possible instantiations, and/or instantiations enabling viewing additional elements distinct from the data record.

Figure 9:
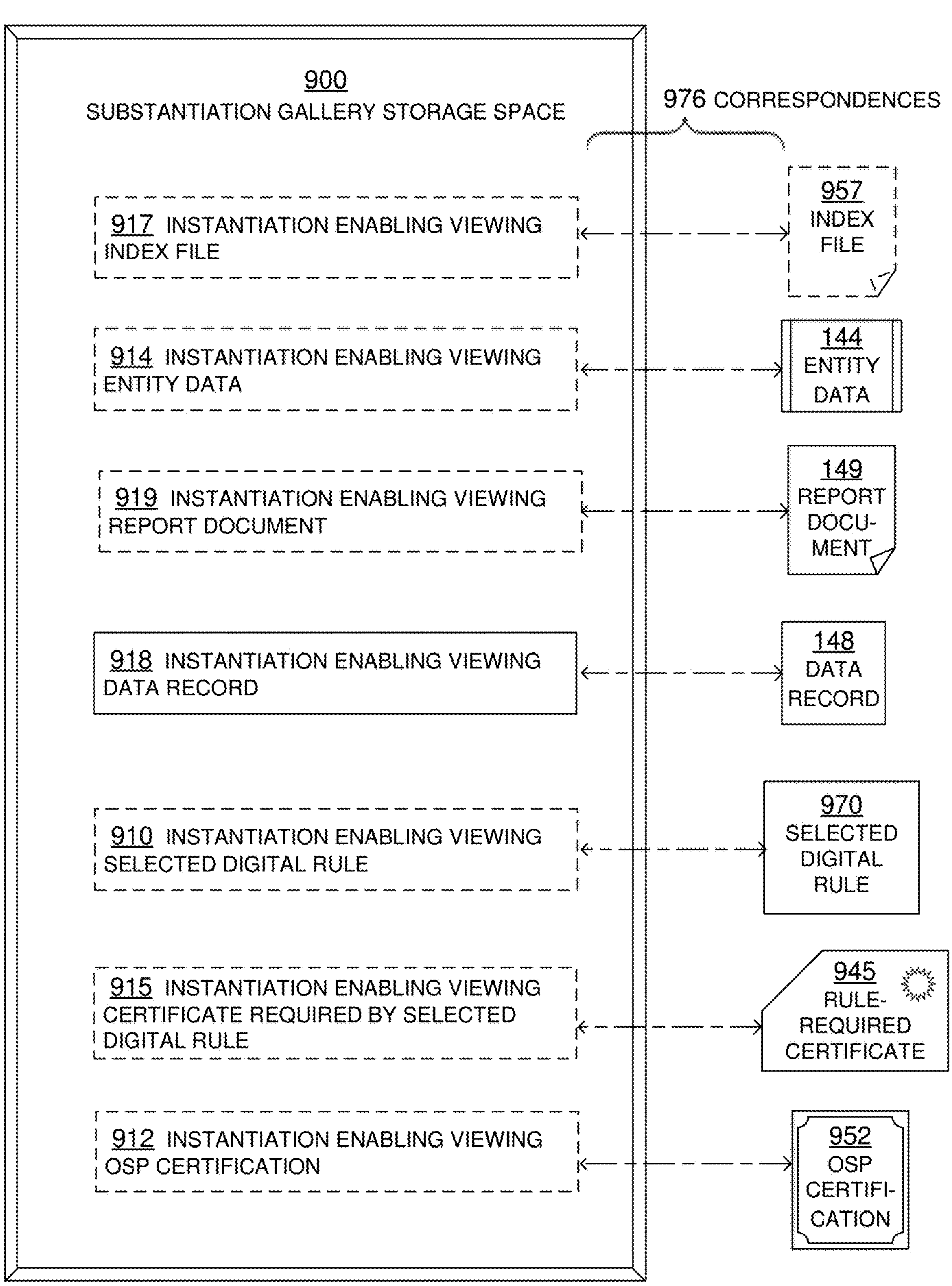
FIG. 9 is a diagram showing a sample instantiation enabling viewing a data record, plus other optional sample instantiations, all implemented in an optional substantiation gallery storage space, according to embodiments.

FIG. 9 shows a sample substantiation gallery storage space 900, or gallery 900 for short. The gallery 900 includes instantiations that have respective correspondences 976 with what they enable viewing. The description starting with FIG. 3 applies also to what is shown in FIG. 9, both as to what these instantiations could be and as to the meaning of the correspondences 976.

The gallery 900 optionally includes an instantiation enabling viewing an index file 917. The instantiation 917 has a correspondence 976 with a correspondingly optional index file 957. An example of such an index file is given later in this document.

The gallery 900 optionally also includes an instantiation enabling viewing entity data 914. The instantiation 914 has a correspondence 976 with the entity data 144.

The gallery 900 moreover optionally includes an instantiation enabling viewing a report document 919, which has a correspondence 976 with the report document 149. This is optional because it could be superfluous as someone who has access to the gallery 900 already has access to the report document 149, but the instantiation 919 may nevertheless be provided for confirmation.

The gallery 900 additionally includes an instantiation enabling viewing a data record 918, similar to what was mentioned above. The instantiation 918 has a correspondence 976 with the data record 148.

The gallery 900 also optionally includes an instantiation enabling viewing a selected digital rule 910, which has a correspondence 976 with a selected digital rule 970. Examples of such an instantiation 910 and corresponding selected digital rules are given later in this document.

The gallery 900 moreover optionally includes an instantiation enabling viewing a certificate required by a selected digital rule 915. The instantiation 915 has a correspondence 976 with a rule-required certificate 945, which is also seen in FIG. 1. Sometimes a specific rule is selected responsive to such a certificate being available, else a different rule is selected.

The gallery 900 additionally optionally includes an instantiation enabling viewing an OSP certification 912. The instantiation 912 has a correspondence 976 with an optional OSP certification 952, which is also seen in FIG. 1. The OSP certification 952 is for the event where an OSP certifies that the OSP generated the report document 149 on behalf of the primary entity 193 according to the selected digital rule 970.

In some embodiments, the index file 957 is a viewable page, and all the other instantiations are links from the viewable page. An example is now described.

Figure 10:
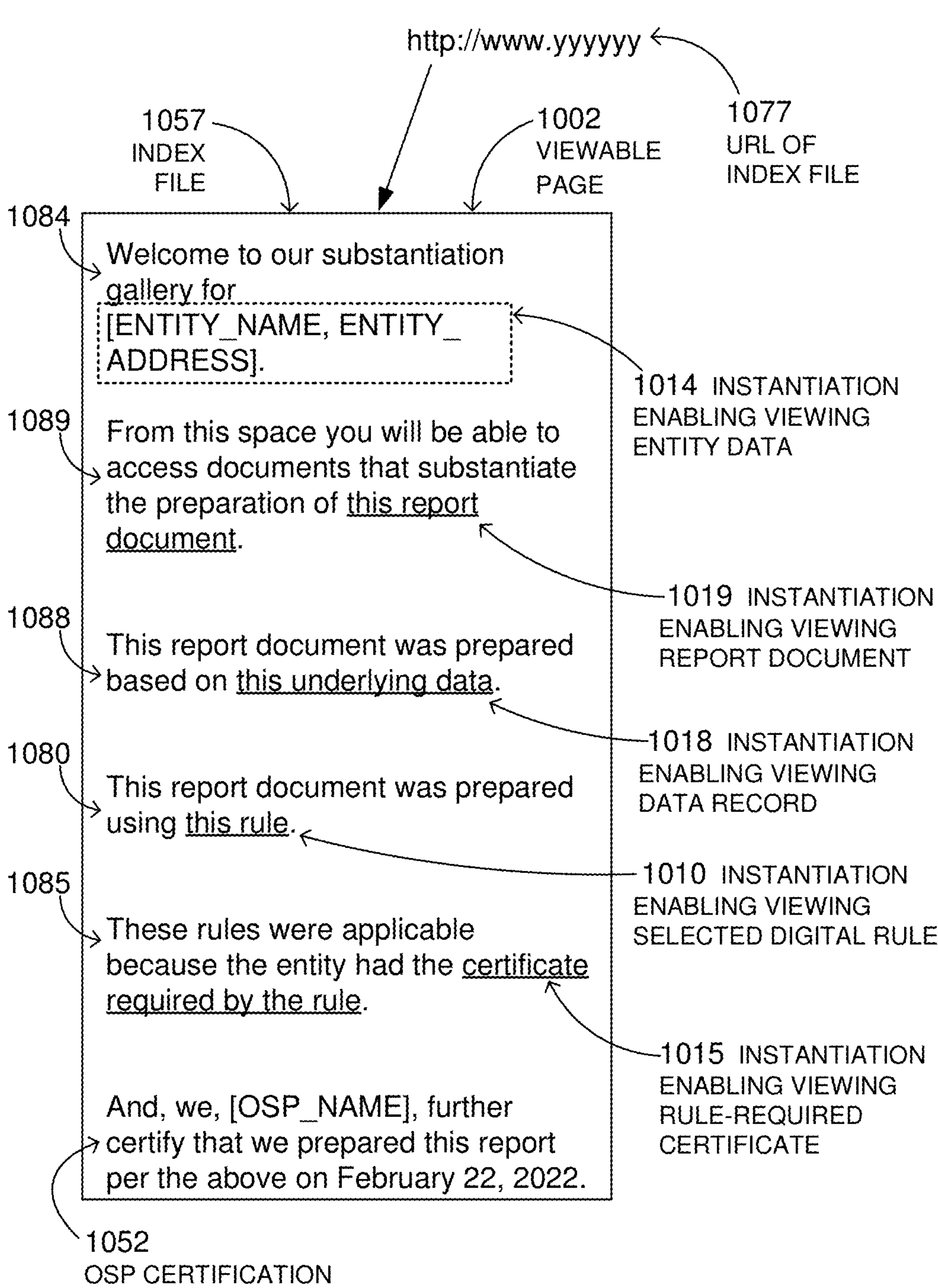
FIG. 10 is a diagram showing sample implementations of instantiations of FIG. 9, according to embodiments.

FIG. 10 shows an index file 1057 that is implemented as a viewable page 1002. The index file 1057 is called index because it serves as a navigation center for the substantiation materials. Optionally only, the index file 1057 could also be an index file in a folder of viewable pages, which is looked up preferentially from the access instruction. The index file 1057 has a sample URL 1077. The URL 1077 can be part of an access instruction according to some embodiments. In other embodiments, however, the access instruction defines a URL of a third-party authorization gateway, and the URL 1077 is imbedded in the gateway and accessed upon approval of the furnished credentials.

The viewable page 1002 includes a paragraph 1084, and a field 1014 in context of the paragraph 1084. The field 1014 is an instantiation enabling viewing entity data, and is an implementation of the instantiation 914 of FIG. 9. The field 1014 is also an example of a parameter value import field placed within the viewable page 1002 in context with welcoming presentation text ("Welcome to . . . "). The parameter value import field 1014 is configured to import and display elements of the entity data 144.

The viewable page 1002 also includes a paragraph 1089, which includes a link 1019. The link 1019 is an instantiation enabling viewing a report document, and is an implementation of the instantiation 919 of FIG. 9.

The viewable page 1002 moreover includes a paragraph 1088, which includes a link 1018. The link 1018 is an instantiation enabling viewing a data record, and is an implementation of the instantiation 918 of FIG. 9.

The viewable page 1002 further includes a paragraph 1080, which includes a link 1010. The link 1010 is an instantiation enabling viewing a selected digital rule, and is an implementation of the instantiation 910 of FIG. 9.

The viewable page 1002 also includes a paragraph 1085, which includes a link 1015. The link 1015 is an instantiation enabling viewing a rule-required certificate, and is an implementation of the instantiation 915 of FIG. 9.

The viewable page 1002 moreover includes a paragraph 1052, which itself is an OSP certification 1052. The OSP certification 1052 is also an instantiation enabling viewing an OSP certification, and is further an implementation of the instantiation 912 of FIG. 9. In particular, the OSP computer system 195 may be further configured to prepare an OSP certification about the value of the total resource being derived from the produced individual resource and from the additional individual resources, and by the application of the selected digital rule, and make available for viewing to the primary entity the OSP certification. This can be performed as shown above. Moreover, in such embodiments, the preparing of the OSP certification about the value of the total resource includes generating a viewable page, such as page 1002, which is viewable via a User Interface (UI), and the viewable page includes certification text referencing the OSP, such as the certification text of the paragraph 1052. The shown certification text is about executing the production, computations, etc. per the data and per the selected rules. The scope of the certification text may extend also to the selection of the digital rules, except perhaps where override rules by the primary entity were used.

In some embodiments, a data record document includes captions for explaining what is presented. In other embodiments, the various instantiations include suitable presentation text and one or more parameter value import fields. For instance, preparing an instantiation enabling viewing the data record may include generating a viewable page, which is viewable via a User Interface (UI). Such a viewable page may include data record presentation text. The viewable page may also include a parameter value import field placed in context with the data record presentation text. The parameter value import field can be configured to import and display an element of the data record. An example is now described.

Figure 11:
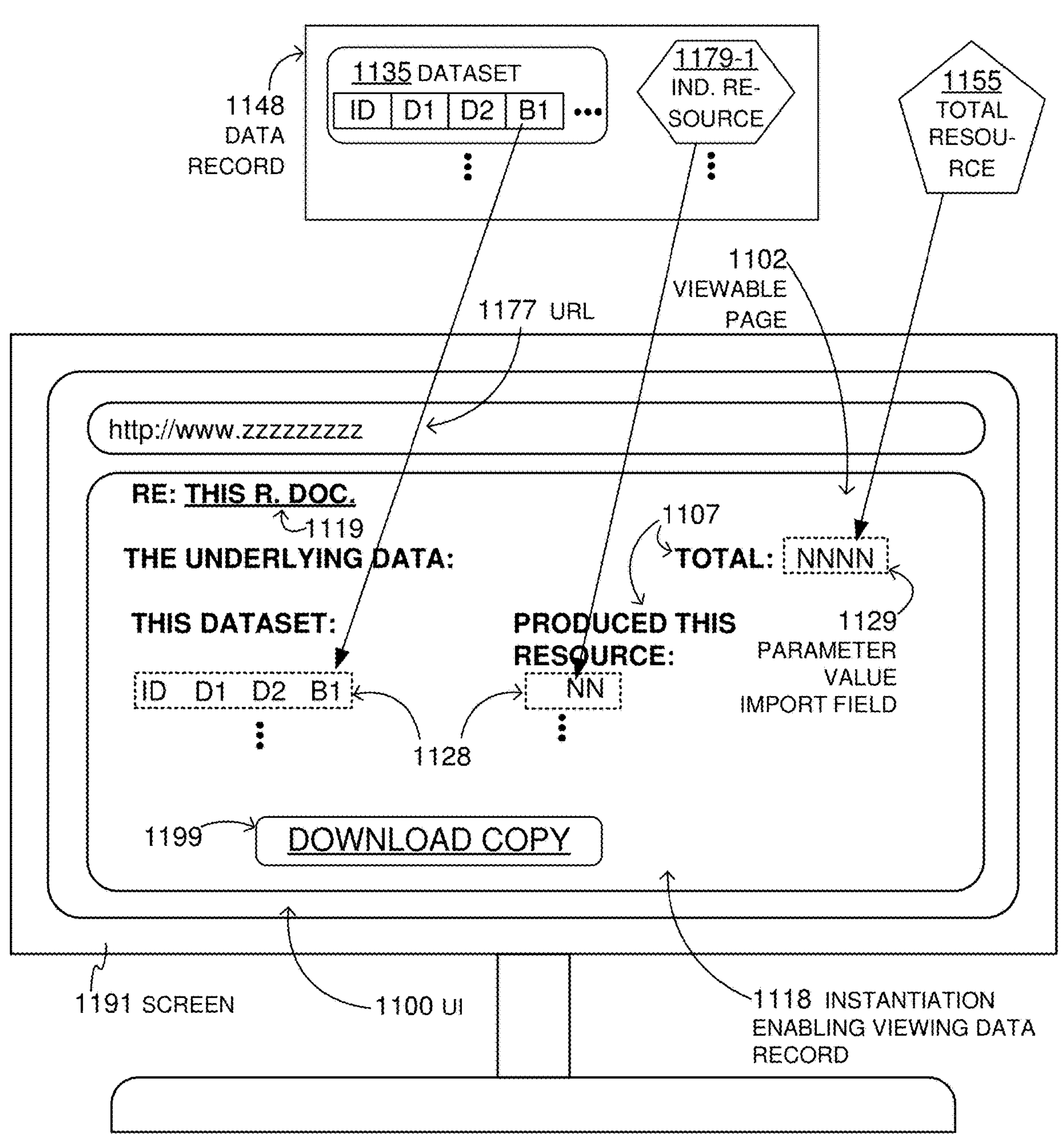
FIG. 11 is a diagram showing an example of the instantiation enabling viewing a version of the data record of FIG. 3 in a User Interface (UI), according to embodiments.

FIG. 11 shows, at the top, a data record 1148 that can be as the data record 348. In particular, the data record 1148 includes a dataset 1135, and possibly more datasets as indicated by the vertical dot-dot-dot. The data record 1148 also includes an individual resource 179-1, and possibly more individual resources as indicated by the vertical dot-dot-dot. A total resource 1155 is not shown as part of the data record 1148, but it could be, as it was in FIG. 3.

FIG. 11 also shows a screen 1191 with a UI 1100 at a sample URL 1177. The URL 1177 could be part of an access instruction according to some embodiments. In other embodiments, however, the UI 1100 is reached from an index page, and its URL is thus not known from the access instruction.

The UI 1100 shows a viewable page 1102, which is also an instantiation enabling viewing the data record 1118. The viewable page 1102 includes data record presentation text 1107 in bold. Near its top left, the viewable page 1102 also includes an instantiation enabling viewing a report document 1119, in the form of a link 1119.

The viewable page 1102 also includes parameter value import fields 1128, 1129 placed in context with the data record presentation text 1107. The parameter value import field 1128 is configured to import and display an element of the data record 1148. The parameter value import field 1129 is configured to import and display a value of the total resource 1155. In some embodiments, a viewable page such as the viewable page 1102 further includes a button 1199 enabling a download of the displayed elements of the data record.

The OSP computer system 195 may be further configured to prepare an instantiation enabling viewing a version of the selected digital rule, and make available for viewing to the primary entity the instantiation enabling viewing the version of the selected digital rule. An example of such an instantiation was the instantiation 910, within the gallery 900.

In some embodiments, the preparing of the instantiation enabling viewing the version of the selected digital rule includes generating a viewable page that is viewable via a User Interface (UI), the viewable page including rule presentation text. In such embodiments, the viewable page also includes a rule import field placed in context with the rule presentation text. The rule import field can be configured to import and display an aspect of the selected digital rule. Examples are now described.

Figure 12:
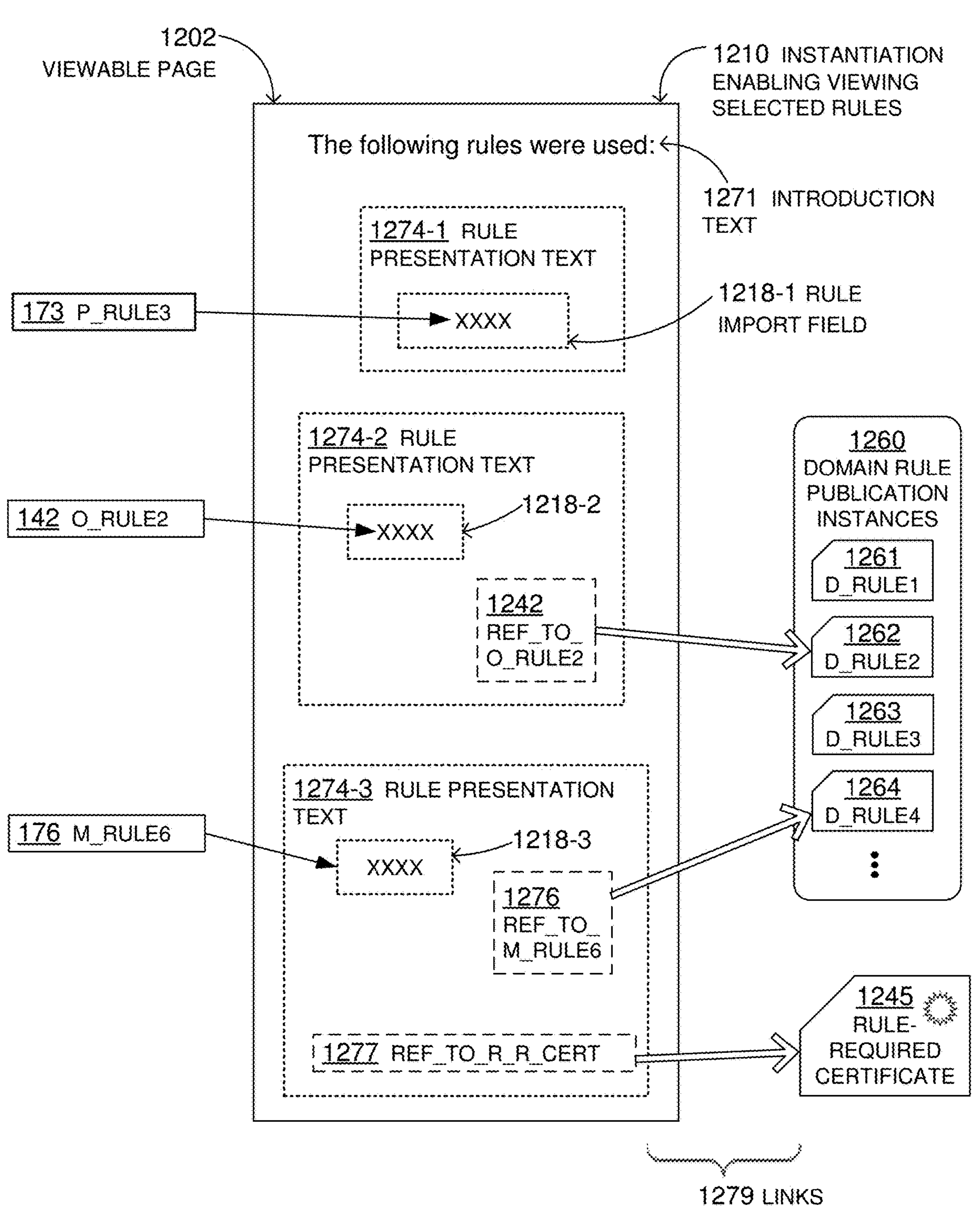
FIG. 12 is a diagram showing sample details of an instantiation enabling viewing a selected digital rule of FIG. 9, according to embodiments.

FIG. 12 shows an instantiation enabling viewing selected digital rules 1210, which is an example of the instantiation 910. The instantiation 1210 is implemented as a viewable page 1202. The selected digital rules are rules P_RULE3 173, O_RULE2 142, and M_RULE6 176.

The viewable page 1202 includes introduction text 1271. The viewable page 1202 also includes rule presentation texts 1274-1, 1274-2, 1274-3, and rule import fields 1218-1, 1218-2, 1218-3 placed in context with their respective rule presentation texts 1274-1, 1274-2, 1274-3. The rule import fields 1218-1, 1218-2, 1218-3 import and display respective aspects of the selected digital rules P_RULE3 173, O_RULE2 142, and M_RULE6 176. The aspect of the rule could be, for instance, a selected value, a variable name, and so on; the aspects imported into the rule import fields 1218-1, 1218-2, 1218-3 complete the reading of the rule presentation texts 1274-1, 1274-2, 1274-3, due to the placement being in context, as per the above. Such placement in context was also seen in FIG. 11, where values imported into import fields complete the reading experience.

In some embodiments, references are added to domain rules published by domains. For instance, in the example of FIG. 12, a domain has domain rule publication instances 1260. These can be texts in websites, found in html, documents, and so on. In the example of FIG. 12, the instances 1260 include domain rule publications D_RULE1 1261, D_RULE2 1262, D_RULE3 1263, D_RULE4 1264, and more per the dot-dot-dot. In such embodiments, there can be links 1279 from the rule presentation texts to the domain rule publications. The links 1279 can refer to the selected digital rules, and point to the domain rule publications. For instance, there is a reference 1242 that refers to the selected digital rule O_RULE2 142 and leads to the domain rule publication D_RULE2 1262; as this is an override rule, the reference 1242 would be entered by the primary entity and stored in the primary entity data 140 in association with the override rule. There is also a reference 1276 that refers to selected digital rule M_RULE6 176 and leads to the domain rule publication D_RULE4 1264. In turn, the references 1242, 1276 are placed in context with their respective texts 1274-2, 1274-3, they can be the starts of the respective links and so on.

The OSP computer system 195 may be further configured to prepare an instantiation enabling viewing a certificate required by the selected digital rule and distinct from the report document. In such embodiments, the certificate is sometimes signed by an agent of the primary entity. The OSP computer system 195 may be further configured to make available for viewing to the primary entity the instantiation enabling viewing the certificate required by the selected digital rule. An example of such an instantiation was the instantiation 915, within the gallery 900.

Another example is shown in FIG. 12. The selected digital rule M_RULE6 176 requires a certificate, and such a certificate 1245 is indeed provided. A reference 1277 to the rule-required certificate 1245 is placed in context of the rule presentation text 1274-3, and uses a link 1279.

Returning to FIG. 1, the OSP computer system 195 generates the report document 149 for the primary entity 193. The OSP computer system 195 may then store the report document 149 together with the primary entity data 140 that the OSP computer system 195 has for the primary entity 193. Alternately or in addition, the OSP computer system 195 may send the report document 149 to the primary entity 193, or notify them how to access it. All this can be coordinated with any signing of the report document 149.

In some embodiments, the primary entity 193 sends the report document 149 to another entity, such as a domain entity, not shown in FIG. 1. A more detailed example is now described.

Figure 13:
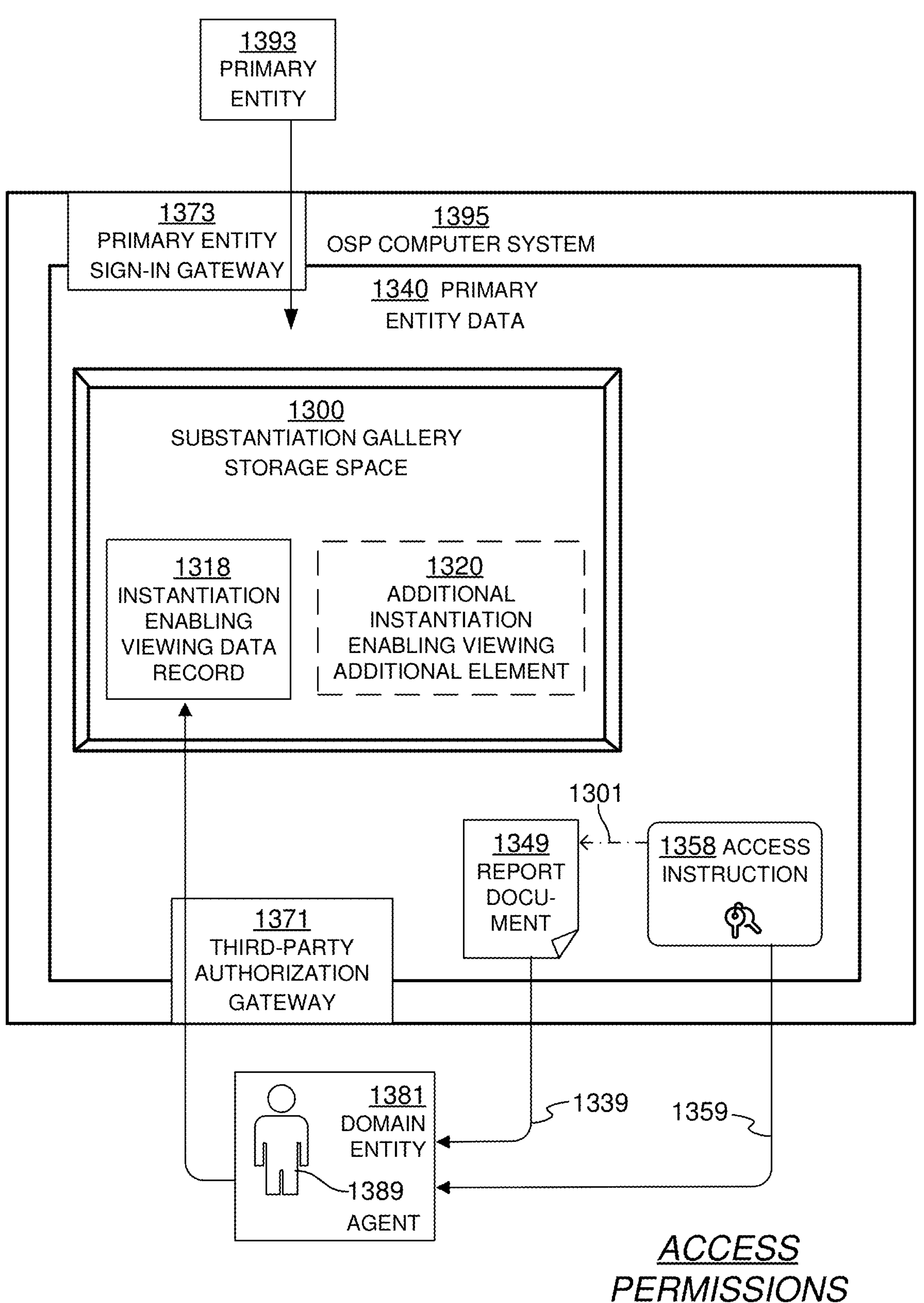
FIG. 13 is a diagram showing entities and access to documents and data according to embodiments.

FIG. 13 shows an OSP computer system 1395 that is an example of the OSP computer system 195. The OSP computer system 1395 has a primary entity sign-in gateway 1373, which can permit sign-in by requesting credentials like a user name, a password, optionally additional means of authentication, and so on. A primary entity 1393 can be as the primary entity 193. The primary entity 1393 may log in to the OSP computer system 1395 via the primary entity sign-in gateway 1373, and enter its data. The OSP computer system 1395 stores, for the primary entity 1393, primary entity data 1340, which can be as the primary entity data 140.

In the example of FIG. 13, fewer of the primary entity data 1340, are shown than in FIG. 1, to conserve space. In particular example, the primary entity data 1340 includes a report document 1349, which can be as the report document 149. The primary entity data 1340 also includes an instantiation enabling viewing a data record 1318, which can be as the instantiation 318. In this example, the instantiation 1318 is provided in an optional substantiation gallery storage space 1300. The primary entity data 1340 further includes an optional additional instantiation enabling viewing an additional element 1320, in which the additional element is distinct from the data record. The additional instantiation 1320 is also stored as a content in the substantiation gallery storage space 1300. Examples of the additional instantiation 1320 were given in FIG. 9.

In some embodiments, the primary entity 1393 makes the signed report document 1349 available to a domain entity 1381, which is different, distinct from the primary entity 1393, and from the OSP 198. In some of these embodiments, the primary entity 1393 may itself send the signed report document 1349 to the domain entity 1381, either in physical form or electronically.

In other embodiments the OSP computer system 195, 1395, acting on behalf of the primary entity 1393, makes the signed report document 1349 available to the domain entity 1381 according to a transmission arrow 1339. The transmission arrow 1339 may be implemented by the OSP computer system 195, 1395 uploading the signed report document 1349 to a server of the domain entity 1381, or emailing it as an attachment, and so on. Of course, before doing that the OSP computer system 195, 1395, may have first received from the primary entity 1393 a request and authorization to do so. An example of such a request and authorization was implemented by the option 443 in the UI 410 of FIG. 4B.

In some embodiments, the OSP computer system 195 is further configured to make available for viewing to the domain entity the instantiation enabling viewing the data record. For instance, the OSP computer system 195 may upload elements of the data record, send them as email attachments, and so on.

In some of these embodiments, the instantiation enabling viewing the data record is made available for viewing to the domain entity by making available to the domain entity an access instruction. The access instruction may render accessible to an agent of the domain entity the instantiation enabling viewing the data record. A sample access instruction 158 was seen in FIG. 1, and the transmission arrow 159 indicates that the instruction 158 was being sent to the agent of the domain entity. Also, in FIG. 13, an access instruction 1358 is seen, which leads to substantiation materials of the report document 1349, as per a reference arrow 1301. The access instruction 1358 is transmitted according to the transmission arrow 1359 to the domain entity 1381. The access instruction 1358 includes information such as credentials—depicted as keys in FIG. 13—that provide to an agent 1389 of the domain entity 1381 access to view the instantiation 1318 through a third-party authorization gateway 1371 of the OSP computer system 1395. As such, in some embodiments, the access instruction recites a password. In other embodiments, however, a third-party authorization gateway may not be needed, and the instantiation can be stored in an obscured URL, for instance one with many digits, as described above.

In embodiments where the additional instantiation 1320 is prepared, and the additional instantiation 1320 and the instantiation 1318 are stored as contents in the substantiation gallery storage space, the access instruction 1358 may render accessible to the agent 1389 the stored contents 1318, 1320 of the substantiation gallery storage space 1300.

Accordingly, there are many embodiments given that the OSP computer system 195, 1395 is accessible via the network 188. In some embodiments, the instantiation enabling viewing a data record 1318 is at a certain Uniform Resource Locator (URL), and the access instruction 1358 can define the certain URL.

In some embodiments, the OSP computer system 195, 1395 has a third-party authorization gateway 1371 at a certain Uniform Resource Locator (URL), the access instruction 1358 defines the certain URL, and the instantiation enabling viewing a data record 1318 is accessed through the third-party authorization gateway 1371.

In some embodiments, the OSP computer system 195, 1395 has a substantiation gallery storage space 100, 900, 1300, at a certain Uniform Resource Locator (URL), the instantiation enabling viewing a data record 1318 is stored in the substantiation gallery storage space 100, 900, 1300, and the access instruction 1358 defines the URL.

In some embodiments, the OSP computer system 195, 1395 has a third-party authorization gateway 1371 at a certain Uniform Resource Locator (URL), the access instruction 1358 defines the certain URL, the OSP computer system 195, 1395 further has a substantiation gallery storage space 100, 900, 1300, the instantiation enabling viewing a data record 1318 is stored in the substantiation gallery storage space 100, 900, 1300, and the instantiation enabling viewing a data record 1318 is accessed through the third-party authorization gateway 1371 and then through the substantiation gallery storage space 100, 900, 1300.

The access instruction 1358 can be made available to the domain entity 1381 in a number of ways. In some embodiments, the access instruction is uploaded to a server of the domain entity. In some embodiments, the access instruction is made available to the domain entity by causing, by the OSP computer system, an access notification to be transmitted to the domain entity, the access notification containing the access instruction.

In some embodiments, the OSP computer system 195 is further configured to augment the report document 149, 249, 1349 with the access instruction 158, 258, 1358. That can be before or after getting the report document signed. In such embodiments, the access instruction is made available to the domain entity by the augmented and signed report document being caused to become available to the domain entity. This way, the agent 1389 of the domain entity 1381 can see and use the access instruction 1358 upon receiving the report document 149, 249, 1349. The augmented and signed report document being caused to become available to the domain entity because the primary entity 1393 may send it independently. In some embodiments, the OSP computer system 195 is further configured to cause the signed report document 149, 249, 1349 that is thus augmented with the access instruction 158, 258, 1358 to become uploaded to a server of the domain entity 1381.

Augmenting the report document 149, 249, 1349 with the access instruction 158, 258, 1358 can be performed in a number of ways. In some embodiments, the access instruction on the augmented report document includes instruction text, for instance: "For accessing this report document's substantiation materials, go to . . . ", along with a URL. An example of that was seen in FIG. 2. In some embodiments, the signed report document is thus augmented by adding to it one or more device-actuatable features for conveying and even executing the access instruction. In fact, elements of the access instruction, such as instruction text, a URL, a document name ("INDEX"), instruction to enter a participant number or a passcode ("key"), can be distributed between text and device-actuatable features such as a link, a QR code, or both. Some examples are now described, and more types are possible.

Figure 14:
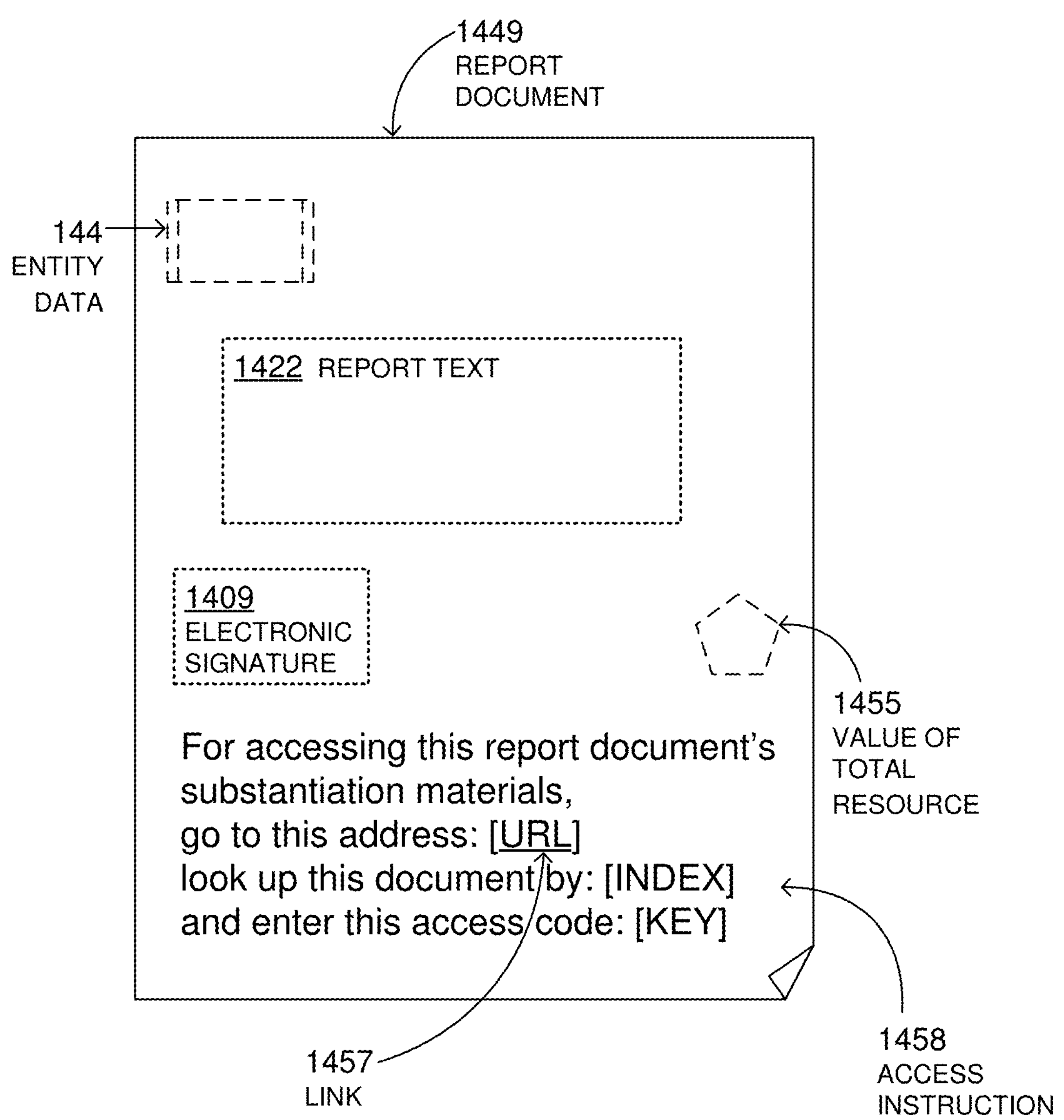
FIG. 14 is a diagram showing a sample report document, augmented with an access instruction for its substantiation materials, the access instruction using instruction text and a link, according to embodiments.

In some embodiments, the access instruction defines a URL, and the device-actuatable feature includes a link leading to the URL. The link can be device-actuatable, such as by a computer mouse. For instance, FIG. 14 shows a report document 1449 that could be an example of the report documents 149, 249, 1349. The report document 1449 mentions the entity data 144. The report document 1449 also includes report text 1422, and mentions a value of a total resource 1455 in context of the report text 1422. The report document 1449 also includes an electronic signature 1409. The report document 1449 is further augmented with an access instruction 1458, defines a URL which, here is the acronym "URL" without the link, and has a device-actuatable link 1457 that leads to the URL. The link 1457 is actuatable with a computer mouse, and may even execute a portion of the access instruction 1458.

Figure 15:
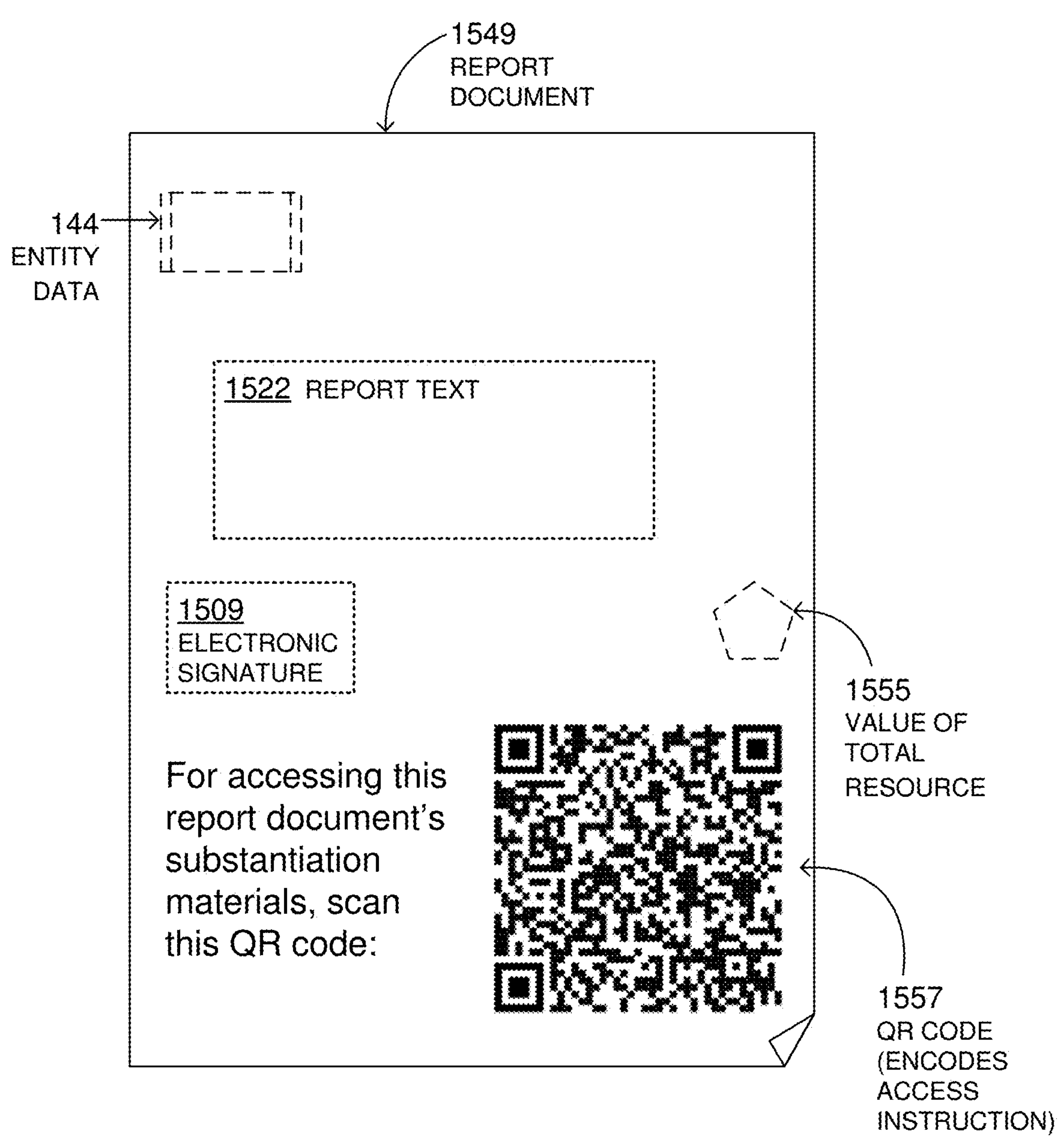
FIG. 15 is a diagram showing a sample report document, augmented with an access instruction for its substantiation materials, the access instruction using instruction text and a machine-readable QR code, according to embodiments.

In some embodiments, the access instruction defines a URL, and the device-actuatable feature includes a machine-readable quick response (QR) code that encodes the URL. For instance, FIG. 15 shows a report document 1549 that could be an example of the report documents 149, 249, 1349. The report document 1549 mentions the entity data 144. The report document 1549 also includes report text 1522, and mentions a value of a total resource 1555 in context of the report text 1522. The report document 1549 also includes an electronic signature 1509. The report document 1549 is further augmented with a machine-readable quick response (QR) code 1557 that encodes an access instruction. The QR code 1557 is actuatable by a camera, and/or a desktop QR code reader, whether installed in the computer system as a utility or presented by a website, and may even execute a portion of the access instruction. QR codes are versatile; upon being read they can reveal text, a URL, and even a link to the URL. The text may also include a passcode and other instructions. In some of these embodiments, the URL is merely encoded and read as text when the QR code is read by a QR code reader. In other embodiments, however, the QR code further includes a link leading to the URL of the access instruction.

Returning to FIG. 13, the agent 1389 may use the access instruction 1358 to reach the third-party authorization gateway 1371, and possibly also to get through it. An example is now described.

Figure 16:
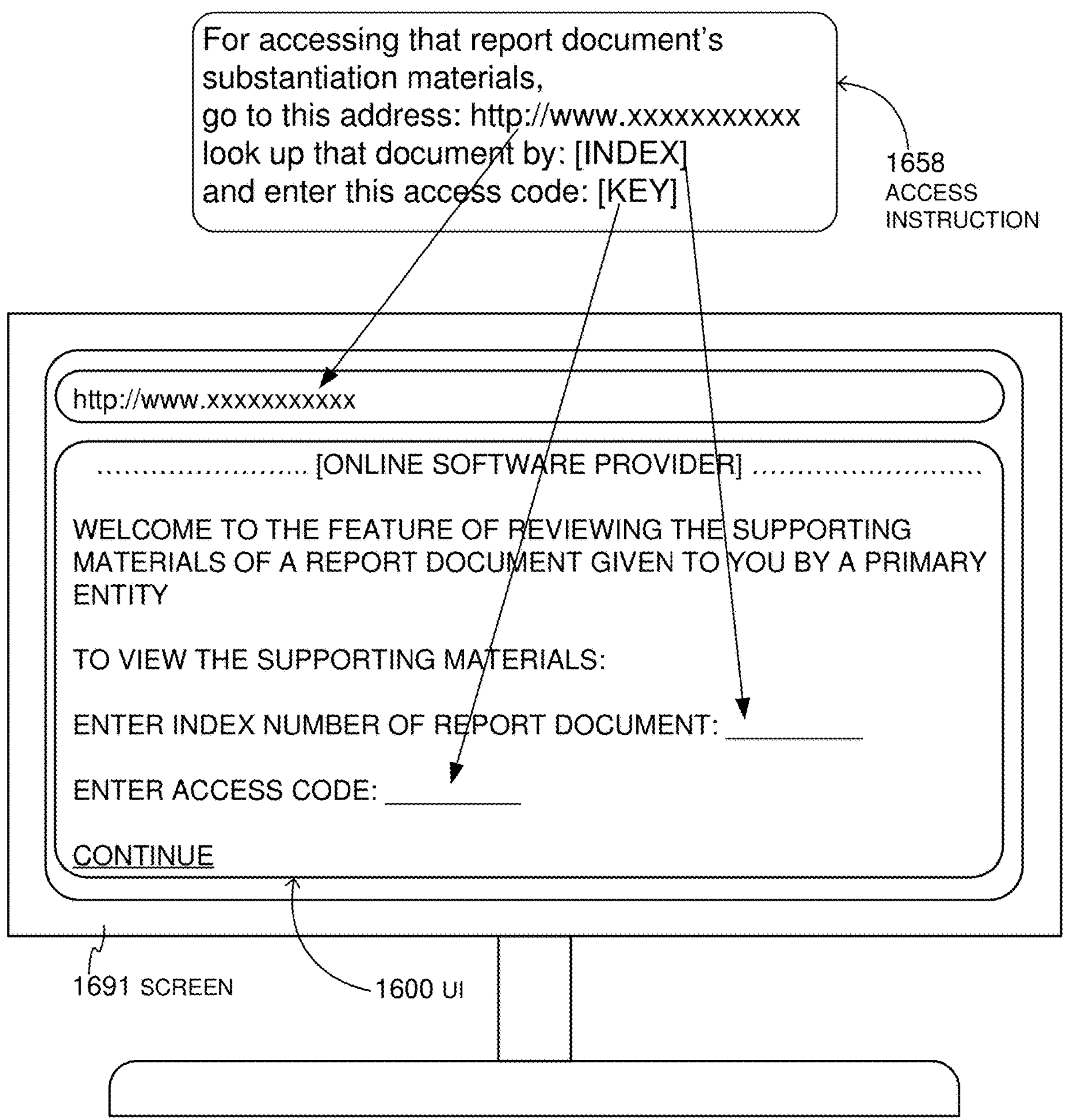
FIG. 16 is a diagram showing a sample User Interface (UI) that a domain entity may encounter upon reaching a third-party authorization gateway of FIG. 13 pursuant to an access instruction, according to embodiments.

FIG. 16 shows a sample screen 1691, with a sample UI 1600 of a third-party authorization gateway, such as the third-party authorization gateway 1371. The agent 1389 has reached the UI 1600 pursuant to an access instruction 1658, which is a special case of the access instruction 258. In particular, the access instruction 1658 includes a URL, with or without an actuatable link. In this example, the UI 1600 has been reached at that URL, per an arrow. To allow the visitor through, however, the UI 1600 requests more credentials, which can be obtained from the access instruction as shown with more arrows.

The access instruction can be planned with a view of who can access the instantiation 318, or the broader gallery 100, 900, 1002, 1300, and what access they already have. For instance, the access instruction may define a URL that is well known about the OSP 198, for the primary entities it serves. An example was UI 1600. In such cases, asking for further credentials is advised, so the visitor can only access the substantiation materials that correspond to the report document that they have received. For another instance, however, in contexts where the domain entity is supposed to maintain confidential the entire report document, then the access instruction can include a single URL, there may be little benefit in asking for additional credentials. An example could be the URL 1077 in FIG. 10, especially if it is long and hard to guess. In other instances, the credentials may include sign-in permissions given by the OSP 198 to the domain entity itself, independently of the report document.

FIG. 17 shows a flowchart 1700 for describing methods according to embodiments. The operations of these methods may be performed by the OSP computer system 195.

According to a first operation 1735, a dataset may be received by the OSP computer system from a remote device via a network. The dataset may have dataset values that representing relationship instance data of a relationship instance between a primary entity and a secondary entity.

According to another operation 1744, entity data of the primary entity may be input.

According to another operation 1770, a digital rule may be selected responsive to at least one of the dataset values. The selection may be performed in a number of ways. In some embodiments, stored digital resource rules may be accessed, and the digital rule can be selected from the accessed stored digital resource rules and not responsive to the primary entity data. In other embodiments, a stored digital override rule created by the primary entity may be accessed, and the selected digital rule is the accessed digital override rule.

According to another operation 1779, an individual resource may be produced for the dataset. The individual resource may be produced by the OSP computer system applying the selected digital rule to at least one of the dataset values. In some embodiments, an individual resource notification can be further caused to be transmitted about an aspect of the individual resource, to one of an output device and another device.

According to another operation 1780, additional individual resources may be produced for the primary entity.

According to another operation 1755, a value of a total resource may be derived from the produced individual resource and from the additional individual resources.

According to another operation 1749, a report document may be generated. The report document may mention at least the entity data, include report text, and mention the value of the total resource in context of the report text.

According to another operation 1709, an agent of the primary entity may be enabled to sign the report document. Signing may be by the agent affixing an electronic signature to the report document.

According to another operation 1718, an instantiation may be prepared. The instantiation may enable viewing a data record. The data record may include at least one of the dataset values, the produced individual resource, and at least some of the additional individual resources. In some embodiments, the data record also includes the value of the total resource. In some embodiments, a substantiation request from the primary entity is input, and the instantiation enabling viewing the data record is prepared only responsive to the substantiation request having been inputted.

According to another, optional operation 1720, an additional instantiation may be prepared, which enables viewing an additional element distinct from the data record. Examples of such additional instantiations are given above, at least with reference to FIG. 9. If more than one instantiation is prepared, they can both be stored in a substantiation gallery storage space, and so on.

According to another, optional operation 1771, the instantiation enabling viewing the data record can be made available for viewing to a domain entity that is distinct from the primary entity. In some embodiments this is performed by making available to the domain entity an access instruction that renders accessible to an agent of the domain entity the instantiation enabling viewing the data record. This can be performed by causing the access instruction to be uploaded to a server, to be transmitted such as by an email of an access notification. This can also be performed by augmenting the report document with the access instruction, for embodiments where the augmented and signed report document becomes available to the domain entity. Augmenting can be by instruction text, and even by a device-actuatable feature such as a link or a machine-readable quick response (QR) code.

In some embodiments, a domain entity uses a device-actuatable feature of a received report document of a primary entity to access private data of the primary entity that is stored in an online software platform (OSP) and substantiates the report document. Examples are now described.

FIG. 18 shows a cloud 1888, which can be as the network 188. In the cloud 1888 there is an online software platform (OSP) 1898, which can be as the OSP 198. An instantiation enabling viewing a data record 1818, which can be as the instantiation 318, is stored in the OSP 198. Optionally, the instantiation 1818 is stored in a substantiation gallery storage space 1800 of the OSP 1898, perhaps with other instantiations, as seen above. The substantiation gallery storage space 1800 can be as the substantiation gallery storage space 100.

FIG. 18 shows a domain entity 1881, which can be as the domain entity 1381. A domain entity computer system 1802 of the domain entity 1881 is not hosted by the OSP 1898. The domain entity computer system 1802 can be configured to assist an agent 1889 of the domain entity 1881 to review a report document 1849, for the event the agent 1889 wants to confirm aspects of the report document 1849. The report document 1849 has been received by the domain entity 1881 on behalf of a primary entity (not shown), which is distinct from the domain entity 1881. The report document 1849 is not necessarily within the domain entity computer system 1802, as it may have been received physically as a paper document, instead of electronically. Even then, the report document 1849 may show a URL, which the agent 1889 can key into a browser of the domain entity computer system 1802 using the keyboard 1893.

Similarly with the above, the primary entity can be as described for the primary entity 193, 1393. In particular, the primary entity may have previously had a relationship instance with a secondary entity for which a rule was selected, and for which an individual resource was produced by applying the selected rule to a dataset value representing the relationship instance. The primary entity may have previously had additional relationship instances for which additional individual resources have been produced, in which a value of a total resource has been derived from the produced individual resource and from the additional individual resources.

Similarly with the above, the report document 1849 can be as described for any of the report documents 149, 249, 1349, 1449, 1549. In particular, the report document 1849 may mention at least entity data 1844 of the primary entity, include report text 1822, mention, in context of the report text 1822, the value of the total resource 1855, have an electronic signature 1809 previously affixed by an agent of the primary entity, and have a device-actuatable feature 1857 for an access instruction 1858. The agent 1889 may want substantiation materials to confirm the value of the total resource 1855.

Figure 20:
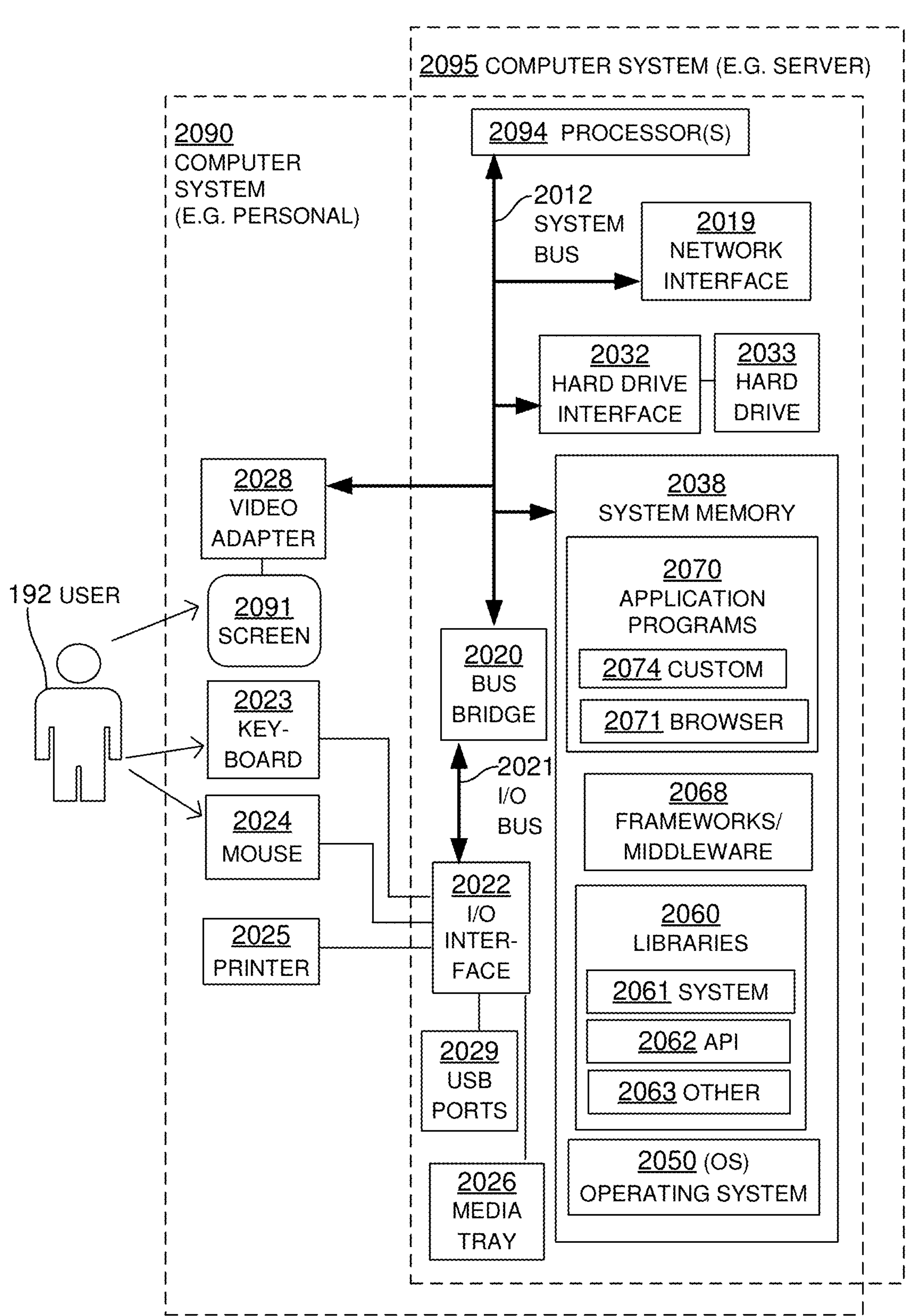
FIG. 20 is a block diagram showing additional components of sample computer systems according to embodiments.

The domain entity computer system 1802 includes components, not all of which are shown in FIG. 18, and some more are shown in FIG. 20. These components include at least one or more processors 2094, and a screen 2091, 1891 that is configured for viewing by the agent 1889. These components also include one or more input devices 1892, such as a keyboard 1893 and a mouse 1894, 2024. The one or more input devices 1892 can be configured to be used by the agent 1889. These components also include a non-transitory computer-readable storage medium having stored thereon instructions which, when executed by the one or more processors 2094, result in various operations according to embodiments.

These operations include at least causing the report document 1849 to be displayed on the screen 2891, but this operation is not expressly depicted in FIG. 18. Such causing thereby causes the device-actuatable feature 1857 to be displayed on the screen, which is not expressly depicted in FIG. 18, either. The report document 1849 may have been received by the domain entity computer system 1802 in an earlier operation.

These operations also include inputting the access instruction 1858 responsive to at least the agent 1889 actuating the displayed device-actuatable feature 1857 by using one of the input devices 1892. In other words, when the agent 1889 actuates the displayed device-actuatable feature 1857, the access instruction 1858 is inputted, as indicated by the arrow 1871.

These operations further include accessing, per an arrow 1872, by the domain entity computer system 1802 and responsive to the inputted 1871 access instruction 1858, via a communications network, the instantiation enabling viewing a data record 1818. That data record may include at least the produced individual resource and some of the additional individual resources.

These operations moreover include causing, per an arrow 1807, from the accessed instantiation 1818, a version 1848 of the data record of the instantiation 1818 to be displayed on the screen 1891 as a UI 1820.

In some embodiments, the device-actuatable feature 1857 includes a link. One such link is the link 1457 of FIG. 14. Another such link that may be revealed by a QR code, such the QR code 1557 of FIG. 15. In such embodiments, the agent 1889 actuates the device-actuatable feature 1857 by clicking on the link with the mouse 1894.

In some embodiments, the device-actuatable feature 1857 includes a machine-readable quick response (QR) code, such the QR code 1557 of FIG. 15. In such embodiments, the input device 1892 includes a mouse 1894 and the agent 1889 actuates the device-actuatable feature 1857 by clicking on the QR code with the mouse 1894 to enable a QR reader to read the QR code. The clicking can be to highlight the QR code, for example right-clicking on it to read it from a plug-in QR code reader. The clicking can also be to take a screenshot (a "snip") of the QR code. Or, to drag it to the window of a QR code reader utility, and so on. Or, the clicking can be to highlight text revealed, and copy and paste the highlighted text to a browser, or to UI 1600. Similarly, a keyboard can be used to enter characters of a passcode one at a time.

As also written above, in some embodiments, the access instruction 1858 includes a passcode, and the access instruction 1858 is input 1871 responsive to the agent 1889 further using the input device 1892 to enter the passcode. The passcode can be plainly written on the report document 1849, for instance as seen with the access code in FIG. 14. Or, the passcode appears on the screen 1891 responsive to the device-actuatable feature being actuated by the agent, e.g. from the QR code.

These operations also include accessing additional instantiations in the gallery 1800, and causing their corresponding elements to be displayed on the screen 1891. For instance, an instantiation enabling viewing a version of the selected digital rule may be accessed, and the version of the selected digital rule can be caused to be displayed on the screen 1891 from the accessed instantiation enabling viewing the version of the selected digital rule. Displaying the version of the selected digital rule can be as shown in FIG. 12.

Figure 19:
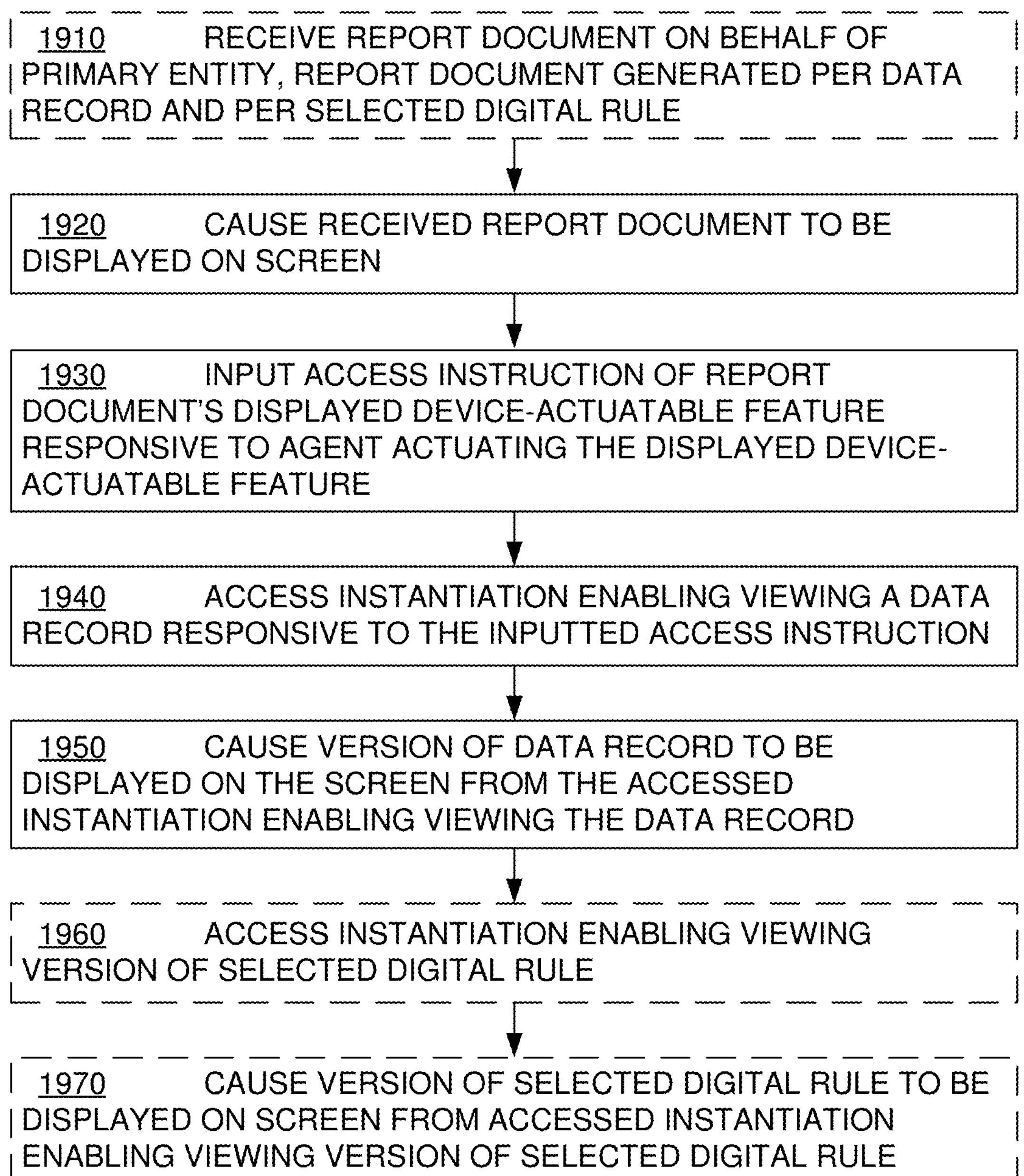
FIG. 19 is a flowchart for illustrating sample methods according to embodiments.

FIG. 19 shows a flowchart 1900 for describing methods according to embodiments.

According to an optional operation 1910, a report document may be received on behalf of a primary entity. The report document may have been generated per a data record and per a selected digital rule, as per the above.

According to another operation 1920, the received report document may be caused to be displayed on a screen. This may cause a device-actuatable feature of the report document to be also displayed. The device-actuatable feature can be for an access instruction.

According to another, operation 1930, an access instruction may be inputted responsive to at least an agent actuating, by using an input device, the displayed device-actuatable feature of the report document.

According to another, operation 1940, an instantiation enabling viewing a data record may be accessed, responsive to the inputted access instruction. Accessing may be via a communications network. The instantiation may be stored in an Online Software Platform (OSP), the OSP not hosting the domain entity computer system. The data record may have been used for ultimately generating the report document.

According to another operation 1950, a version of the data record may be caused to be displayed on the screen, from the accessed instantiation enabling viewing the data record.

According to another, optional operation 1960, an instantiation enabling viewing a version of the selected digital rule may be accessed. The selected digital rule may have been used for ultimately generating the report document.

According to another, optional operation 1970, the version of the selected digital rule may be caused to be displayed on the screen, from the accessed instantiation enabling viewing the version of the selected digital rule.

There are additional embodiments for additional possible substantiation content. For instantiations enabling viewing of such, examples were given in FIG. 9. Such additional embodiments include:

Embodiment QASA: The OSP computer system of the first presented claim for an OSP computer system, in which the operations further include:

- preparing, by the OSP computer system, an OSP certification about the value of the total resource being derived from the produced individual resource and from the additional individual resources, and by the application of the selected digital rule; and
- making available for viewing to the primary entity, by the OSP computer system, the OSP certification.

Embodiment QASA+1: The OSP computer system of the embodiment QASA, in which: the preparing of the OSP certification about the value of the total resource includes generating a viewable page, which is viewable via a User Interface (UI), the viewable page including certification text referencing the OSP.

Embodiment QASB: The OSP computer system of the first presented claim for an OSP computer system, in which: the preparing of the instantiation enabling viewing the data record includes generating a viewable page, which is viewable via a User Interface (UI), the viewable page including data record presentation text, the viewable page also including a parameter value import field placed in context with the data record presentation text, the parameter value import field configured to import and display an element of the data record.

Embodiment QASB+1: The OSP computer system of the embodiment QASB, in which the operations further include:

preparing, by the OSP computer system, an additional document distinct from the instantiation enabling viewing the data record, and the viewable page further includes an additional link directing to the additional document.

Embodiment QASB+2: The OSP computer system of the embodiment QASB, in which:

the viewable page further includes a button enabling a download of the displayed element.

Embodiment QASC: The OSP computer system of the first presented claim for an OSP computer system, in which the operations further include:

preparing, by the OSP computer system, an instantiation enabling viewing a version of the selected digital rule; and making available for viewing to the primary entity, by the OSP computer system, the instantiation enabling viewing the version of the selected digital rule.

Embodiment QASC+1: The OSP computer system of the embodiment QASC, in which:

the preparing of the instantiation enabling viewing the version of the selected digital rule includes generating a viewable page that is viewable via a User Interface (UI), the viewable page including rule presentation text, the viewable page also including a rule import field placed in context with the rule presentation text, the rule import field configured to import and display an aspect of the selected digital rule.

Embodiment QASC+2: The OSP computer system of the embodiment QASC, in which the operations further include:

preparing, by the OSP computer system, an instantiation enabling viewing a certificate required by the selected digital rule and distinct from the report document, the certificate signed by an agent of the primary entity; and making available for viewing to the primary entity, by the OSP computer system, the certificate required by the selected digital rule.

Embodiment QAMA: The method of the first presented claim for a method for an OSP computer system, further including:

preparing, by the OSP computer system, an OSP certification about the value of the total resource being derived from the produced individual resource and from the additional individual resources, and by the application of the selected digital rule; and making available for viewing to the primary entity, by the OSP computer system, the OSP certification.

Embodiment QAMA+1: The method of the embodiment QAMA, in which:

the preparing of the OSP certification about the value of the total resource includes generating a viewable page, which is viewable via a User Interface (UI), the viewable page including certification text referencing the OSP.

Embodiment QAMB: The method of the first presented claim for a method for an OSP computer system, in which:

the preparing of the instantiation enabling viewing the data record includes generating a viewable page, which is viewable via a User Interface (UI), the viewable page including data record presentation text, the viewable page also including a parameter value import field placed in context with the data record presentation text, the parameter value import field configured to import and display an element of the data record.

Embodiment QAMB+1: The method of the embodiment QAMB, further including:

preparing, by the OSP computer system, an additional document distinct from the instantiation enabling viewing the data record, and the viewable page further includes an additional link directing to the additional document.

Embodiment QAMB+2: The method of the embodiment QAMB, in which:

the viewable page further includes a button enabling a download of the displayed element.

Embodiment QAMC: The method of the first presented claim for a method for an OSP computer system, further including:

preparing, by the OSP computer system, an instantiation enabling viewing a version of the selected digital rule; and making available for viewing to the primary entity, by the OSP computer system, the instantiation enabling viewing the version of the selected digital rule.

Embodiment QAMC+1: The method of the embodiment QAMC, in which:

the preparing of the instantiation enabling viewing the version of the selected digital rule includes generating a viewable page that is viewable via a User Interface (UI), the viewable page including rule presentation text, the viewable page also including a rule import field placed in context with the rule presentation text, the rule import field configured to import and display an aspect of the selected digital rule.

Embodiment QAMC+2: The method of the embodiment QAMC, further including:

preparing, by the OSP computer system, an instantiation enabling viewing a certificate required by the selected digital rule and distinct from the report document, the certificate signed by an agent of the primary entity; and making available for viewing to the primary entity, by the OSP computer system, the certificate required by the selected digital rule.

Embodiment QANA: The computer-readable medium of the first presented claim for a non-transitory computer-readable medium that is configured to store instructions which can be executed by one or more processors of an OSP computer system, in which the operations further include:

preparing, by the OSP computer system, an OSP certification about the value of the total resource being derived from the produced individual resource and from the additional individual resources, and by the application of the selected digital rule; and making available for viewing to the primary entity, by the OSP computer system, the OSP certification.

Embodiment QANA+1: The computer-readable medium of the embodiment QANA, in which:

the preparing of the OSP certification about the value of the total resource includes generating a viewable page, which is viewable via a User Interface (UI), the viewable page including certification text referencing the OSP.

Embodiment QANB: The computer-readable medium of the first presented claim for a non-transitory computer-readable medium that is configured to store instructions which can be executed by one or more processors of an OSP computer system, in which:

the preparing of the instantiation enabling viewing the data record includes generating a viewable page, which is viewable via a User Interface (UI), the viewable page including data record presentation text, the viewable page also including a parameter value import field placed in context with the data record presentation text, the parameter value import field configured to import and display an element of the data record.

Embodiment QANB+1: The computer-readable medium of the embodiment QANB, in which the operations further include:

preparing, by the OSP computer system, an additional document distinct from the instantiation enabling viewing the data record, and the viewable page further includes an additional link directing to the additional document.

Embodiment QANB+2: The computer-readable medium of the embodiment QANB, in which:

the viewable page further includes a button enabling a download of the displayed element.

Embodiment QANC: The computer-readable medium of the first presented claim for a non-transitory computer-readable medium that is configured to store instructions which can be executed by one or more processors of an OSP computer system, in which the operations further include:

preparing, by the OSP computer system, an instantiation enabling viewing a version of the selected digital rule; and making available for viewing to the primary entity, by the OSP computer system, the instantiation enabling viewing the version of the selected digital rule.

Embodiment QANC+1: The computer-readable medium of the embodiment QANC, in which:

the preparing of the instantiation enabling viewing the version of the selected digital rule includes generating a viewable page that is viewable via a User Interface (UI), the viewable page including rule presentation text, the viewable page also including a rule import field placed in context with the rule presentation text, the rule import field configured to import and display an aspect of the selected digital rule.

Embodiment QANC+2: The computer-readable medium of the embodiment QANC, in which the operations further include:

preparing, by the OSP computer system, an instantiation enabling viewing a certificate required by the selected digital rule and distinct from the report document, the certificate signed by an agent of the primary entity; and making available for viewing to the primary entity, by the OSP computer system, the certificate required by the selected digital rule.

Details about Computer Systems

FIG. 20 shows details for a sample computer system 2095 and for a sample computer system 2090. The computer system 2095 may be a server, while the computer system 2090 may be a personal device, such as a personal computer, a desktop computer, a personal computing device such as a laptop computer, a tablet computer, a mobile phone, and so on. Either type may be used for the OSP computer system 195 and 190 of FIG. 1, and/or a computer system that is part of OPF 189. In addition, either type may be used for the domain entity computer system 1802 of FIG. 18.

The computer system 2095 and the computer system 2090 have similarities, which FIG. 20 exploits for purposes of economy in this document. It will be understood, however, that a component in the computer system 2095 may be implemented differently than the same component in the computer system 2090. For instance, a memory in a server may be larger than a memory in a personal computer, and so on. Similarly, custom application programs 2074 that implement embodiments may be different, and so on.

The computer system 2095 includes one or more processors 2094. The processor(s) 2094 are one or more physical circuits that manipulate physical quantities representing data values. The manipulation can be according to control signals, which can be known as commands, op codes, machine code, etc. The manipulation can produce corresponding output signals that are applied to operate a machine. As such, one or more processors 2094 may, for example, include a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores".

A hardware component such as a processor may also include programmable logic or circuitry that is temporarily configured by software to perform certain operations. For example, a hardware component may include software executed by a general-purpose processor or another type of programmable processor. Once configured by such software, hardware components become specific machines, or specific components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, Application Programming Interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. The hardware components depicted in the computer system 2095, or the computer system 2090, are not intended to be exhaustive. Rather, they are representative, for highlighting essential components that can be used with embodiments.

The computer system 2095 also includes a system bus 2012 that is coupled to the processor(s) 2094. The system bus 2012 can be used by the processor(s) 2094 to control and/or communicate with other components of the computer system 2095.

The computer system 2095 additionally includes a network interface 2019 that is coupled to system bus 2012. Network interface 2019 can be used to access a communications network, such as the network 188. Network interface 2019 can be implemented by a hardware network interface, such as a Network Interface Card (NIC), wireless communication components, cellular communication components, Near Field Communication (NFC) components, Bluetooth® components such as Bluetooth® Low Energy, Wi-Fi® components, etc. Of course, such a hardware network interface may have its own software, and so on.

The computer system 2095 also includes various memory components. These memory components include memory components shown separately in the computer system 2095, plus cache memory within the processor(s) 2094. Accordingly, these memory components are examples of non-transitory machine-readable media. The memory components shown separately in the computer system 2095 are variously coupled, directly or indirectly, with the processor(s) 2094. The coupling in this example is via the system bus 2012.

Instructions for performing any of the methods or functions described in this document may be stored, completely or partially, within the memory components of the computer system 2095, etc. Therefore, one or more of these non-transitory computer-readable media can be configured to store instructions which, when executed by one or more processors 2094 of a host computer system such as the computer system 2095 or the computer system 2090, can cause the host computer system to perform operations according to embodiments. The instructions may be implemented by computer program code for carrying out operations for aspects of this document. The computer program code may be written in any combination of one or more programming languages, including an object-oriented programming language such as Java, Smalltalk or the like, and/or conventional procedural programming languages, such as the "C" programming language or similar programming languages such as C++, C Sharp, etc.

The memory components of the computer system 2095 include a non-volatile hard drive 2033. The computer system 2095 further includes a hard drive interface 2032 that is coupled to the hard drive 2033 and to the system bus 2012.

The memory components of the computer system 2095 include a system memory 2038.

The system memory 2038 includes volatile memory including, but not limited to, cache memory, registers and buffers. In embodiments, data from the hard drive 2033 populates registers of the volatile memory of the system memory 2038.

In some embodiments, the system memory 2038 has a software architecture that uses a stack of layers, with each layer providing a particular functionality. In this example the layers include, starting from the bottom, an Operating System (OS) 2050, libraries 2060, frameworks/middleware 2068 and application programs 2070, which are also known as applications 2070. Other software architectures may include less, more or different layers. For example, a presentation layer may also be included. For another example, some mobile or special purpose operating systems may not provide a frameworks/middleware 2068.

The OS 2050 may manage hardware resources and provide common services. The libraries 2060 provide a common infrastructure that is used by the applications 2070 and/or other components and/or layers. The libraries 2060 provide functionality that allows other software components to perform tasks more easily than if they interfaced directly with the specific underlying functionality of the OS 2050. The libraries 2060 may include system libraries 2061, such as a C standard library. The system libraries 2061 may provide functions such as memory allocation functions, string manipulation functions, mathematical functions, and the like.

In addition, the libraries 2060 may include API libraries 2062 and other libraries 2063. The API libraries 2062 may include media libraries, such as libraries to support presentation and manipulation of various media formats such as MPREG4, H.264, MP3, AAC, AMR, JPG, and PNG. The API libraries 2062 may also include graphics libraries, for instance an OpenGL framework that may be used to render 2D and 3D in a graphic content on the screen 2091. The API libraries 2062 may further include database libraries, for instance SQLite, which may support various relational database functions. The API libraries 2062 may additionally include web libraries, for instance WebKit, which may support web browsing functionality, and also libraries for applications 2070.

The frameworks/middleware 2068 may provide a higher-level common infrastructure that may be used by the applications 2070 and/or other software components/modules. For example, the frameworks/middleware 2068 may provide various Graphic User Interface (GUI) functions, high-level resource management, high-level location services, and so forth. The frameworks/middleware 2068 may provide a broad spectrum of other APIs that may be used by the applications 2070 and/or other software components/modules, some of which may be specific to the OS 2050 or to a platform.

The application programs 2070 are also known more simply as applications and apps. One such app is a browser 2071, which is a software that can permit the user 192 to access other devices in the internet, for example while using a Graphic User Interface (GUI). The browser 2071 includes program modules and instructions that enable the computer system 2095 to exchange network messages with a network, for example using Hypertext Transfer Protocol (HTTP) messaging.

The application programs 2070 may include one or more custom applications 2074, made according to embodiments. These can be made so as to cause their host computer to perform operations according to embodiments. Of course, when implemented by software, operations according to embodiments may be implemented much faster than may be implemented by a human mind; for example, tens or hundreds of such operations may be performed per second according to embodiments, which is much faster than a human mind can do.

Other such applications 2070 may include a contacts application, a QR code reader application, a book reader application, a location application, a media application, a messaging application, and so on. Applications 2070 may be developed using the ANDROID™ or IOS™ Software Development Kit (SDK) by an entity other than the vendor of the particular platform, and may be mobile software running on a mobile operating system such as IOS™, ANDROID™, WINDOWS®-related, or other mobile operating systems. The applications 2070 may use built-in functions of the OS 2050, of the libraries 2060, and of the frameworks/middleware 2068 to create user interfaces for the user 192 to interact with.

The computer system 2095 moreover includes a bus bridge 2020 coupled to the system bus 2012. The computer system 2095 furthermore includes an input/output (I/O) bus 2021 coupled to the bus bridge 2020. The computer system 2095 also includes an I/O interface 2022 coupled to the I/O bus 2021.

For being accessed, the computer system 2095 also includes one or more Universal Serial Bus (USB) ports 2029. These can be coupled to the I/O interface 2022. The computer system 2095 further includes a media tray 2026, which may include storage devices such as CD-ROM drives, multi-media interfaces, and so on.

The computer system 2090 may include many components similar to those of the computer system 2095, as seen in FIG. 20. In addition, a number of the application programs may be more suitable for the computer system 2090 than for the computer system 2095.

The computer system 2090 further includes peripheral input/output (I/O) devices for being accessed by a user more routinely. As such, the computer system 2090 includes a screen 2091 and a video adapter 2028 to drive and/or support the screen 2091. The video adapter 2028 is coupled to the system bus 2012.

The computer system 2090 also includes a keyboard 2023, a mouse 2024, and a printer 2025. In this example, the keyboard 2023, the mouse 2024, and the printer 2025 are directly coupled to the I/O interface 2022. Sometimes this coupling is via the USB ports 2029.

In this context, "machine-readable medium" refers to a component, device or other tangible media able to store instructions and data temporarily or permanently and may include, but is not be limited to, a portable computer diskette, a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable compact disc read-only memory (CD-ROM), an optical storage device, a magnetic storage device, or any suitable combination of the foregoing. The machine that would read such a medium includes one or more processors 2094.

The term "machine-readable medium" should be taken to include a single medium or multiple media (e.g., a centralized or distributed database, or associated caches and servers) able to store instructions that a machine such as a processor can store, erase, or read. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methods described herein. Accordingly, instructions transform a general, non-programmed machine into a particular machine programmed to carry out the described and illustrated functions in the manner described.

A computer readable signal traveling from, to, and via these components may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Operational Examples—Use Cases

The above-mentioned embodiments have one or more uses. Aspects presented below may be implemented as was described above for similar aspects. (Some, but not all of these aspects have even similar reference numerals.)

Operational examples and sample use cases are possible where the attribute of an entity in a dataset is any one of the entity's name, type of entity, a physical location such as an address, a contact information element, an affiliation, a characterization of another entity, a characterization by another entity, an association or relationship with another entity (general or specific instances), an asset of the entity, a declaration by or on behalf of the entity, and so on. Different resources may be produced in such instances, and so on.

Figure 21:
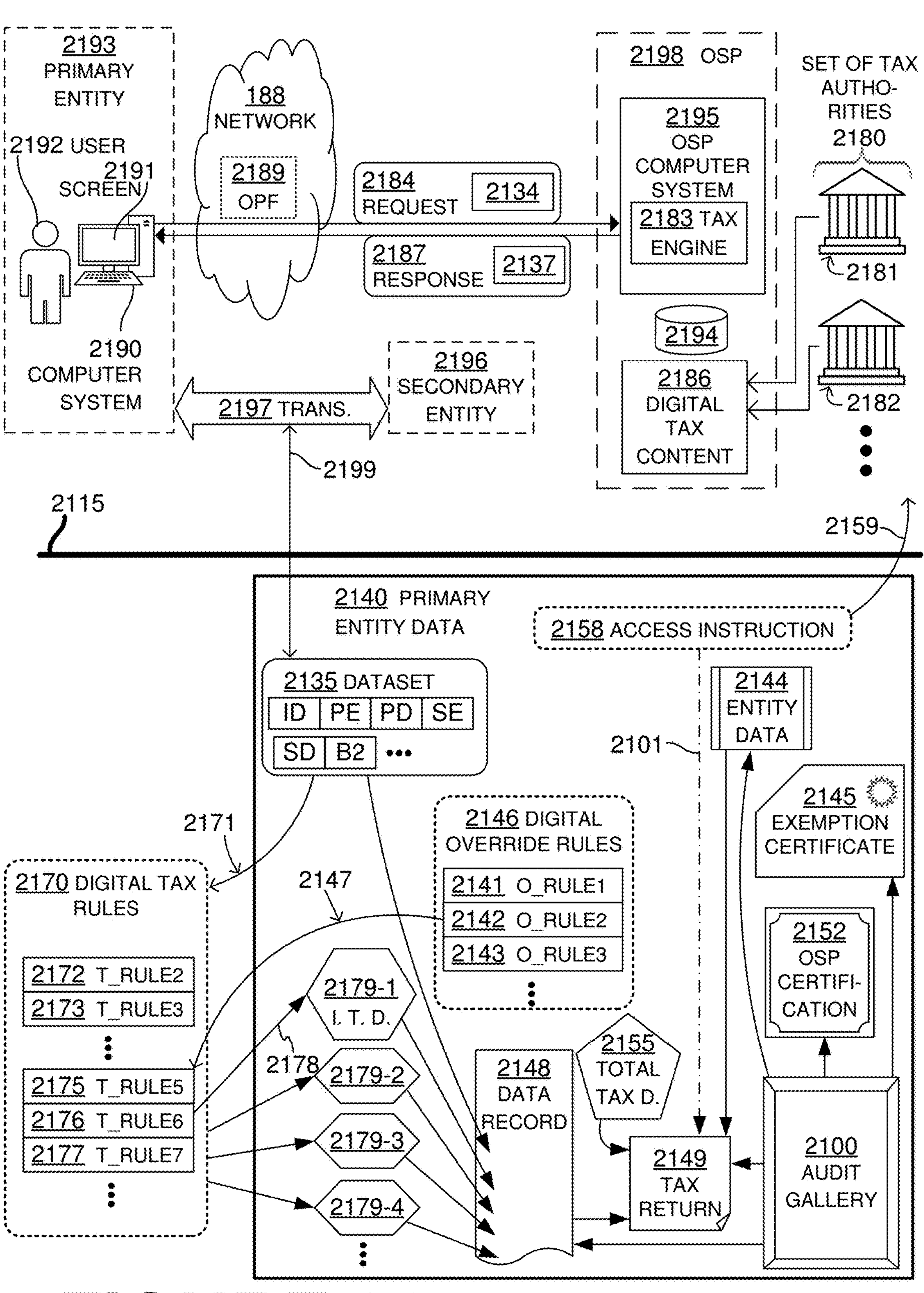
FIG. 21 is a diagram of sample aspects for describing operational examples and use cases of embodiments.

FIG. 21 is diagram for an operational example and use case where the individual resource is an incremental tax due 2179-1 ("I. T. D."), in other words, an incremental tax obligation. The incremental tax due 2179-1 is due to be paid to a tax authority by a primary entity 2193 and/or a secondary entity 2196, due to an individual transaction 2197. The transaction 2197 is an example of a relationship instance between the primary entity 2193 and the secondary entity 2196. There are more incremental taxes due, as described below.

It will be recognized that aspects of FIG. 21 have similarities with aspects of FIG. 1. Portions of such aspects may be implemented as described for analogous aspects of FIG. 1. In particular, a thick horizontal line 2115 separates FIG. 21, although not completely or rigorously, into a top portion and a bottom portion. Above the line 2115 the emphasis is mostly on entities, components, their relationships, and their interactions, while below the line 2115 the emphasis is mostly on processing of data that takes place often within one or more of the components above the line 2115.

Above the line 2115, an online software platform (OSP) computer system 2195 is shown, which is used to help customers, such as a user 2192, with tax compliance. Further in this example, the OSP computer system 2195 is part of an OSP 2198 that is implemented as a Software as a Service (SaaS) provider, for being accessed online by clients, such as the user 2192. Alternately, the functionality of the OSP computer system 2195 may be provided locally to a user.

The user 2192 may be standalone. The user 2192 may use a computer system 2190 that has a screen 2191. In embodiments, the user 2192 and the computer system 2190 are considered part of the primary entity 2193, which is also known as entity 2193. The primary entity 2193 can be a business, such as a seller of items, a reseller, a buyer, and so on. In such instances, the user 2192 can be an employee, a contractor, or otherwise an agent of the entity 2193. In use cases the entity 2193 is a seller, the secondary entity 2196 is a buyer, and together they are performing the buy-sell transaction 2197. The buy-sell transaction 2197 may involve an operation, such as an exchange of data to form an agreement. This operation can be performed in person, or over the network 188, etc. In such cases the entity 2193 can even be an online seller, but that is not necessary. The transaction 2197 will have data that is known to the entity 2193, similarly with what was described by the relationship instance 197 of FIG. 1.

In a number of instances, the user 2192 and/or the entity 2193 use software applications to manage their business activities, such as sales, resource management, production, inventory management, delivery, billing, and so on. The user 2192 and/or the entity 2193 may further use accounting applications to manage purchase orders, sales invoices, refunds, payroll, accounts payable, accounts receivable, and so on. Such software applications, and more, may be used locally by the user 2192, or from an Online Processing Facility (OPF) 2189 that has been engaged for this purpose by the user 2192 and/or the entity 2193. In such use cases, the OPF 2189 can be a Mobile Payments system, a Point Of Sale (POS) system, an Accounting application, an Enterprise Resource Planning (ERP) provider, an e-commerce provider, an electronic marketplace, a Customer Relationship Management (CRM) system, and so on.

Businesses have tax obligations to various tax authorities of respective tax jurisdictions. A first challenge is in making the related determinations. Tax-related determinations, made for the ultimate purpose of tax compliance, are challenging because the underlying statutes and tax rules and guidance issued by the tax authorities are very complex. There are various types of tax, such as sales tax, use tax, excise tax, value-added tax, and issues about cross-border taxation including customs and duties, and many more. Some types of tax are industry specific. Each type of tax has its own set of rules. Additionally, statutes, tax rules, and rates change often, and new tax rules are continuously added. Compliance becomes further complicated when a taxing authority offers a temporary tax holiday, during which certain taxes are waived.

Tax jurisdictions are defined mainly by geography. Businesses have tax obligations to various tax authorities within the respective tax jurisdictions. There are various tax authorities, such as that of a group of countries, of a single country, of a state, of a county, of a municipality, of a city, of a local district such as a local transit district and so on. So, for example, when a business sells items in transactions that can be taxed by a tax authority, the business may have the tax obligations to the tax authority. These obligations include requiring the business to: a) register itself with the tax authority's taxing agency, b) set up internal processes for collecting sales tax in accordance with the sales tax rules of the tax authority, c) maintain records of the sales transactions and of the collected sales tax in the event of a subsequent audit by the taxing agency, d) periodically prepare a form ("tax return") that includes an accurate determination of the amount of the money owed to the tax authority as sales tax because of the sales transactions, e) file the tax return with the tax authority by a deadline determined by the tax authority, and f) pay ("remit") that amount of money to the tax authority. In such cases, the filing and payment frequency and deadlines are determined by the tax authority.

A challenge for businesses is that the above-mentioned software applications generally cannot provide tax information that is accurate enough for the businesses to be tax compliant with all the relevant tax authorities. The lack of accuracy may manifest itself as errors in the amounts determined to be owed as taxes to the various tax authorities, and it is plain not good to have such errors. For example, businesses that sell products and services have risks whether they over-estimate or under-estimate the sales tax due from a sale transaction. On the one hand, if a seller over-estimates the sales tax due, then the seller collects more sales tax from the buyers than was due. Of course, the seller may not keep this surplus sales tax, but instead must pay it to the tax authorities-if they cannot refund it to the buyers. If a buyer later learns that they paid unnecessarily more sales tax than was due, the seller risks at least harm to their reputation. Sometimes the buyer will have the option to ask the state for a refund of the excess tax by sending an explanation and the receipt, but that is often not done as it is too cumbersome. On the other hand, if a seller under-estimates the sales tax due, then the seller collects less sales tax from the buyers, and therefore pays less sales tax to the authorities than was actually due. That is an underpayment of sales tax that will likely be discovered later, if the tax authority audits the seller. Then the seller will be required to pay the difference, plus fines and/or late fees, because ignorance of the law is not an excuse. Further, one should note that sales taxes are considered trust-fund taxes, meaning that the management of a company can be held personally liable for the unpaid sales tax.

For sales in particular, making correct determinations for sales and use tax is even more difficult. There are a number of factors that contribute to its complexity.

First, some state and local tax authorities have origin-based tax rules, while others have destination-based tax rules. Accordingly, a sales tax may be charged from the seller's location or from the buyer's location.

Second, the various tax authorities assess different, i.e. non-uniform, percentage rates of the sales price as sales tax, for the purchase and sale of items that involve their various tax jurisdictions. These tax jurisdictions include various states, counties, cities, municipalities, special taxing jurisdictions, and so on. In fact, there are over 10,000 different tax jurisdictions in the US, with many partially overlapping.

Third, in some instances no sales tax is due at all because of the type of item sold. For example, in 2018 selling cowboy boots was exempt from sales tax in Texas, but not in New York. This non-uniformity gives rise to numerous individual taxability rules related to various products and services across different tax jurisdictions.

Fourth, in some instances no sales tax is due at all because of who the individual buyer is. For example, certain entities are exempt from paying sales tax on their purchases, so long as they properly create and sign an exemption certificate and give it to the seller for each purchase made. Entities that are entitled to such exemptions may include wholesalers, resellers, non-profit charities, educational institutions, etc. Of course, who can be exempt is not exactly the same in each tax jurisdiction. And, even when an entity is entitled to be exempt, different tax jurisdictions may have different requirements for the certificate of exemption to be issued and/or remain valid.

Fifth, it can be hard to determine which tax authorities a seller owes sales tax to. A seller may start with tax jurisdictions that it has a physical presence in, such as a main office, a distribution center or warehouse, an employee working remotely, and so on. Such ties with a tax jurisdiction establish the so-called physical nexus. However, a tax authority such as a state or even a city may set its own nexus rules for when a business is considered to be "engaged in business" with it, and therefore that business is subject to registration and collection of sales taxes. These nexus rules may include different types of nexus, such as affiliate nexus, click-through nexus, cookie nexus, economic nexus with thresholds, and so on. For instance, due to economic nexus, a remote seller may owe sales tax for sales made in the jurisdiction that are a) above a set threshold volume, and/or b) above a set threshold number of sales transactions.

Lastly, even where a seller might not have reached any of the thresholds for economic nexus, a number of states are promulgating marketplace facilitator laws that sometimes use such thresholds. According to such laws, intermediaries that are characterized as marketplace facilitators per laws of the state have an obligation, instead of the seller, to collect sales tax on behalf of their sellers, and remit it to the state. The situation becomes even more complex when a seller sells directly to a state, and also via such an intermediary.

To help with such complex determinations, the OSP computer system 2195 may be specialized for tax compliance. The OSP computer system 2195 may have one or more processors and memory, for example as was described for the OSP computer system 195 of FIG. 1. The OSP computer system 2195 thus implements a tax engine 2183 to make the determinations of tax obligations. The tax engine 2183 can be as described for the service engine 183.

The OSP computer system 2195 may further store locally entity data, i.e. data of user 2192 and/or of entity 2193, either of which/whom may be a customer, and/or a seller or a buyer in a sales transaction. The entity data may include profile data of the customer, and transaction data from which a determination of a tax obligation is desired. In the online implementation of FIG. 21, the OSP 2198 has a database 2194 for storing the entity data. This entity data may be inputted by the user 2192, and/or caused to be downloaded or uploading by the user 2192 from the computer system 2190 or from the OPF 2189, or extracted from the computer system 2190 or from OPF 2189, and so on. In other implementations, a simpler memory configuration may suffice for storing the entity data.

A digital tax content 2186 is further implemented within the OSP 2198. The digital tax content 2186 can be a utility that stores the digital tax rules 2170 for use by the tax engine 2183. As part of managing the digital tax content 2186, there may be continuous updates of the digital tax rules, by inputs gleaned from a set 2180 of different tax authorities 2181, 2182, . . . . Updating may be performed by humans, or by computers, and so on. As mentioned above, the number of the different tax authorities in the set 2180 may be very large. It will be understood that the tax authorities 2181, 2182, . . . are examples of the domain entities 1381, 1881.

The description of FIG. 21 so far is for components above the line 2115. Some of the elements are now described in more detail, as they happen below the line 2115.

The OSP 2198 arranges for data of the primary entity 2193 to be stored as the primary entity data 2140. This arranging can be performed as was described for the primary entity data 140. As such, the primary entity data 2140 includes entity data 2144 similar to the entity data 144. The primary entity data 2140 also includes a data record 2148 that can be as described for the data record 148.

The above-mentioned digital tax rules 2170 are not part of the primary entity data 2140, because the OSP 2198 applies these rules to datasets of all customer primary entities, except if overridden by a primary entity for the datasets of that primary entity alone.

For a specific determination of an incremental tax obligation, the OSP computer system 2195 may receive one or more datasets. A sample received dataset 2135 is shown received and stored in the primary entity data 2140, and preferably as part of the data record 2148. The dataset 2135 can be similar to what was described for the dataset 135 of FIG. 1. In this example, the computer system 2190 transmits a request 2184 that includes a payload 2134, and the dataset 2135 is received by the OSP computer system 2195 parsing the received payload 2134. In this example the single payload 2134 encodes the entire dataset 2135, but that is not required, as mentioned earlier.

In this example, the dataset 2135 has been received because it is desired to determine any tax obligations arising from the buy-sell transaction 2197. As such, the sample received dataset 2135 has dataset values that characterize attributes of the buy-sell transaction 2197, as indicated by a correspondence arrow 2199. Accordingly, in this example the sample received dataset 2135 has a value ID for an identity of the dataset 2135 and/or the transaction 2197. The dataset 2135 also has a value PE for the name of the primary entity 2193 or the user 2192, which can be the seller making sales transactions, some online. The dataset 2135 further has a value PD for relevant data of the primary entity 2193 or the user 2192, such as an address, place(s) of business, prior nexus determinations with various tax jurisdictions, and so on. The dataset 2135 also has a value SE for the name of the secondary entity 2196, which can be the buyer. The dataset 2135 further has a value SD for relevant data of the secondary entity 2196, entity-driven exemption status, and so on. The dataset 2135 has a value B2 for the sale price of the item sold. The dataset 2135 may further have additional dataset values, as indicated by the dot-dot-dot in the dataset 2135. These dataset values may characterize further attributes, such as what item was sold, for example by a Stock Keeping Unit (SKU), how many units of the item were sold, a date and possibly also time of the transaction 2197, and so on.

The digital tax rules 2170 have been created so as to accommodate tax rules that the set 2180 of different tax authorities 2181, 2182 . . . promulgate within the boundaries of their tax jurisdictions. In FIG. 21 five sample digital tax rules are shown, namely T_RULE2 2172, T_RULE3 2173, T_RULE5 2175, T_RULE6 2176 and T_RULE7 2177. Additional digital tax rules 2170 are indicated by the vertical dot-dot-dot. Similarly with FIG. 1, some of these digital tax rules may be digital main rules that determine the incremental tax due 2179-1, while others can be digital precedence rules that determine which of the digital main rules is to be applied in the event of conflict. In some use cases, digital main rules may be about a sales tax or use tax being owed due to the transaction 2197 at a certain percentage of the purchase price. Digital precedence rules may be digital tax rules that determine whether digital tax rules are to be applied for origin-based or destination-based jurisdictions, how to override for diverse taxability of individual items, for temporary tax holidays, for exemptions from having to pay sales tax based on who the buyer is, and also based on nexus, and so on.

Similarly with FIG. 1, these digital tax rules 2170 can be implemented or organized in different ways. In some use cases they can be organized with conditions and consequents, such as was described earlier in this document. Such conditions may relate to geographical boundaries, effective dates, and so on, for determining where and when a digital tax rule is to be applied. These conditions may be expressed as logical conditions with ranges, dates, other data, and so on. The dataset values of the dataset 2135 can be iteratively tested against these logical conditions according to an arrow 2171. In such cases, the consequents may indicate one or more tax obligations, such as to indicate different types of taxes that are due, rules, rates, exemption requirements, reporting requirements, remittance requirements, etc.

The OSP 2198 further permits the primary entity 2193 to have its own digital override rules 2146, for overriding corresponding ones of the digital tax rules 2170. Three sample digital override rules are shown, namely O_RULE1 2141, O_RULE2 2142 and O_RULE3 2143. Additional digital override rules 2146 are indicated by the vertical dot-dot-dot.

The OSP 2198 provides the primary entity 2193 with the option of the digital override rules 2146 for instances where the user 2193 has an opinion as to what is the appropriate rule in certain specific circumstances, and for which the digital tax content 2186 has not been updated yet. For instance, a new tax rate may have become applicable, or a new tax jurisdiction may have been created. Or, the geographical boundary of a tax jurisdiction may have shifted.

In such instances, therefore, one of the digital override rules 2146 may be used, instead of a corresponding one of the digital tax rules 2170. In the example of FIG. 21, the digital override rule O_RULE2 2142 is shown as intended to override the digital tax rule T_RULE5 2175, according to an override arrow 2147.

In the example of FIG. 21, a certain digital tax rule T_RULE6 2176 is shown as identified and used, which is indicated also by the beginning of an arrow 2178. Identifying may be performed responsive to the dataset values of the dataset 2135, which are shown as considered for digital tax rules 2170 by an arrow 2171. For example, it can be recognized that a condition of the digital tax rule T_RULE6 1176 is met by one or more of the dataset values of the dataset 2135. For instance, it can be further determined that, at the time of the sale, the buyer 2196 is located within the boundaries of a tax jurisdiction, that the seller 2193 has nexus with that tax jurisdiction, and that there is no tax holiday. And, if digital override rules 2146 are indeed provided, none of them overrides the selected digital tax rule T_RULE6 2176.

As such, the OSP computer system 2195 may produce the incremental tax due (I.T.D.) 2179-1, which is akin to producing the individual resource 179-1 of FIG. 1. The incremental tax due 2179-1 can be produced by the OSP computer system 2195 applying the certain digital tax rule T_RULE6 2176, as indicated by the arrow 2178. In this example, the consequent of the identified certain digital tax rule T_RULE6 2176 may specify that a sales tax is due, the amount is to be determined by a multiplication of the sale price of the value B2 by a specific rate, the tax return form that needs to be prepared and filed, a date by which it needs to be filed, and so on. Then, produce the incremental tax due 2179-1 can be performed by a computation, a calculation, such as multiplication.

The computed incremental tax due 2179-1 may be stored among the primary entity data 2140, and also within the data record 2148. It may also be communicated. For instance, the OSP computer system 2195 may then cause a notification to be transmitted as an answer to the received dataset 2135. This notification can be about an aspect of the incremental tax due 2179-1, for instance may inform about the aspect of the incremental tax due 2179-1, namely that it has been determined, where it can be found, what it is, or at least a portion or a statistic of its content, and so on. This notification can be communicated by being encoded as a payload 2137, which is carried by a response 2187. The response 2187 may be transmitted via the network 188 responsive to the received request 2184. The response 2187 may be transmitted to the computer system 2190, or to OPF 2189, and so on. As such, the other device can be the computer system 2190, or a device of the OPF 2189, or the screen 2191 of the user 2192, and so on.

As additional datasets are received (not shown in FIG. 21), they can be stored among the primary entity data 2140, and also within the data record 2148. For them, additional respective incremental tax dues 2179-2, 2179-3, 2179-4, . . . may be produced or computed, and be further stored within the data record 2148.

A total tax due 2155 may be derived from the incremental tax dues 2179-1, 2179-2, 2179-3, 2179-4, . . . , similarly with what was described for the total resource 155. The total tax due 2155 may be derived by addition. The total tax due 2155 may be derived at a time that is requested, periodically as planned, and so on. It is preferred that it is done in conjunction with the filing report at the filing frequency dictated by the tax authority.

A tax return 2149 may be prepared, similarly with what was described for the report document 149. One of the tax authorities 2180 may dictate a format for the tax return 2149. The tax return 2149 may include the entity data 2144.

An audit gallery 2100 may optionally be prepared, similarly with what was described for the substantiation gallery storage space 100. The audit gallery 2100 may have instantiations enabling viewing various items, such as a) the data record 2148, b) the tax return 2149, c) an exemption certificate 2145 that is required for certain tax rules to be applicable, and a special case of the rule required certificate 945, and d) an OSP certification 2152, similar to the OSP certification 952. Examples of such instantiations are provided in FIG. 26.

An access instruction 2158 may be prepared, similarly with what was described for the access instruction 158. The access instruction 2158 leads to substantiation materials of the tax return 2149, which is a relationship indicated by a reference arrow 2101. The access instruction 2158 may be transmitted according to a transmission arrow 2159, similarly with what was described for the transmission arrows 159, 1359. Typically the transmission is to one of the set 2180 of the tax authorities.

FIG. 22A is a diagram showing a screen 2291, which can be the screen 2191 of the user 2192, who is also an agent of the primary entity 2193. The OSP computer system 2195 may cause a User Interface (UI) 2200 to be projected onto the screen 2291. It will be recognized that the UI 2200 is a use case of the UI 400 of FIG. 4A, and many descriptions are therefore similar.

The UI 2200 shows a home page with a banner for the provider's name, a main menu header, menu options, and option to log out. In right-most, the UI 2200 shows a menu option 2201 for the user to input a request to prepare one's materials for a tax audit. The UI 2200 also shows a menu option 2202 for the user to view their previously prepared materials for a tax audit. The UI 2200 further shows a menu option 2203 for the user to enable the tax authority to view their previously prepared materials for a tax audit, in other words to conduct at least a pre-audit without involving the taxpayer. Of course, the tax authority may want to later conduct a full audit but, in any event, the tax authority will know in advance what materials, data records, etc. the taxpayer will show, and may find them adequate for performing the audit without even contacting the taxpayer in the first place! The menu option 2203 may enable the user to send the access instruction 2158 expressly, and separately from the tax return 2149. Other options may be planned from the menu option 2201, as now described.

The menu option 2201 may be more related to one-time settings. In this example, selecting it results in the view of FIG. 22B, which shows the next UI 2210. It will be recognized that the UI 2210 is a use case of the UI 410 of FIG. 4B, and many descriptions are therefore similar. The UI 2210 enables various options 2241, 2242, 2243, 2244, 2245, 2246, 2249 to be checked, depending on what the user wants. Some of them may be logically mutually exclusive, and so on. It will be understood that more UIs may be needed than the UI 2200 and UI 2210 for implementing these tasks.

Figure 23:
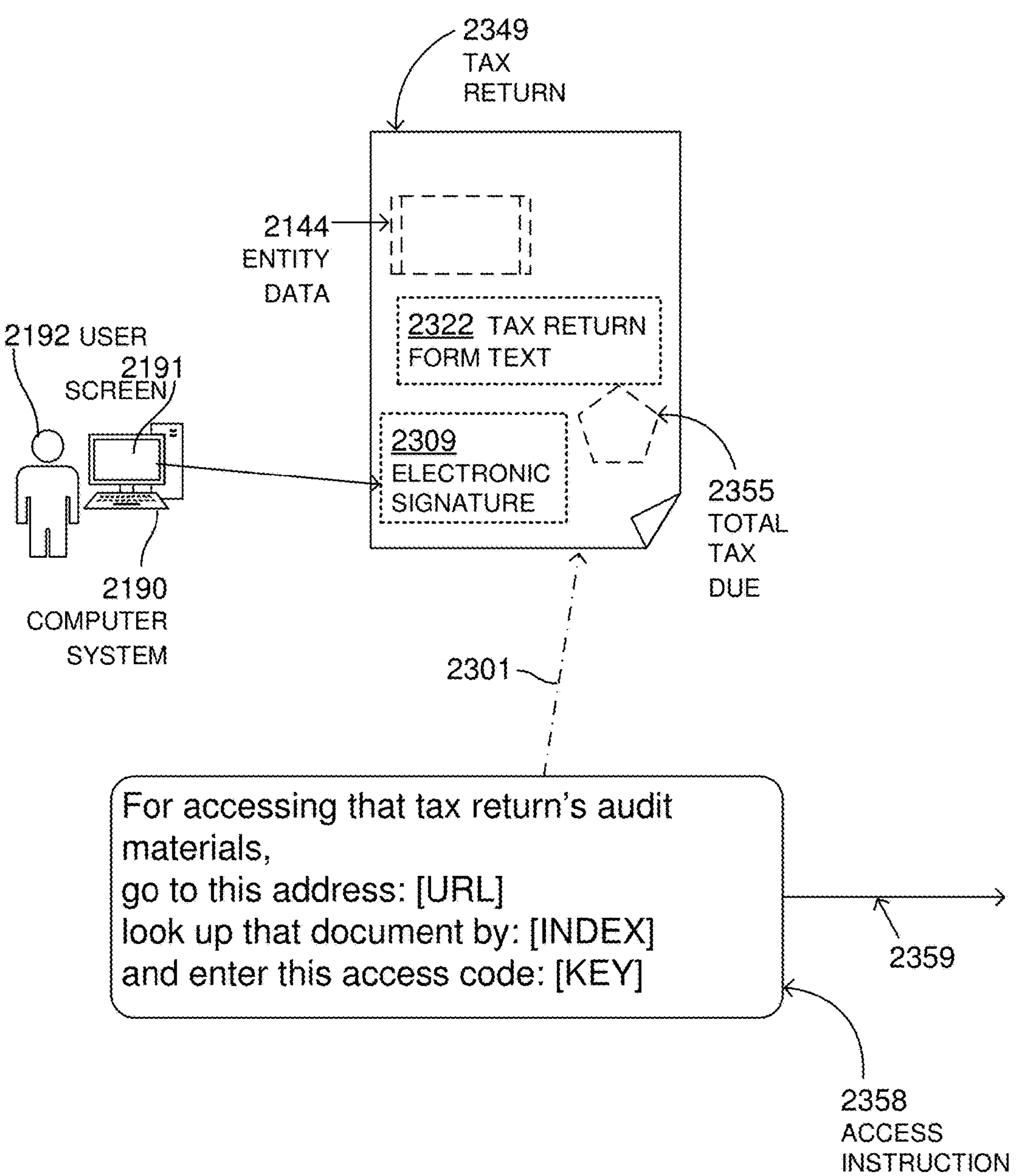
FIG. 23 is a diagram showing a sample tax return and a sample access instruction that refers to the sample tax return, in a use case of embodiments.

FIG. 23 shows a tax return 2349 that can be an example of the tax return 2149 of FIG. 21. It will be recognized that the tax return 2349 is a use case of the report document 249 of FIG. 2, and many descriptions are therefore similar. The tax return 2249 mentions the entity data 2144, includes tax return text 2322, and mentions the value of the total tax due 2355 in context of the text 2322. The user or agent 2192 has affixed their electronic signature 2309 to the tax return 2349 via their computer system 2190 that has a screen 2191.

FIG. 23 also shows an access instruction 2358 by itself, which can be an example of the access instruction 2158 of FIG. 21. The access instruction 2358 leads to tax audit materials of the tax return 2349, which is a relationship indicated by a reference arrow 2301. The access instruction 2358 can be transmitted according to a transmission arrow 2359.

Figure 24:
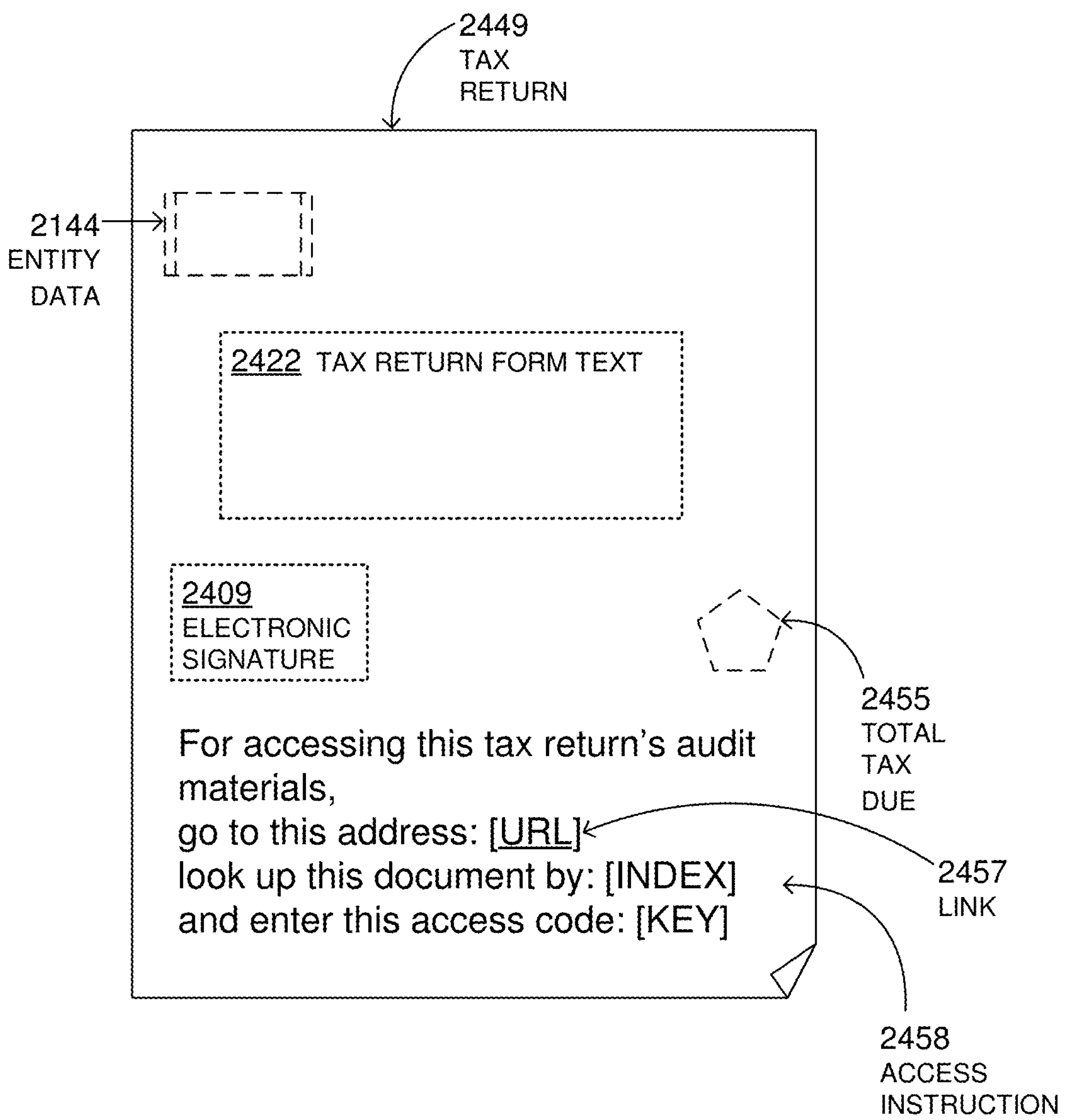
FIG. 24 is a diagram showing an operational example of the tax return of FIG. 23, augmented with an access instruction for its audit materials, where the access instruction includes a link, in a use case of embodiments.

FIG. 24 shows a tax return 2449 that could be an example of the tax return 2149, 2349. It will be recognized that the tax return 2449 is a use case of the report document 1449 of FIG. 14, and many descriptions are therefore similar.

The tax return 2449 mentions the entity data 2144. The tax return 2449 also includes tax return form text 2422, and mentions a value of a total tax due 2455 in context of the tax return form text 2422. The tax return 2449 also includes an electronic signature 2409. The tax return 2449 is further augmented with an access instruction 2458, defines a URL, and has a device-actuatable link 2457 that leads to the URL. The link 2457 is actuatable with a computer mouse, and may even execute a portion of the access instruction 2458.

Figure 25:
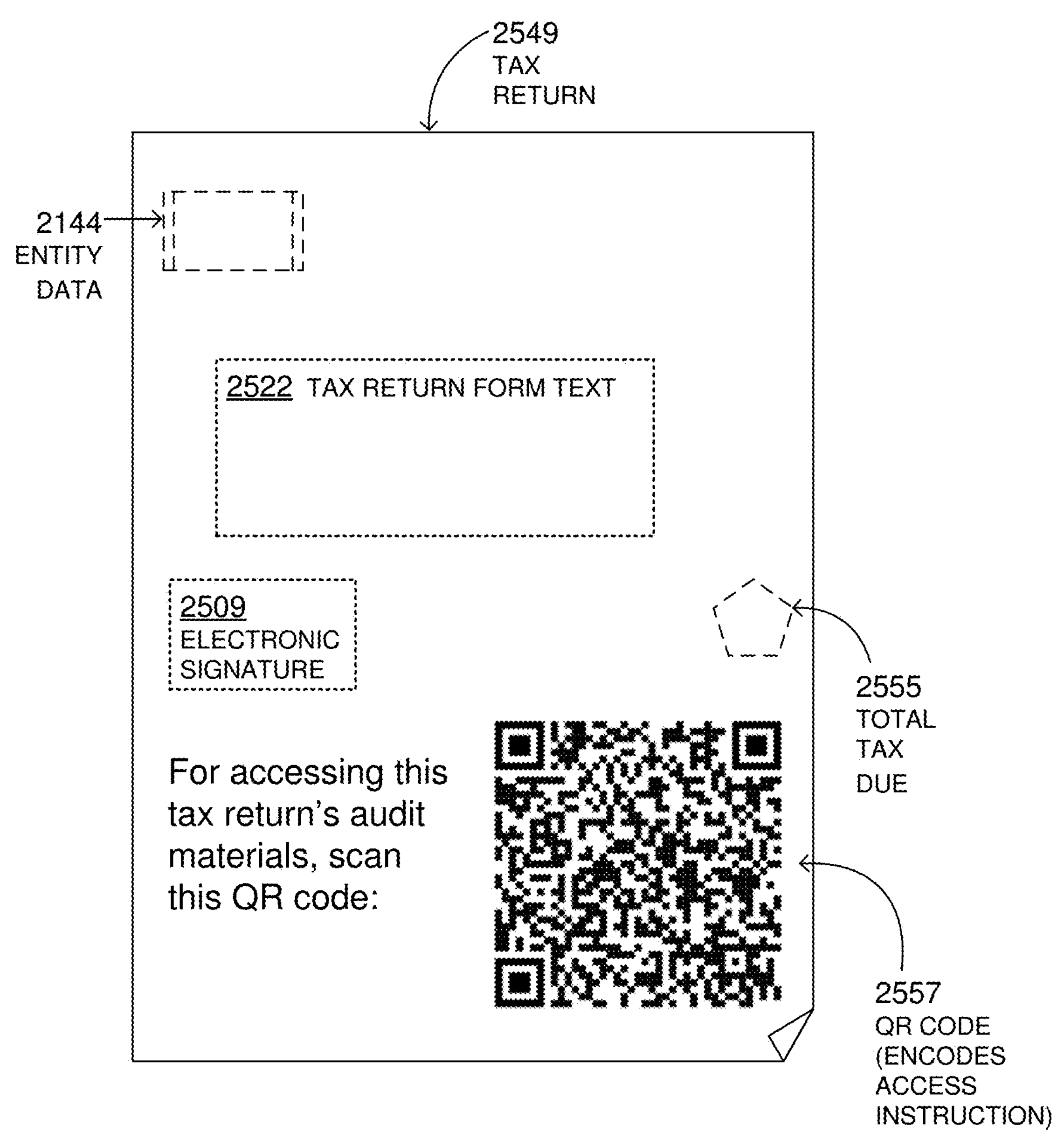
FIG. 25 is a diagram showing an operational example of the tax return of FIG. 23, augmented with an access instruction for its audit materials, where the access instruction includes a machine-readable QR code, in a use case of embodiments.

FIG. 25 shows a tax return 2549 that could be an example of the tax returns 2149, 2349, 1349. It will be recognized that the tax return 2549 is a use case of the report document 1549 of FIG. 15, and many descriptions are therefore similar.

The tax return 2549 mentions the entity data 2144. The tax return 2549 also includes tax return form text 2522, and mentions a value of a total tax due 2555 in context of the tax return form text 2522. The tax return 2549 also includes an electronic signature 2509. The tax return 2549 is further augmented with a machine-readable quick response (QR) code 2557 that encodes an access instruction, similarly to what was described for the QR code 1557.

Figure 26:
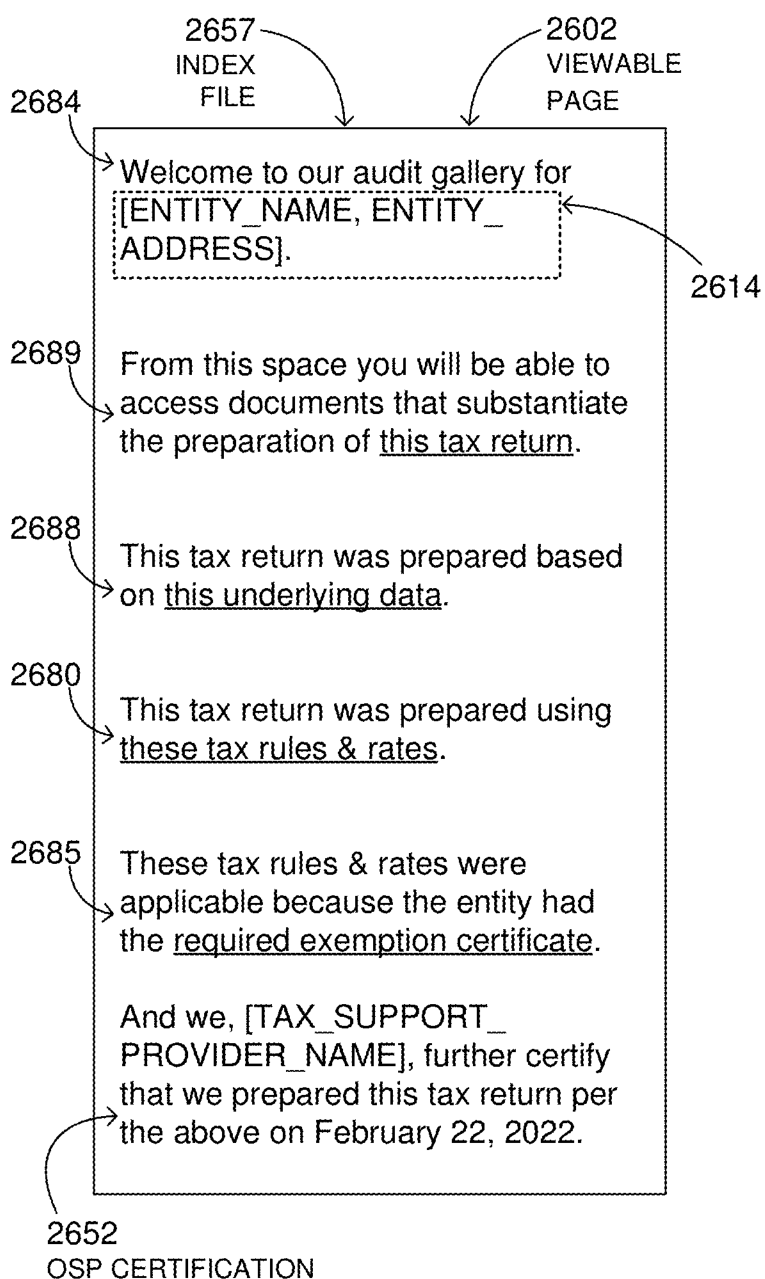
FIG. 26 shows an operational example of a User Interface (UI) that may appear after another option in the UI of FIG. 22A has been selected by a primary entity, or may appear to an auditing tax authority, that presents implementations of prepared audit materials accessible from an audit gallery, in a use case of embodiments.

FIG. 26 shows an index file 2657 that is implemented as a viewable page 2602. The viewable page 2602 may appear in some embodiments when the selection 2202 is made from the UI 2200 of FIG. 22A, or by an auditing tax authority accessing tax materials for a preaudit. It will be recognized that the index file 2657 is a use case of the index file 1057 of FIG. 10, and many descriptions are therefore similar.

The viewable page 2602 includes a paragraph 2684, and a field 2614 in context of the paragraph 2684. The viewable page 2602 also includes paragraphs 2689, 2688, 2680, 2685, which are use cases of the paragraphs 1089, 1088, 1080, 1085, and are provided similarly with links. In addition, the viewable page 2602 includes a paragraph 2652, which is a use case of the paragraph 1052.

Figure 27:
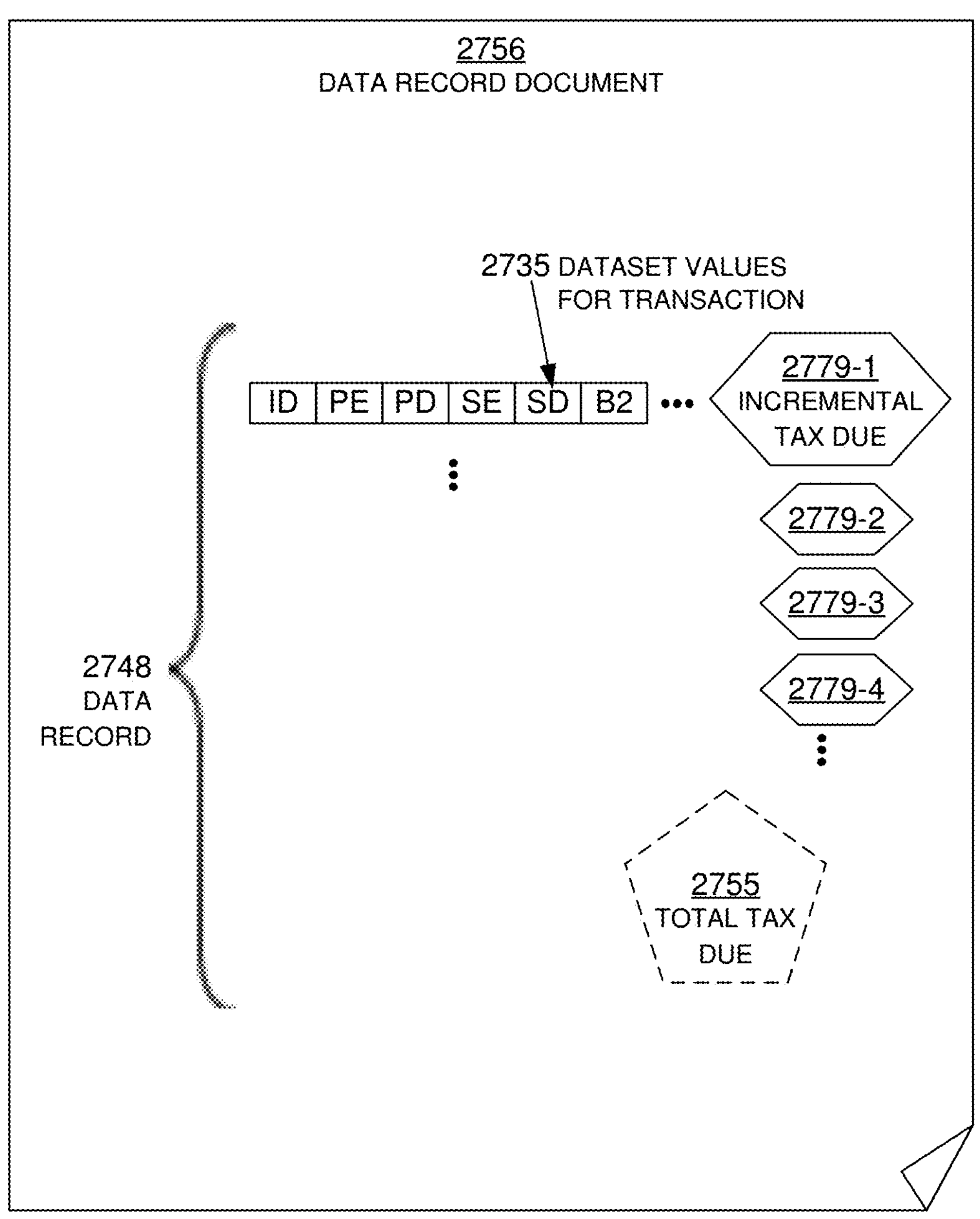
FIG. 27 is a diagram showing sample elements of a data record for a tax audit that is implemented as a data record document, in a use case of embodiments.

FIG. 27 shows sample elements of a data record 2748. It will be recognized that the data record 2748 is a use case of the data record 348 of FIG. 3, and further instantiated in a data record document 2756. The data record document 2756 could be any suitable computer document, such as a spreadsheet.

The data record 2748 includes dataset values 2735 for the transaction 2197, and additional dataset values as indicated by the dot-dot-dot. In this example, the dataset values 2735 are the same as the dataset values 2135. The data record 2748 also includes the computed incremental tax due 2779-1 for the dataset values 2735, and additional computed incremental taxes due 2779-2, 2779-3, 2779-4. The data record 2748 further includes the value of the total tax due 2755.

In some use cases, a tax authority uses a device-actuatable feature of a received tax return of a taxpayer to access, with the express consent and permission of the taxpayer, private data of the taxpayer that is stored in an online software platform (OSP) and substantiates the tax return. These are records that the taxpayer would make available in an audit, and no other records need to be included. Examples are now described.

Figure 28:
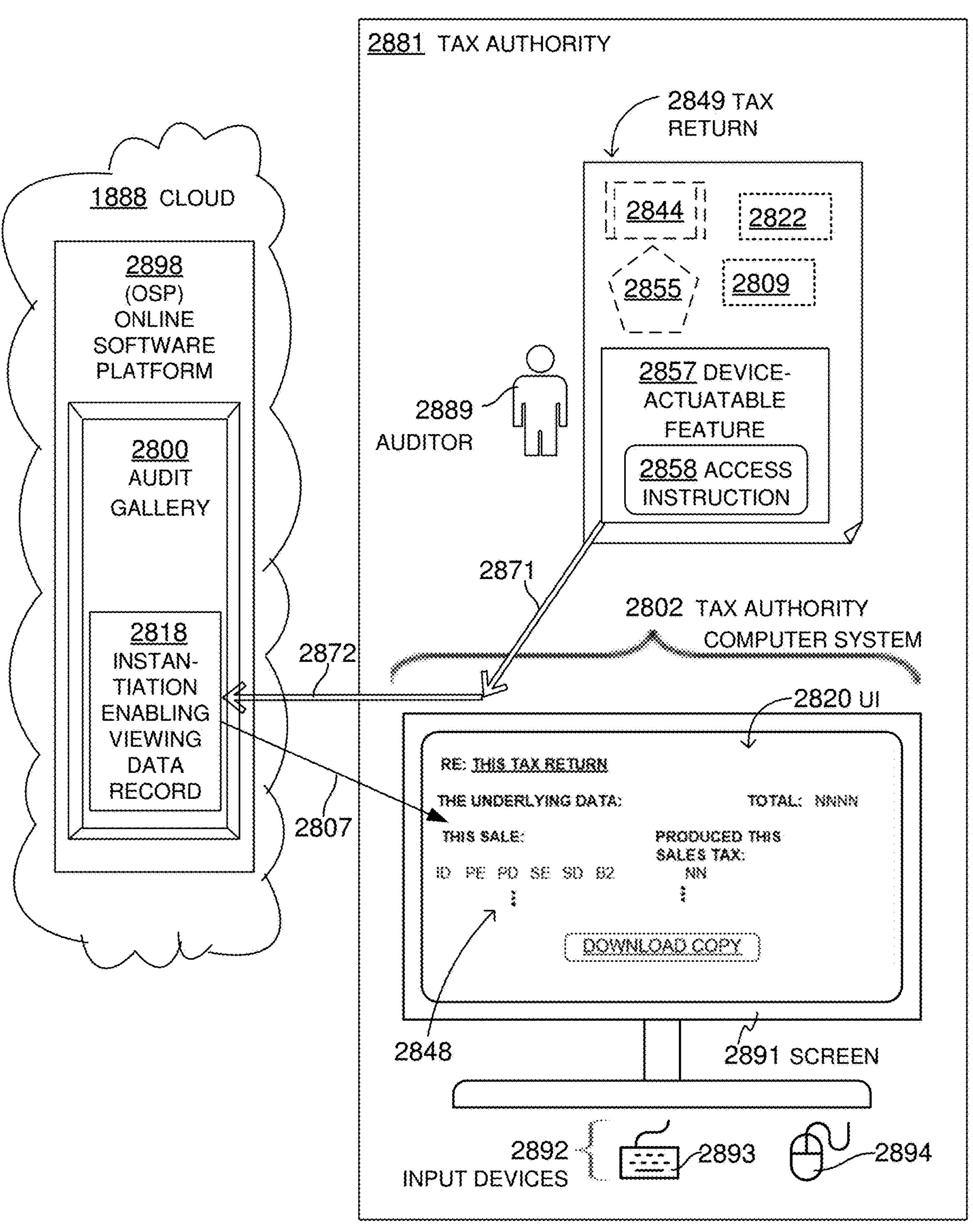
FIG. 28 shows an operational example of how a tax authority may use a device-actuatable feature on a tax return to access an audit gallery for pre-auditing or auditing the tax return without involving the taxpayer, in a use case of embodiments.

FIG. 28 shows again the cloud 1888. It will be recognized that FIG. 28 is a use case of FIG. 21, and many descriptions are therefore similar. In the cloud 1888 there is an online software platform (OSP) 2898, which can be as the OSP 2198. An instantiation enabling viewing a data record 2818, which can be as the instantiation 318, is stored in the OSP 2898. Optionally, the instantiation 2818 is stored in an audit gallery 2800 of the OSP 2898, perhaps with other instantiations, as seen above. The audit gallery 2800 can be as the audit gallery 2100.

FIG. 28 shows a tax authority 2881, which can be as the domain entity 1381. A tax authority computer system 2802 of the tax authority 2881 is not hosted by the OSP 2898. The tax authority computer system 2802 can be configured to assist an auditor 2889, who is an agent of the tax authority 2881, to review a tax return 2849. The tax return 2849 has been received by the tax authority 2881 on behalf of a primary entity (not shown), which is distinct from the tax authority 2881. The tax return 2849 is not necessarily within the tax return computer system 2802, as it may have been received physically as a paper document, instead of electronically. Even then, the tax return 2849 may show a URL, which the auditor 2889 can key into a browser of the tax authority computer system 2802 using a keyboard 2893.

Similarly with the above, the tax return 2849 can be as described for any of the tax returns 2149, 2349, 2449, 2549. In particular, the tax return 2849 may mention at least entity data 2844 of the primary entity, include tax return form text 2822, mention, in context of the tax return form text 2822, the value of the total tax due 2855, have an electronic signature 2809 previously affixed by an agent of the primary entity, and have a device-actuatable feature 2857 for an access instruction 2858. The auditor 2889 may want substantiation materials to confirm the value of the total tax due 2855.

The tax authority computer system 2802 can be as the domain entity computer system 1802, e.g. have a screen 2891 for the auditor 2889, and one or more input devices 2892, such as the keyboard 2893 and a mouse 2894.

The tax auditor 2889 can use the input devices 2892 so that the tax return 2849 is displayed on the screen, but this operation is not expressly depicted in FIG. 28. Such causing thereby causes the device-actuatable feature 2857 to be displayed on the screen, which is not expressly depicted in FIG. 28, either. Then the tax auditor 2889 can actuate the displayed device-actuatable feature 2857, to cause the access instruction 2858 to be inputted, as indicated by the arrow 2871. Similarly with the above, the device-actuatable feature 2857 may include a link, a QR code, and so on. The access instruction 2858 may include a passcode, plainly written on the tax return 2849, or revealed on the screen 2891 from a QR code, and so on.

Then, as indicated by the arrow 2872, the tax authority computer system 2802, accesses the instantiation enabling viewing a data record 2818. The data record of the instantiation 2818 can be as described for the data record 2748.

Then, per an arrow 2807, from the accessed instantiation 2818, a version 2848 of the data record of the instantiation 2818 becomes displayed on the screen 2891 as a UI 2820. Moreover, rules used can be displayed, such as tax rates, circumstances where an exemption certificate justifies no tax, possibly along with the exemption certificate, and so on as seen in FIG. 26.

In the methods described above, each operation can be performed as an affirmative act or operation of doing, or causing to happen, what is written that can take place. Such doing or causing to happen can be by the whole system or device, or just one or more components of it. It will be recognized that the methods and the operations may be implemented in a number of ways, including using systems, devices and implementations described above. In addition, the order of operations is not constrained to what is shown, and different orders may be possible according to different embodiments. Examples of such alternate orderings may include overlapping, interleaved, interrupted, reordered, incremental, preparatory, supplemental, simultaneous, reverse, or other variant orderings, unless context dictates otherwise. Moreover, in certain embodiments, new operations may be added, or individual operations may be modified or deleted. The added operations can be, for example, from what is mentioned while primarily describing a different system, apparatus, device or method.

A person skilled in the art will be able to practice the present invention in view of this description, which is to be taken as a whole. Details have been included to provide a thorough understanding. In other instances, well-known aspects have not been described, in order to not obscure unnecessarily this description.

Some technologies or techniques described in this document may be known. Even then, however, it does not necessarily follow that it is known to apply such technologies or techniques as described in this document, or for the purposes described in this document.

This description includes one or more examples, but this fact does not limit how the invention may be practiced. Indeed, examples, instances, versions or embodiments of the invention may be practiced according to what is described, or yet differently, and also in conjunction with other present or future technologies. Other such embodiments include combinations and sub-combinations of features described herein, including for example, embodiments that are equivalent to the following: providing or applying a feature in a different order than in a described embodiment; extracting an individual feature from one embodiment and inserting such feature into another embodiment; removing one or more features from an embodiment; or both removing a feature from an embodiment and adding a feature extracted from another embodiment, while providing the features incorporated in such combinations and sub-combinations.

A number of embodiments are possible, each including various combinations of elements. When one or more of the appended drawings—which are part of this specification—are taken together, they may present some embodiments with their elements in a manner so compact that these embodiments can be surveyed quickly. This is true even if these elements are described individually extensively in this text, and these elements are only optional in other embodiments.

In general, the present disclosure reflects preferred embodiments of the invention. The attentive reader will note, however, that some aspects of the disclosed embodiments extend beyond the scope of the claims. To the respect that the disclosed embodiments indeed extend beyond the scope of the claims, the disclosed embodiments are to be considered supplementary background information and do not constitute definitions of the claimed invention.

In this document, the phrases "constructed to", "adapted to" and/or "configured to" denote one or more actual states of construction, adaptation and/or configuration that is fundamentally tied to physical characteristics of the element or feature preceding these phrases and, as such, reach well beyond merely describing an intended use. Any such elements or features can be implemented in a number of ways, as will be apparent to a person skilled in the art after reviewing the present disclosure, beyond any examples shown in this document.

Parent patent applications: Any and all parent, grandparent, great-grandparent, etc. patent applications, whether mentioned in this document or in an Application Data Sheet ("ADS") of this patent application, are hereby incorporated by reference herein as originally disclosed, including any priority claims made in those applications and any material incorporated by reference, to the extent such subject matter is not inconsistent herewith.

Reference numerals: In this description a single reference numeral may be used consistently to denote a single item, aspect, component, or process. Moreover, a further effort may have been made in the preparation of this description to use similar though not identical reference numerals to denote other versions or embodiments of an item, aspect, component or process that are identical or at least similar or related. Where made, such a further effort was not required, but was nevertheless made gratuitously so as to accelerate comprehension by the reader. Even where made in this document, such a further effort might not have been made completely consistently for all of the versions or embodiments that are made possible by this description. Accordingly, the description controls in defining an item, aspect, component or process, rather than its reference numeral. Any similarity in reference numerals may be used to infer a similarity in the text, but not to confuse aspects where the text or other context indicates otherwise.

The claims of this document define certain combinations and sub-combinations of elements, features and acts or operations, which are regarded as novel and non-obvious. The claims also include elements, features and acts or operations that are equivalent to what is explicitly mentioned. Additional claims for other such combinations and sub-combinations may be presented in this or a related document. These claims are intended to encompass within their scope all changes and modifications that are within the true spirit and scope of the subject matter described herein. The terms used herein, including in the claims, are generally intended as "open" terms. For example, the term "including" should be interpreted as "including but not limited to," the term "having" should be interpreted as "having at least," etc. If a specific number is ascribed to a claim recitation, this number is a minimum but not a maximum unless stated otherwise. For example, where a claim recites "a" component or "an" item, it means that the claim can have one or more of this component or this item.

In construing the claims of this document, 35 U.S.C. § 112 (f) is invoked by the inventor(s) only when the words "means for" or "steps for" are expressly used in the claims. Accordingly, if these words are not used in a claim, then that claim is not intended to be construed by the inventor(s) in accordance with 35 U.S.C. § 112 (f).

What is claimed is:

1. A non-transitory computer-readable medium configured to store instructions which, when executed by one or more processors of an online software platform (OSP) computer system, cause the OSP computer system to perform operations including at least:

receiving, by the OSP computer system from a remote device via a network, a dataset having dataset values, the dataset values representing relationship instance data of a relationship instance between a primary entity and a secondary entity;

inputting, by the OSP computer system, entity data of the primary entity;

selecting, by the OSP computer system, a digital rule responsive to at least one of the dataset values;

producing, by the OSP computer system applying the selected digital rule to at least one of the dataset values, an individual resource for the dataset;

producing, by the OSP computer system, additional individual resources for the primary entity;

deriving, by the OSP computer system, a value of a total resource from the produced individual resource and from the additional individual resources;

generating, by the OSP computer system, a report document that mentions at least the entity data, includes report text, and mentions the value of the total resource in context of the report text;

enabling, by the OSP computer system, an agent of the primary entity to sign the report document by the agent affixing an electronic signature to the report document;

preparing, by the OSP computer system, an instantiation enabling viewing a data record, the data record including at least one of the dataset values, the produced individual resource, and at least some of the additional individual resources; and making, by the OSP computer system, available for viewing to a domain entity the instantiation enabling viewing the data record, the domain entity distinct from the primary entity.

2. The computer-readable medium of claim 1, in which the operations further include:

accessing, by the OSP computer system, stored digital resource rules, and in which the digital rule is selected from the accessed stored digital resource rules but not responsive to the primary entity data.

3. The computer-readable medium of claim 1, in which the operations further include:

accessing, by the OSP computer system, a stored digital override rule created by the primary entity, and in which the selected digital rule is the accessed digital override rule.

4. The computer-readable medium of claim 1, in which the operations further include:

causing, by the OSP computer system, an individual resource notification to be transmitted about an aspect of the individual resource to one of an output device and another device.

5. The computer-readable medium of claim 1, in which:

the data record also includes the value of the total resource.

6. The computer-readable medium of claim 1, in which the operations further include:

inputting, by the OSP computer system from the primary entity, a substantiation request, and in which the instantiation enabling viewing the data record is prepared only responsive to the substantiation request having been inputted.

7. The computer-readable medium of claim 1, in which:

the instantiation enabling viewing the data record includes a version of one or more data record documents that include at least portions of the data record.

8. The computer-readable medium of claim 7, in which:

the version includes an original of the one or more data record documents.

9. The computer-readable medium of claim 7, in which:

the version includes a copy of the one or more data record documents.

10. The computer-readable medium of claim 7, in which the operations further include:

preparing, by the OSP computer system, the one or more data record documents.

11. The computer-readable medium of claim 1, in which:

the preparing of the instantiation enabling viewing the data record includes generating a viewable page, which is viewable via a User Interface (UI), and the instantiation enabling viewing the data record includes a link on the viewable page, the link directing to a version of one or more data record documents that include portions of the data record.

12. The computer-readable medium of claim 11, in which:

the version includes an original of the one or more data record documents.

13. The computer-readable medium of claim 11, in which:

the version includes a copy of the one or more data record documents.

14. The computer-readable medium of claim 11, in which the operations further include:

preparing, by the OSP computer system, the one or more data record documents.

15. The computer-readable medium of claim 11, in which the operations further include:

preparing, by the OSP computer system, an additional document distinct from the viewable page and from the instantiation enabling viewing the data record, and in which the viewable page further includes an additional link directing to the additional document.

16. The computer-readable medium of claim 11, in which the operations further include:

preparing, by the OSP computer system, an additional document distinct from the viewable page and from the instantiation enabling viewing the data record, preparing, by the OSP computer system, a copy of the additional document, and in which the viewable page further includes an additional link directing to the copy of additional document.

17. The computer-readable medium of claim 1, in which the operations further include:

preparing, by the OSP computer system, an additional instantiation enabling viewing an additional element distinct from the data record, and in which the additional instantiation and the instantiation enabling viewing the data record are stored in a substantiation gallery storage space, and the making available to the domain entity for viewing is performed by making available the substantiation gallery storage space for viewing.

18. The computer-readable medium of claim 1, in which the operations further include:

the instantiation enabling viewing the data record is made available for viewing to the domain entity by making available to the domain entity an access instruction rendering accessible to an agent of the domain entity the instantiation enabling viewing the data record.

19. The computer-readable medium of claim 18, in which:

the access instruction recites a password.

20. The computer-readable medium of claim 18, in which the operations further include:

preparing, by the OSP computer system, an additional instantiation enabling viewing an additional element distinct from the data record, and in which the additional instantiation and the instantiation enabling viewing the data record are stored as contents in a substantiation gallery storage space, and the access instruction renders accessible to the agent the stored contents substantiation gallery storage space.

21. The computer-readable medium of claim 18, in which:

the access instruction is made available to the domain entity by causing, by the OSP computer system, the access instruction to be uploaded to a server of the domain entity.

22. The computer-readable medium of claim 18, in which:

the access instruction is made available to the domain entity by causing, by the OSP computer system, an access notification to be transmitted to the domain entity, the access notification containing the access instruction.

23. The computer-readable medium of claim 18, in which the operations further include:

augmenting, by the OSP computer system, the report document with the access instruction, and in which the access instruction is made available to the domain entity by the augmented and signed report document being caused to become available to the domain entity.

24. The computer-readable medium of claim 23, in which:

the access instruction recites a password.

25. The computer-readable medium of claim 23, in which the operations further include:

causing, by the OSP computer system, the signed report document thus augmented with the access instruction to become uploaded to a server of the domain entity.

26. The computer-readable medium of claim 23, in which:

the signed report document is thus augmented by adding to it a device-actuatable feature for the access instruction.

27. The computer-readable medium of claim 26, in which:

the access instruction defines a Uniform Resource Locator (URL), and the device-actuatable feature includes a link leading to the URL.

28. The computer-readable medium of claim 26, in which:

the access instruction defines a Uniform Resource Locator (URL), and the device-actuatable feature includes a machine-readable quick response (QR) code that encodes the URL.

29. The computer-readable medium of claim 28, in which:

the QR code further includes a link leading to the URL of the access instruction.

* * * * *